US008938870B1

(12) United States Patent
Bourgeois

(10) Patent No.: US 8,938,870 B1
(45) Date of Patent: Jan. 27, 2015

(54) CONVERTIBLE HIGH/LOWER PRESSURE OUTDOOR COOKING APPARATUS, KIT, AND METHOD

(75) Inventor: Norman R. Bourgeois, Jefferson, LA (US)

(73) Assignee: Metal Fusion, Inc., Jefferson, LA (US)

(*) Notice: Subject to any disclaimer, the term of this patent is extended or adjusted under 35 U.S.C. 154(b) by 256 days.

(21) Appl. No.: 13/352,157

(22) Filed: Jan. 17, 2012

Related U.S. Application Data

(60) Provisional application No. 61/432,962, filed on Jan. 14, 2011, provisional application No. 61/475,416, filed on Apr. 14, 2011.

(51) Int. Cl.
A47J 37/00 (2006.01)
F24C 3/00 (2006.01)

(52) U.S. Cl.
USPC ............ 29/401.1; 126/38; 126/9 R; 126/25 R

(58) Field of Classification Search
USPC .......... 126/38, 9 R, 59, 275 R, 25 R; 29/401.1
See application file for complete search history.

(56) References Cited

U.S. PATENT DOCUMENTS

| 5,065,735 | A * | 11/1991 | Bourgeois et al. ............... 126/40 |
| 5,878,739 | A * | 3/1999 | Guidry ......................... 126/25 R |
| 6,161,534 | A * | 12/2000 | Kronman ....................... 126/41 R |
| 6,523,461 | B1 * | 2/2003 | Johnston et al. ................. 99/340 |
| 6,619,280 | B1 * | 9/2003 | Zhou et al. .................. 126/39 R |
| 6,698,335 | B1 * | 3/2004 | Bourgeois ...................... 99/340 |
| 7,156,087 | B1 * | 1/2007 | Churchill et al. ............ 126/25 R |
| 7,237,547 | B1 * | 7/2007 | Bourgeois ...................... 126/9 R |
| 7,703,450 | B2 * | 4/2010 | Brunner ....................... 126/39 R |
| 7,766,004 | B1 * | 8/2010 | Bourgeois ................... 126/25 R |
| 7,832,390 | B2 * | 11/2010 | Hsu et al. ......................... 126/36 |
| 2006/0174863 | A1 * | 8/2006 | Menegon .................... 126/37 R |

OTHER PUBLICATIONS

High and Low Pressure Cast Burner Prouct List. Product List [online]. Tejas Smokers [retrieved on Apr. 16, 2014]. Retrieved from the Internet: <URL: www.tejassmokers.com/castironburners.htm>. Retreived using Wayback Machine from date Jan. 8, 2010.*

(Continued)

Primary Examiner — David Bryant
Assistant Examiner — Jason L Vaughan
(74) Attorney, Agent, or Firm — Garvey, Smith, Nehrbass & North, L.L.C.; Charles C. Garvey, Jr.; Brett A. North

(57) ABSTRACT

An outdoor cooking apparatus includes a frame having a base for engaging an underlying support surface, a cooking surface for receiving a pot and a wind guard having upper and lower edges and a side wall or walls. A first removable support bracket removably attaches to the wind guard, the first bracket supporting a low pressure burner element. A second removable support bracket removably attaches to the wind guard. The second bracket supporting a high pressure burner element includes: i) a cylindrically shaped, vertically oriented tube having a tube wall that surrounds an open ended bore of uniform diameter, the bore communicating with upper and lower end openings, ii) a high pressure gaseous fuel nozzle supported within the open ended bore, the nozzle having a nozzle opening spaced inwardly of the tube wall, iii) a fuel supply tube that enables transmission of a gaseous fuel to the nozzle.

9 Claims, 46 Drawing Sheets

(56) References Cited

OTHER PUBLICATIONS

Jet Burner Prouct List. Product List [online]. Tejas Smokers [retrieved on Apr. 16, 2014]. Retrieved from the Internet: <URL: www.tejassmokers.com/newproducts_page6.htm>. Retreived using Wayback Machine from date Jul. 24, 2009.*

* cited by examiner

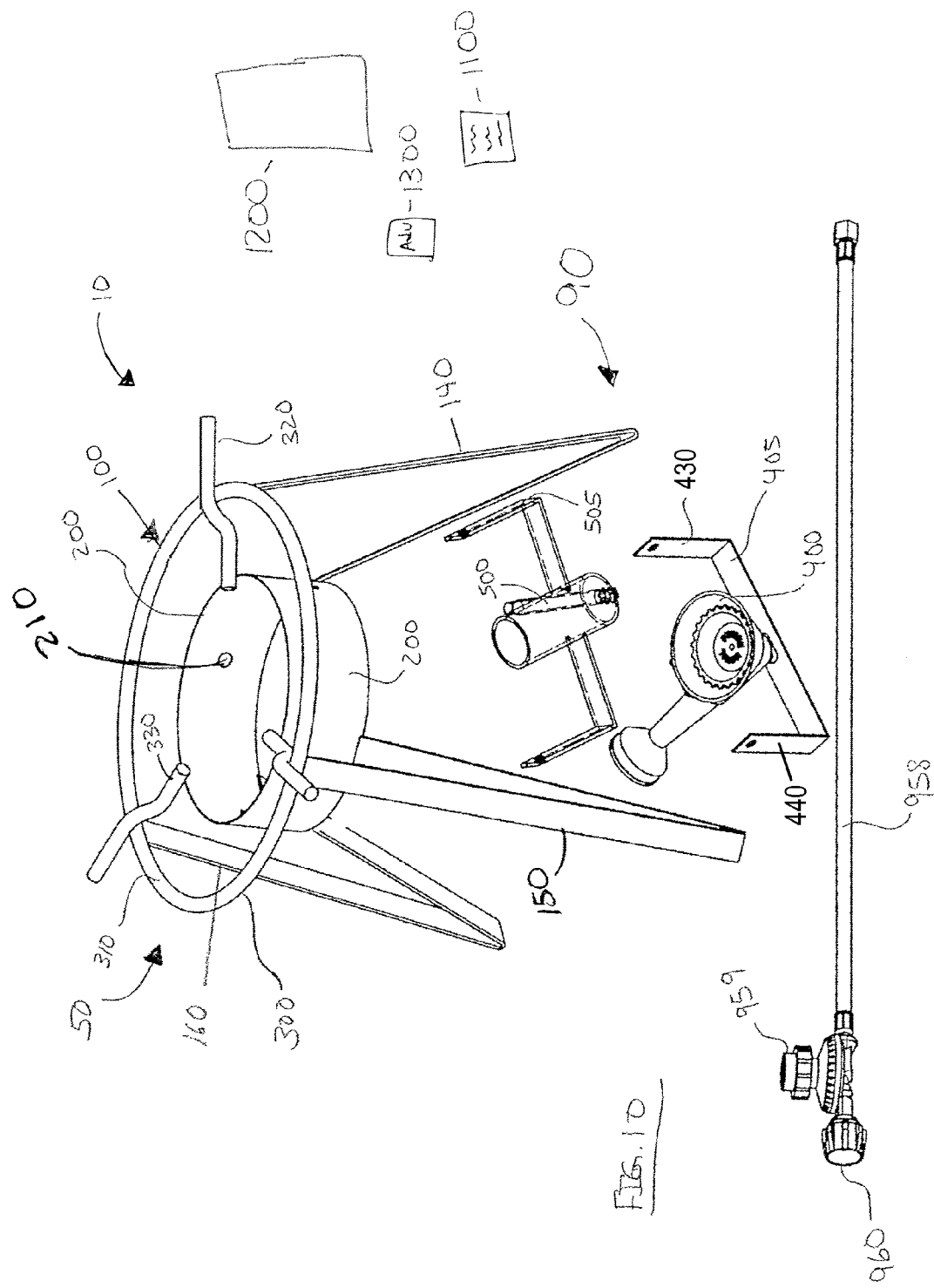

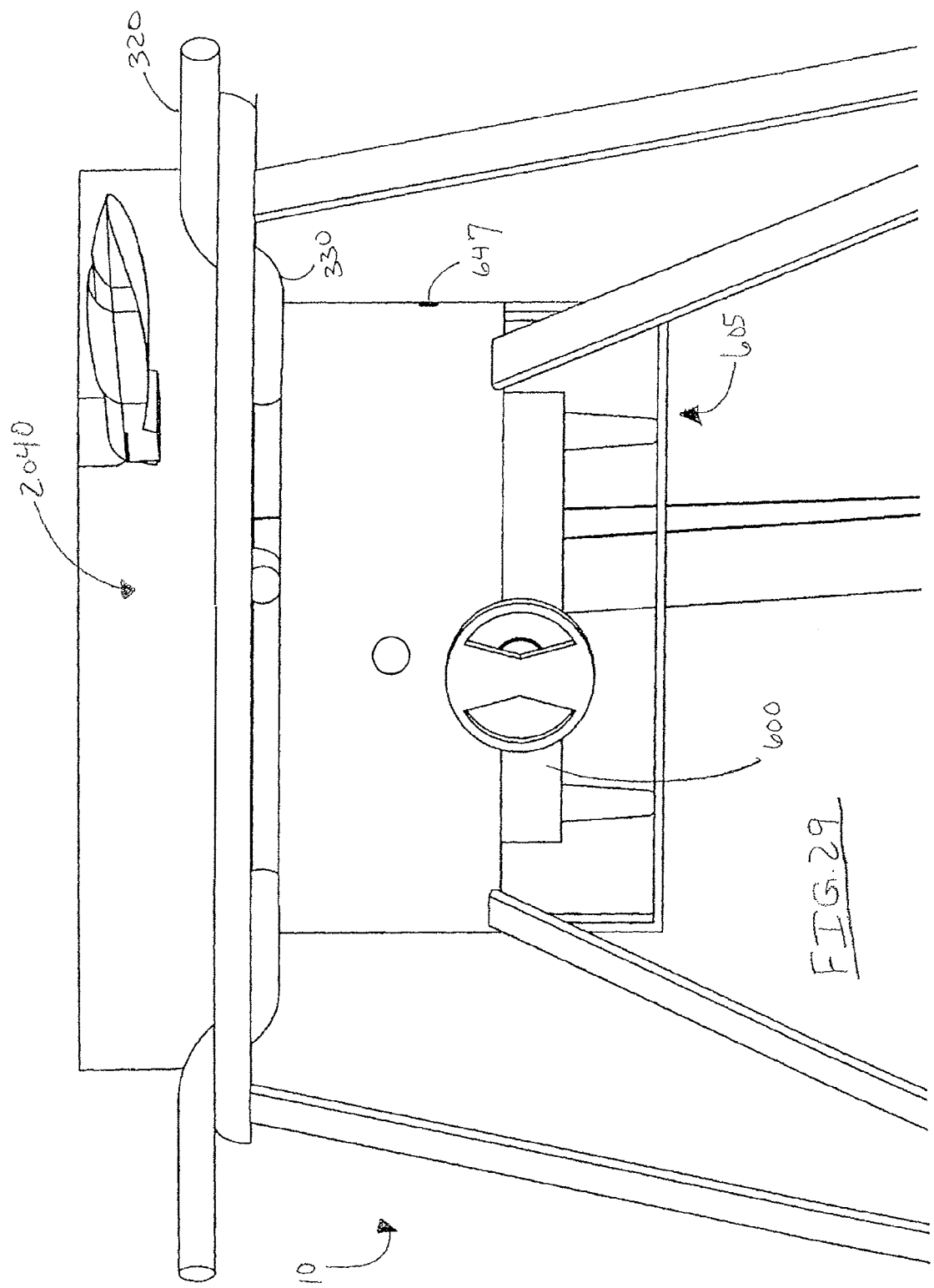

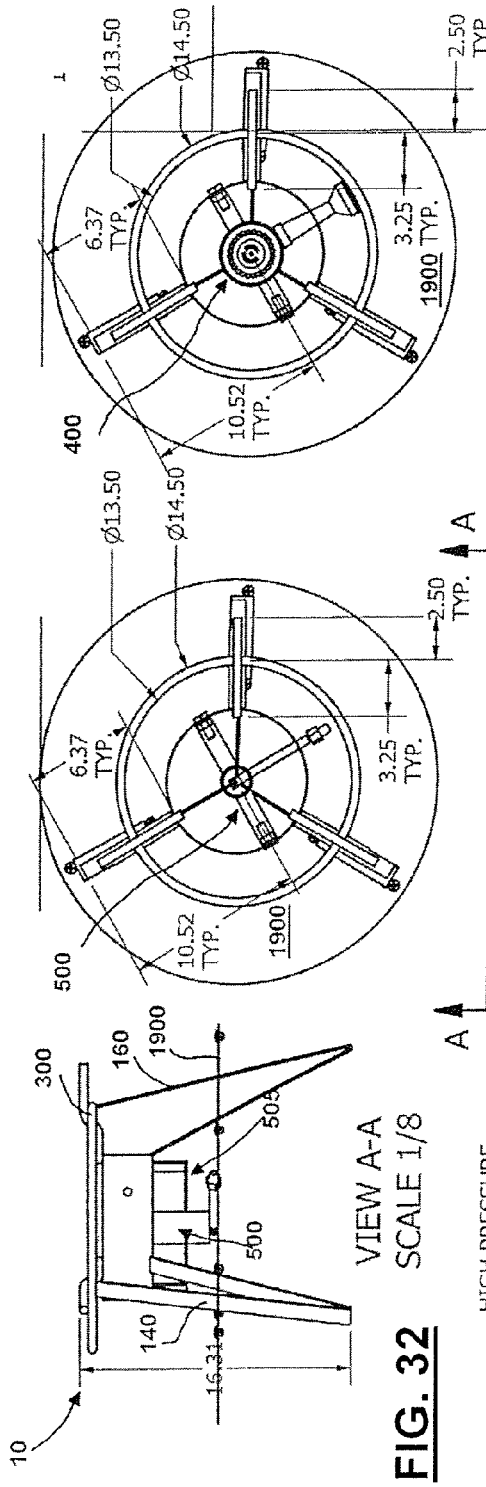
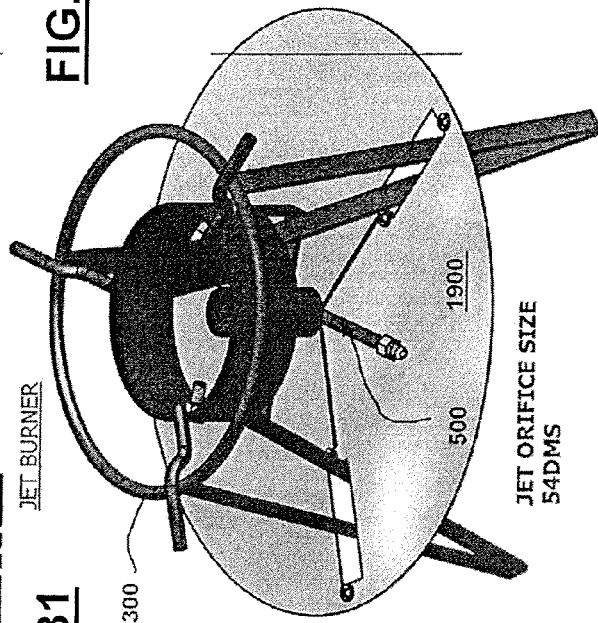
FIG. 34
FIG. 30
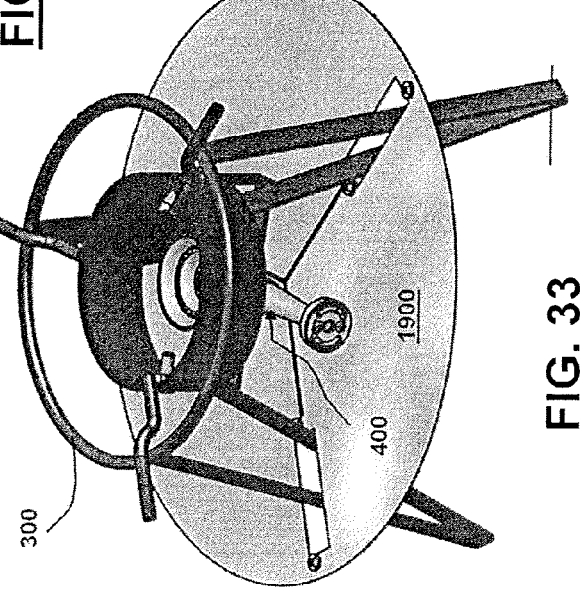
FIG. 33

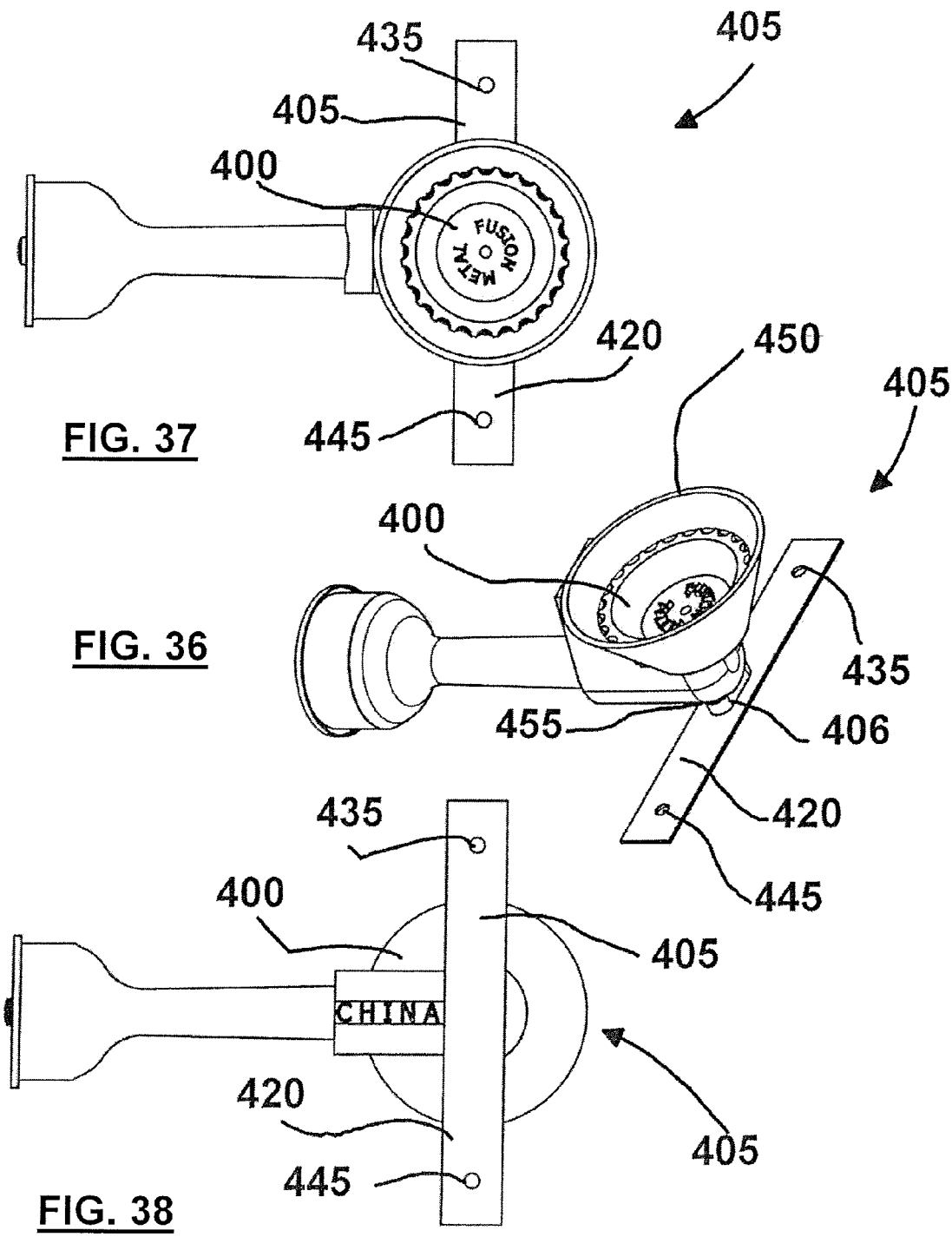

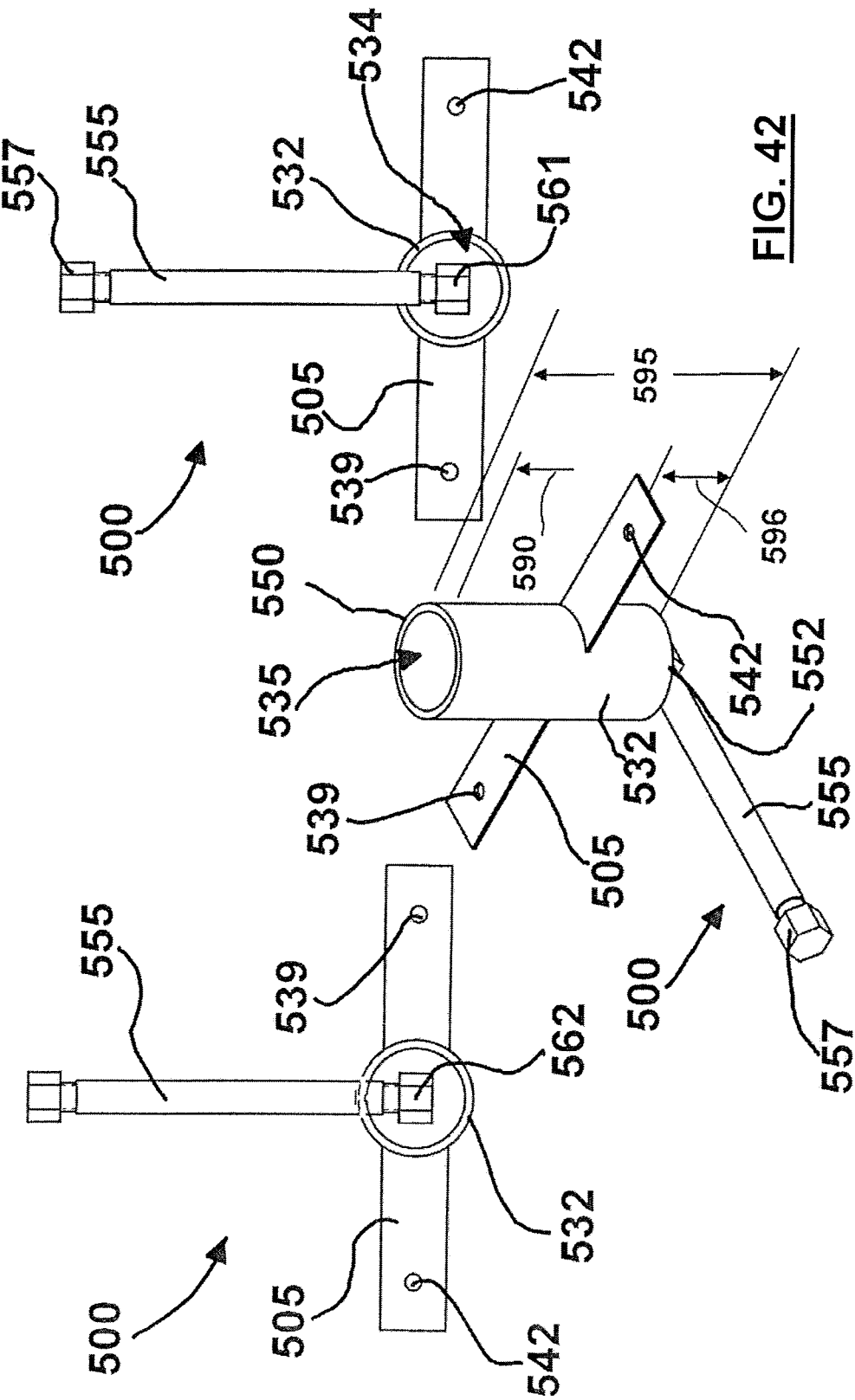

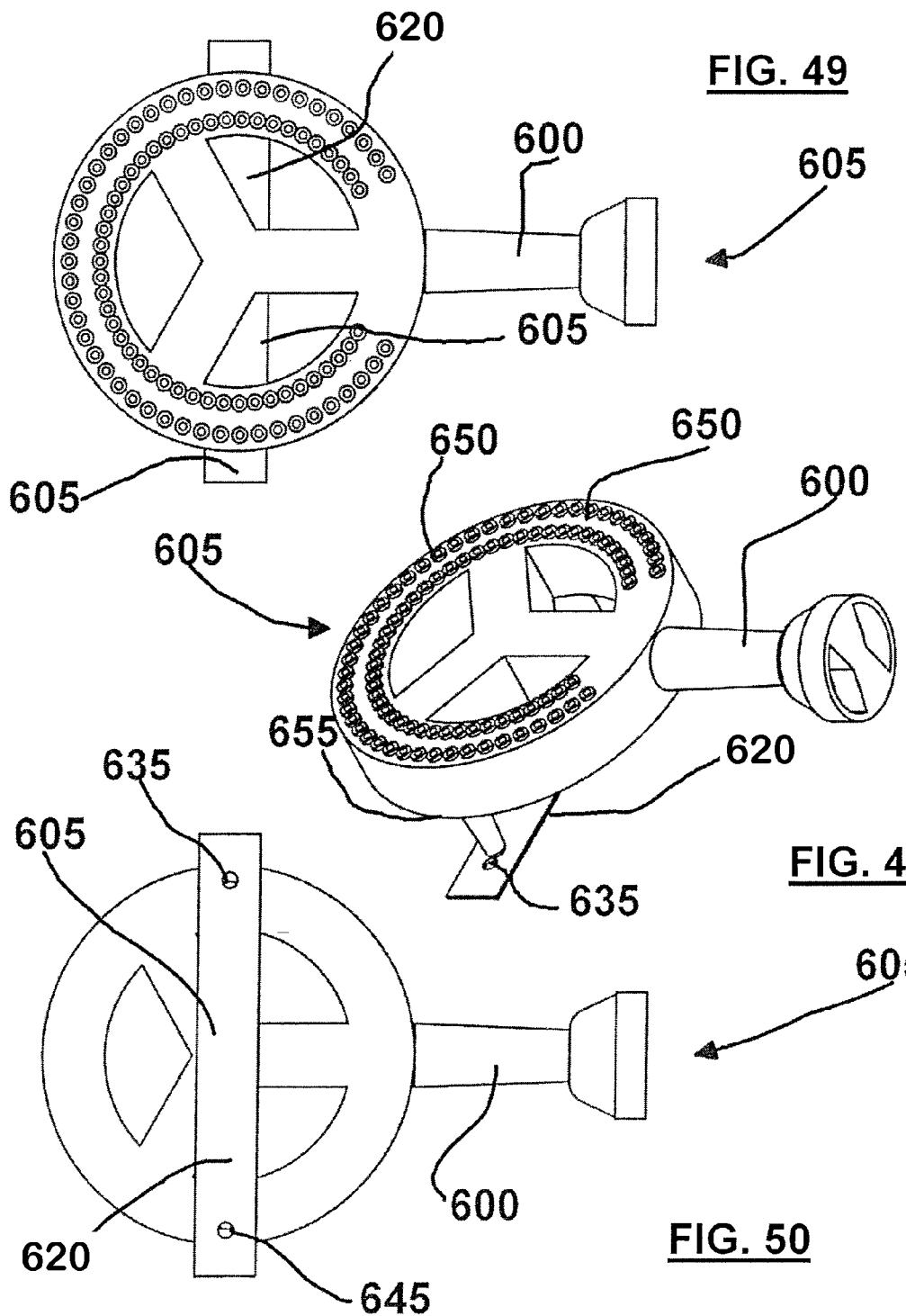

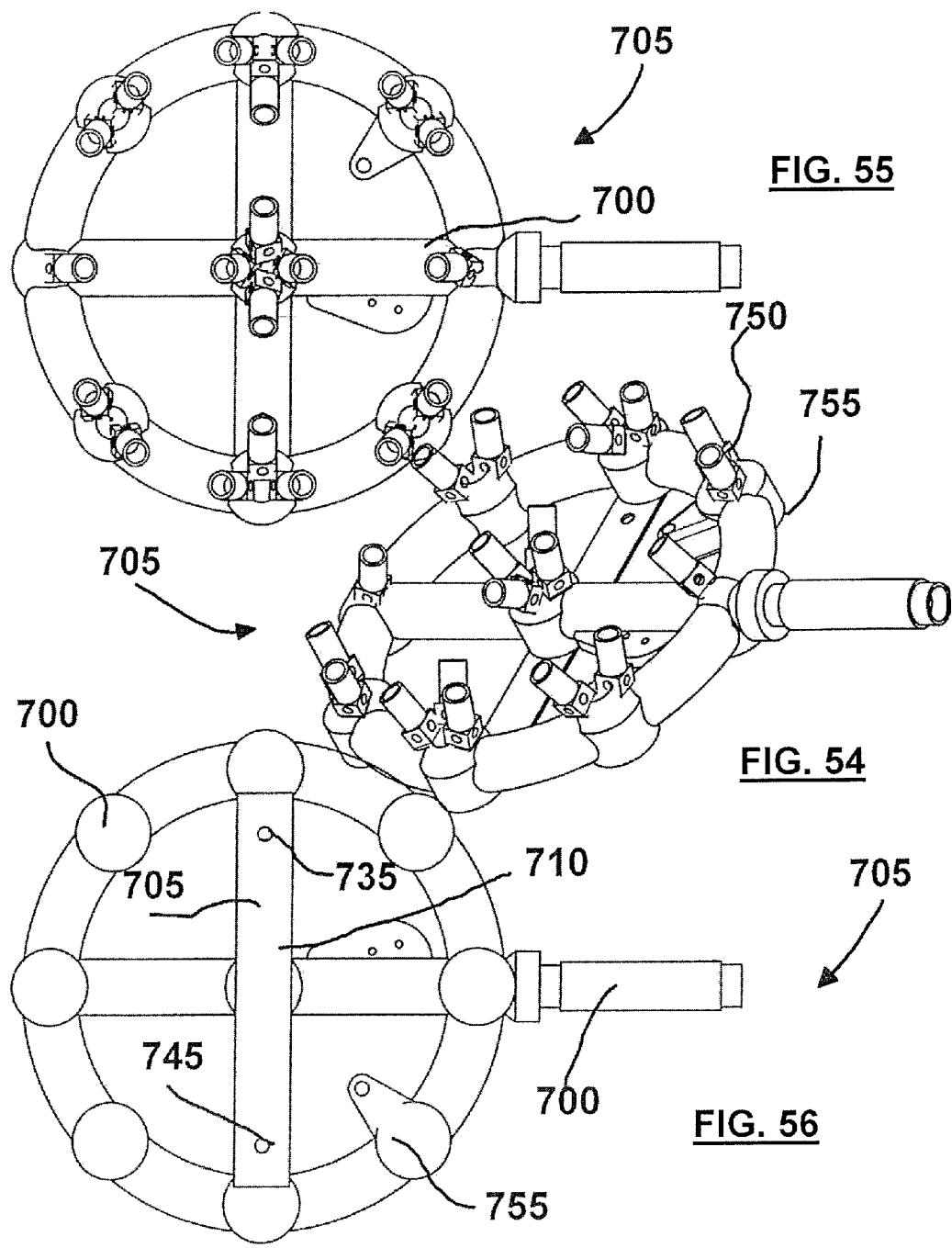

CONVERTIBLE HIGH/LOWER PRESSURE OUTDOOR COOKING APPARATUS, KIT, AND METHOD

CROSS-REFERENCE TO RELATED APPLICATIONS

This is a nonprovisional application of U.S. Provisional Patent Application Ser. No. 61/432,962, filed Jan. 14, 2011, and U.S. Provisional Patent Application Ser. No. 61/475,416, filed Apr. 14, 2011, both of which are hereby incorporated herein by reference.

Priority of U.S. Provisional Patent Application Ser. No. 61/432,962, filed Jan. 14, 2011, and U.S. Provisional Patent Application Ser. No. 61/475,416, filed Apr. 14, 2011, is hereby claimed

STATEMENT REGARDING FEDERALLY SPONSORED RESEARCH OR DEVELOPMENT

Not applicable

REFERENCE TO A "MICROFICHE APPENDIX"

Not applicable

BACKGROUND

In one embodiment the method and apparatus relates to an outdoor cooking apparatus or outdoor burner apparatus that employs a frame that supports a selected burner from a set of different types of burners, such as the set of high pressure and low pressure burner nozzle, wherein a user can remove or install the selected burner type depending upon the type of cooking that is intended.

BRIEF SUMMARY

The apparatus of the present invention solves the problems confronted in the art in a simple and straightforward manner. What is provided is a quick convertible burner type outdoor cooking apparatus having a frame. The frame includes a base for engaging an underlying support surface, a cooking surface for receiving a pot and a wind guard having upper and lower edges and a side wall or walls.

A first removable support bracket removably attaches to the wind guard, the first bracket supporting a low pressure burner element.

A second removable support bracket removably attaches to the wind guard, the second bracket supporting a high pressure burner element. The second removable support bracket includes:

i) a vertically oriented tube with an open ended bore, an upper end opening and a lower end opening, ii) a nozzle supported within the open ended bore, and iii) a fuel supply tube that enables transmission of a gaseous fuel to the nozzle. The second, removable support includes a plate or plates extending from the outer surface of the tube at a position in between the upper end opening and the lower end opening.

In one embodiment, there are a pair of said support plates circumferentially spaced apart from each other.

In one embodiment, the pair of support plates are circumferentially spaced apart from each other about one hundred eighty degrees.

In one embodiment, each pair of support plates is removably attached to the wind guard next to the lower edge of the wind guard.

In one embodiment, the tube lower end opening is positioned below the wind guard lower edge.

In one embodiment, the tube upper end opening is positioned below the wind guard upper edge.

In one embodiment, a support member connects the fuel supply tube to the vertical oriented tube.

In one embodiment, the low pressure burner element has multiple gaseous fuel outlet openings.

In one embodiment, the high pressure burner element has fewer gaseous fuel outlet openings than the low pressure burner element.

In one embodiment, the high pressure burner element has only one gaseous fuel outlet opening.

In one embodiment the method and apparatus relates to an outdoor cooking apparatus or outdoor burner apparatus that employs a frame that supports a selected burner from a set of different types of burners, such as the set of high pressure and low pressure burner nozzles, wherein a user can remove or install the selected burner type depending upon the type of cooking that is intended.

In one embodiment the different type of burners are selected from the set of types of burners consisting of: (a) jet burner; (b) high pressure cast burner; (c) low pressure cast burner; and (d) natural gas burner. In various embodiments two different types of burners are included in a kit for an interchangeable type of outdoor cooker which is packaged for sale. In various embodiments three different types of burners are included in a kit for an interchangeable type of outdoor cooker which is packaged for sale. In various embodiments four different types of burners are included in a kit for an interchangeable type of outdoor cooker which is packaged for sale.

In one embodiment, a specially configured pot support enables either a larger diameter or small diameter pot to be supported, wherein the larger diameter pot is supported at a higher elevation and wherein the lower diameter pot is supported at a lower elevation, wherein bends in the pot supports help to center the smaller diameter pot when it is placed on the pot supports at the lower elevation.

In one embodiment a convertible outdoor cooker kit is provided comprising a frame and two detachably connectable burners, the burners being of different burner types. In one embodiment a set of instructions is provided with the kit, and the instructions contain instructions on how to install the different types of burners on the cooker and the type or category of cooking allowable once a particular type of burner is selected and installed. In one embodiment a booklet with instructions will be provided. The instructions contain directions on how to install the different types of burners on the outdoor cooker and the type or category of cooking allowable once a particular type of burner is selected and installed.

In one embodiment the kit will be packaged for sale with indicia on the exterior of the packaging informing consumers that it includes interchangeable burners.

In one embodiment the kit will be packaged for sale with indicia on the exterior of the packaging informing consumers of various outdoor cooking operations with different foods and different cooking configurations. For example, the indicia can include frying, boiling, steaming, and/or sauteeing.

In one embodiment, the convertible outdoor cooking kit is packaged for sale with no burner mounted on the frame, and at least two burners of different types included in the packaging.

In one embodiment, the convertible outdoor cooking kit is packaged for sale with one of the burners mounted on the frame, and a second burner not attached to the frame, but included in the packaging.

In one embodiment an outdoor cooker kit is provided with a single cooking location comprising a frame and two detachably connectable burners, the burners being of different burner types. In one embodiment a set of instructions is provided with the kit, and the instructions contain instructions on how to install the different types of burners on the cooker and the type or category of cooking allowable once a particular type of burner is selected and installed. In one embodiment a booklet with instructions will be provided. The instructions contain directions on how to install the different types of burners on the outdoor cooker and the type or category of cooking allowable once a particular type of burner is selected and installed.

In one embodiment, the convertible outdoor cooker includes an attachment mechanism so that the non-selected burner can be attached to the frame in a non-cooking position at the same time as the selected burner is mounted in the cooking position to the frame.

In one embodiment, instructions would be provided that the jet burner is not to be used for frying.

In one embodiment, instructions would be provided that the jet burner is not to be used for wok cooking.

In one embodiment a heat shield can be mounted to the jet burner and/or jet burner bracket. In one embodiment, a heat shield can be provided which can mount to the frame.

In one embodiment the kit will include "quick" interchangeable burners. In one embodiment the packaging will include indicia asserting the quickness of interchangeability. In one embodiment the convertible outdoor cooker can be converted between types of cookers by interchanging different types of burners in less than about ½, 1, 1½, 2, 2½, 3, 4, or 5 minutes. In various embodiments the conversion process can be completed between a range of any two of the times specified in this paragraph.

In one embodiment the quick mount/quick disconnect for a selected burner type, when mounted on the frame's at least one mounting point places the selected burner at a depth from the cooking surface which satisfies a particular standard. In one embodiment the standard is promulgated by the American National Standards Institute ("ANSI"). In one embodiment the quick mount/quick disconnect for a different selected burner type, when mounted on the frame's at least one mounting point, places the different selected burner at a different depth from the cooking surface, satisfying a different particular standard from the first selected burner type. In one embodiment the standard is promulgated by ANSI.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 10 shows a perspective view of one embodiment of a kit for a convertible/interchangeable outdoor cooker, the kit including a frame which can be used in an interchangeable outdoor cooker, the frame including a grate; a plurality of legs; a wind guard; a first type of burner with quick connect/disconnect mounting bracket; and a second type of burner with quick connect/disconnect mounting bracket for mounting and removal from the frame, where second type is different from first type of burner; and a set of instructions for installing each of the first or second selected burners type along with types of cooking which can be performed with the first burner type and types of cooking which can be performed with the second burner type;

FIG. 29 shows a cooking pan with the pan being seated between the upper and lower levels of the grate;

FIGS. 30-32 show a heat shield attachment for the frame of FIG. 10 with the burner configuration of FIGS. 15-17. FIGS. 31 and 32 are scale views.

FIGS. 33 and 34 show a heat shield attachment for the frame of FIG. 10 with the burner configuration of FIGS. 18-19.

FIGS. 36, 37, 38 are respectively top perspective, top, and bottom views of the quick connect/disconnect mount with the high pressure cast burner shown in FIG. 50.

FIGS. 42, 43, 44 are respectively top perspective, top, and bottom views of the quick connect/disconnect mount with the jet burner shown in FIG. 41.

FIGS. 48, 49, 50 are respectively top perspective, top, and bottom views of the quick connect/disconnect mount with the low pressure burner shown in FIG. 47.

FIGS. 54, 55 and 56 are respectively top perspective, top, and bottom views of the quick connect/disconnect mount with the natural gas burner shown in FIG. 53.

DETAILED DESCRIPTION

Figure 1:
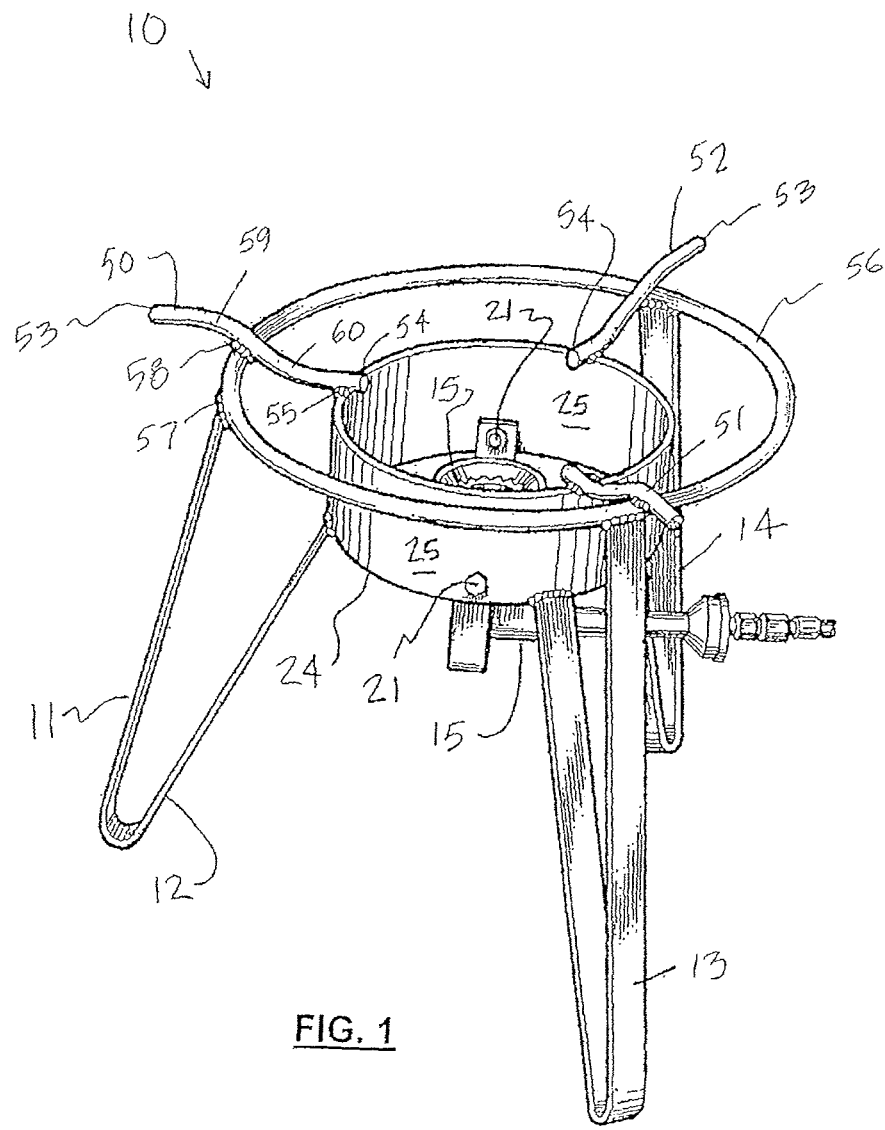
FIG. 1 perspective view of the preferred embodiment of the apparatus of the present invention.

FIGS. 1-9 show a preferred embodiment of the apparatus of the present invention designated generally by the numeral 10. Outdoor cooking apparatus 10 employs a frame 11 having legs 12, 13, 14. Each leg 12, 13, 14 can provide a foot for engaging in underlaying support surface such as an outdoor driveway, slab or other fire resistant, flame resistant surface. Frame 11 includes a wind guard 24 with cylindrical wall 25 for removably holding each of a plurality of burner elements 15 or 40. (See FIGS. 1, 4.) As will be described more fully hereinafter, a user can attach a lower pressure burner element 15 or a high pressure burner element 40 to wind guard 24 depending upon the type of cooking (e.g. frying, boiling) desired.

In FIGS. 1-9, there is provided a wind guard 24 (with cylindrically shaped wall 25) that is able to selectively carry either a lower pressure burner element 15 or a high pressure burner element 40. Other burner elements can be seen in the embodiments of FIGS. 10-58.

In FIGS. 1-3 and 8, there can be seen removable low pressure burner element 15. A high pressure burner element 40 which is also removable is seen in FIGS. 4-6 7 and 9.

Figure 2:
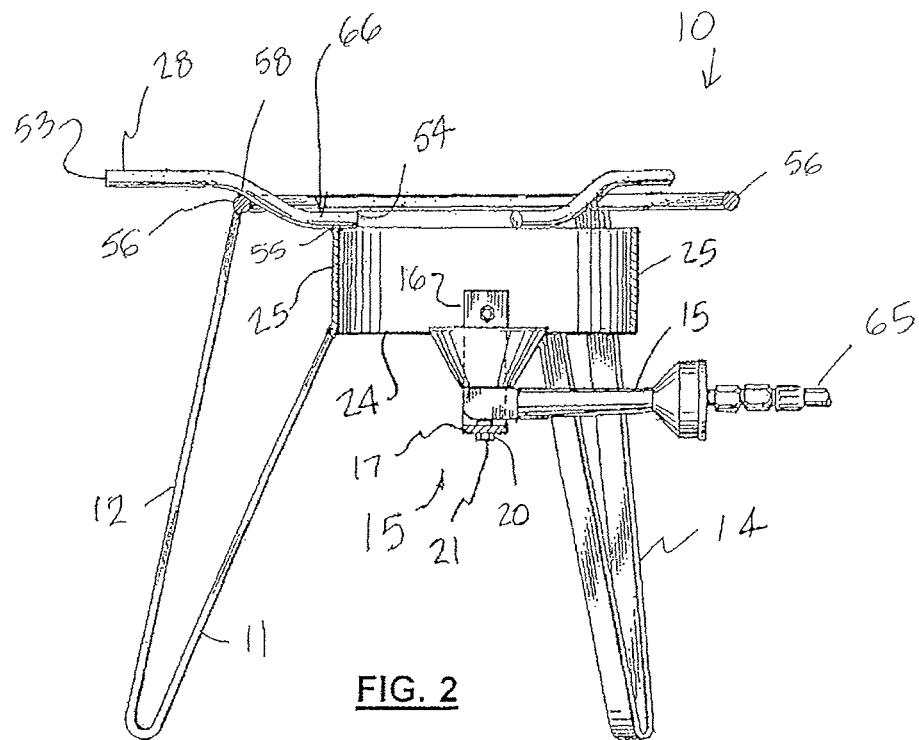
FIG. 2 is a partial sectional perspective view of the preferred embodiment of the apparatus of the present invention.
Figure 3:
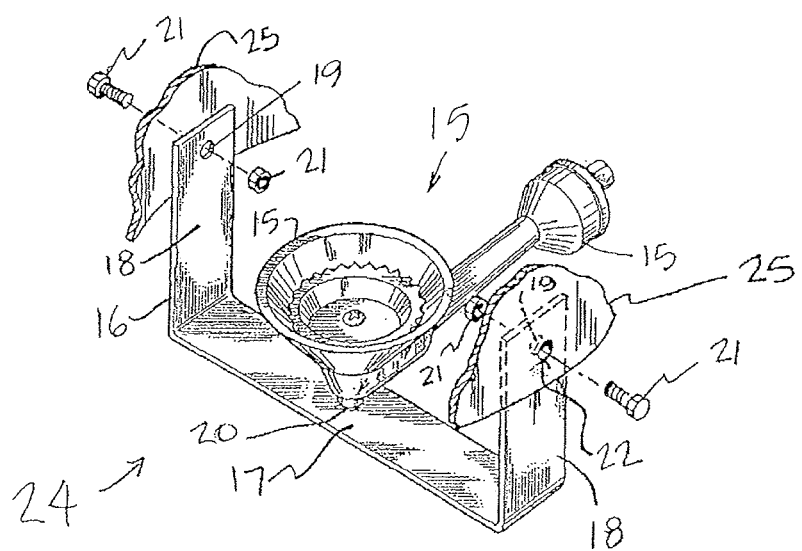
FIG. 3 is a partial perspective cutaway view of the embodiment of FIG. 1.
Figure 8:
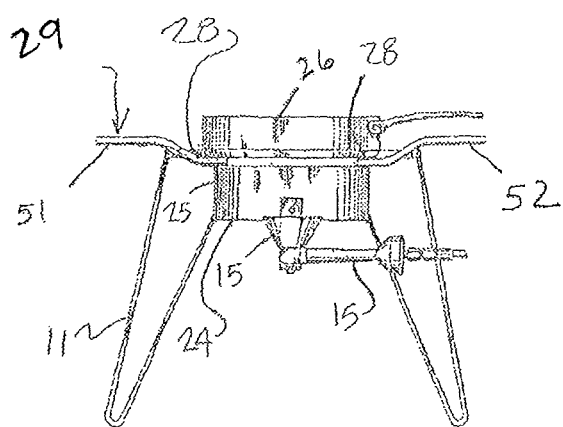
FIG. 8 is an elevation view of the preferred embodiment of the apparatus of the present invention.

In FIGS. 1-3 and 8, a removable burner 15 includes a removable support 16 comprised of horizontal member 17 and a pair of vertical members 18. Each vertical member 18 has an opening 19 that enables the removable burner support 16 and its attached lower pressure burner element 15 to be connected to wind guard 24 using removable fasteners or bolted connections (e.g., bolt and nut) 21 (see FIG. 3). Wind guard 24 has cylindrical wall 25 and wind guard openings 22. Opening 20 on horizontal member 17 enables a connection (using a fastener 21 or bolted connection) to be made that attaches low pressure burner element 15 to horizontal member 17 as shown in FIGS. 2-3, 8.

In FIGS. 1-3 and 8, if the fastener 21 is a bolt, burner element 15 can have an internally threaded opening for connecting with the bolt 21 after the bolt 21 passes through opening 20 in horizontal member 17 (see FIGS. 2-3).

Frame 11 can support a high pressure burner element 40 (see FIGS. 4-9) if element 15 and support 16 are removed from wind guard 24. High pressure burner element 40 can include a tube or pipe section 23 that has an open ended generally vertical bore 41 (see FIG. 5-7). Tube or pipe section 23 thus has a bottom opening 42 and a top opening 43. A pair of horizontal members 44, 45 (see FIG. 6) are attached to tube or pipe section 23 at a position in between bottom opening 42 and top opening 43. The connection of each horizontal member 44, 45 to pipe or tube 23 can be a welded connection. A vertical member is attached to each horizontal member 44, 45. Vertical member 46 attaches to horizontal member 44. Vertical member 47 attaches to horizontal member 45. Each vertical member 46, 47 has an opening 48 or 49. Vertical member 46 has opening 48. Vertical member 47 has opening 49.

The assembly of burner 40 to wind guard 24 is shown in FIGS. 4-6 and 9. Burner element 40 is sized and shaped so that the openings 48, 49 align with openings 22 in wind guard 24. (See FIG. 3.) Multiple removable fasteners or bolted connections 21 can thus be used to selectively attach either the low pressure burner element 15 or the high pressure burner element 40 to the wind guard 24.

Figure 4:
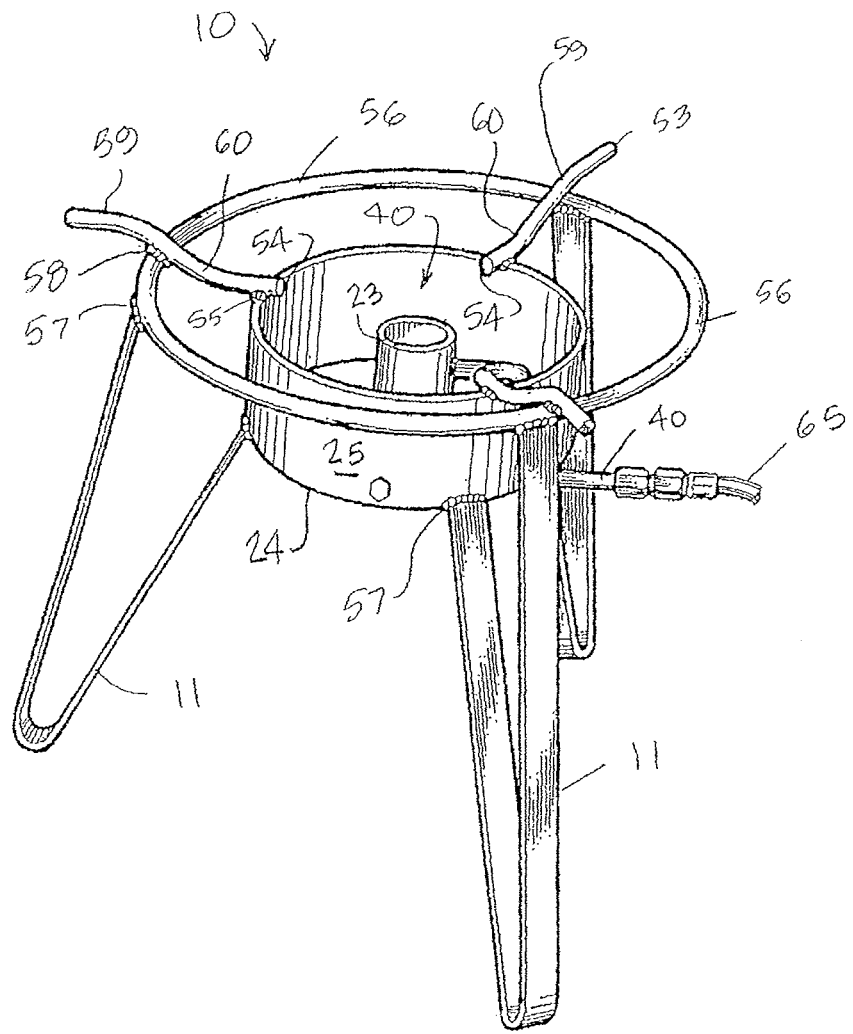
FIG. 4 is a perspective view of the embodiment of FIG. 1.

FIGS. 1 and 4 show burner frame 11 that has legs 12, 13, 14 and pot support members that are specially configured. There are three legs 12, 13, 14 and three pot support members 50, 51, 52. Each pot support member 50, 51, 52 has an outer end portion 53 that is at higher elevation 29 and a lower, inner end portion 54 at elevation 28. Welds or connections 55 can be used to attach the inner, lower end portion 54 of each pot support member 50, 51, 52 to the upper portion of wind guard 24 as shown in FIGS. 1, 2, 4, 5. Frame 11 can include a ring 56 that can be attached at a welded connection or other connection 57 to a leg 12, 13, 14. Ring 56 can be connected to each pot support member 50, 51, 52 using a weld 58 or other connection. Each of the pot support members 50, 51, 52 has a pair of bends. These bends include outer bend 59 and inner bend 60. The outer bend 59 is at a higher elevation 29. The inner bend 60 is at lower elevation 28.

For burner element 40, a fuel supply conduit 61 can be attached at one end portion to a threaded fitting 62. (See FIGS. 5, 7.) For burner element 40 there is provided a nozzle 63 that emits fuel to be burned. Nozzle 63 has nozzle opening 66 for discharging fuel to be burned. Nozzle 63 is located in bore 41 of pipe 23 at a position generally in between the bottom opening 42 and top opening 41 (see FIG. 5). In this fashion, a flame is generated that begins at the nozzle 63 opening 66 and that extends upwardly through bore 41 to top opening 43. Bottom opening 42 allows for the intake of air, thus enabling combustion to take place at the nozzle 63 and within bore 41.

Figure 5:
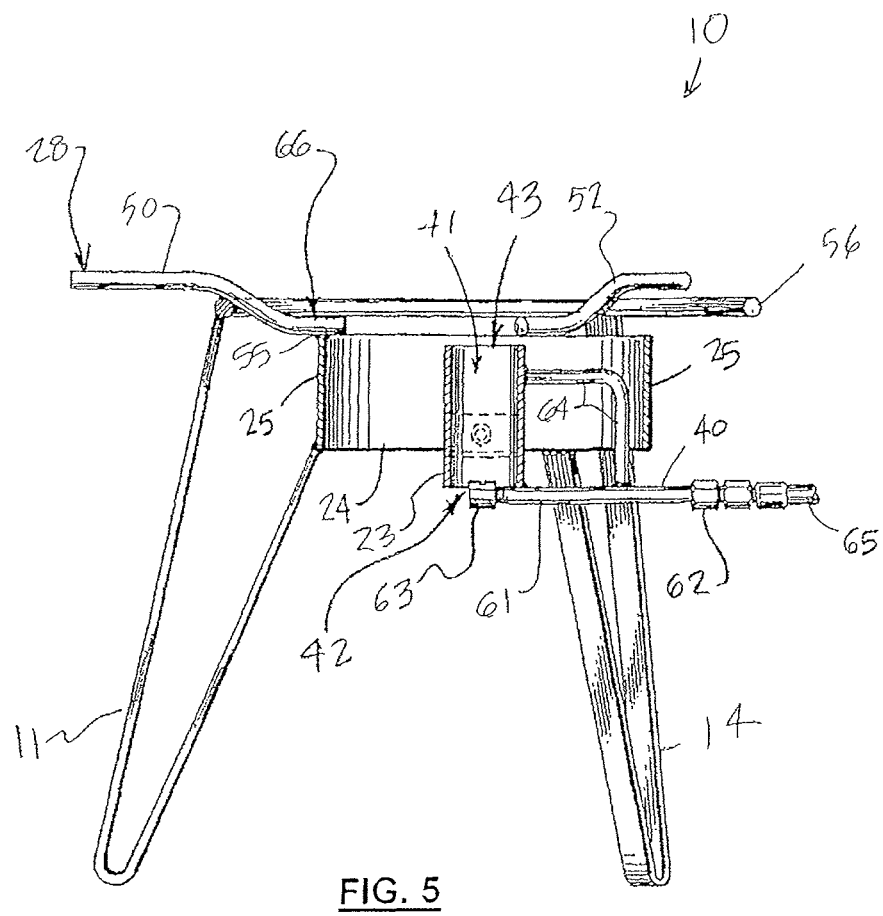
FIG. 5 is a partial perspective sectional view of the preferred embodiment of the apparatus of the present invention.
Figure 6:
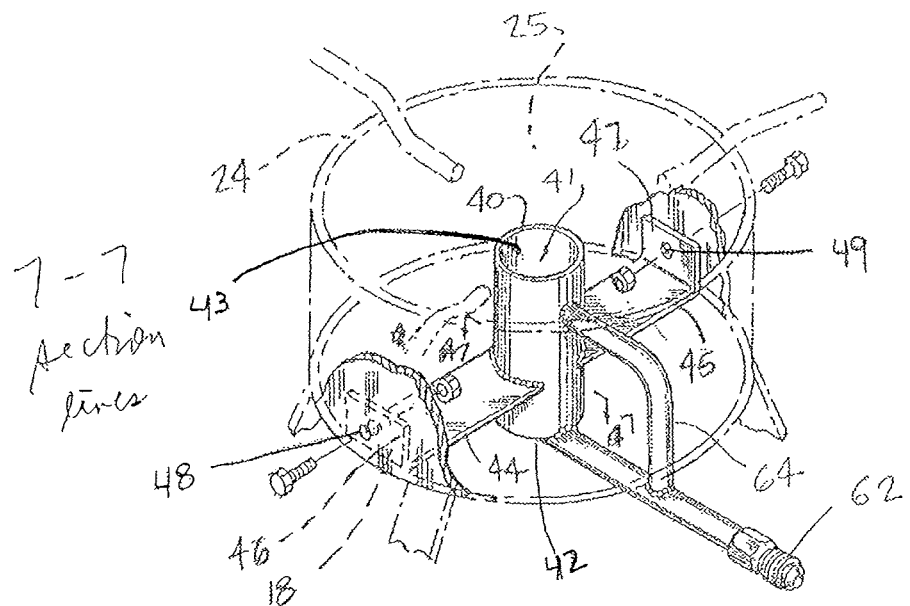
FIG. 6 is a partial perspective view of the preferred embodiment of the apparatus of the present invention showing a high pressure burner element and removable support.
Figure 7:
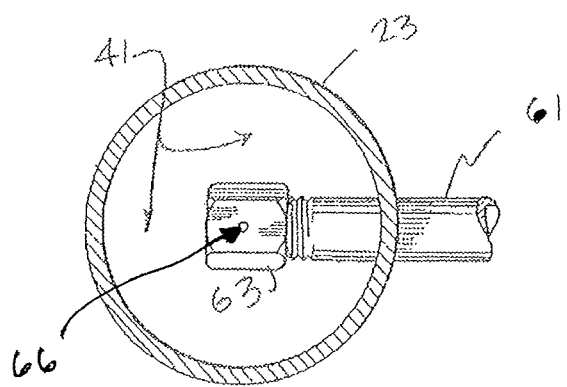
FIG. 7 is a partial section view taken along lines 7-7 of FIG. 6.

Handle or brace 64 extends between pipe 23 and fuel supply conduit 61 as shown in FIGS. 5-6. A hose 65 can be attached to threaded inlet fitting 62. Hose 65 typically connects at one end to a regulator and connector/fitting for forming a connection with a provided fuel canister of propane or butane or other fuel. Such regulators and fittings are commercially available.

Figure 9:
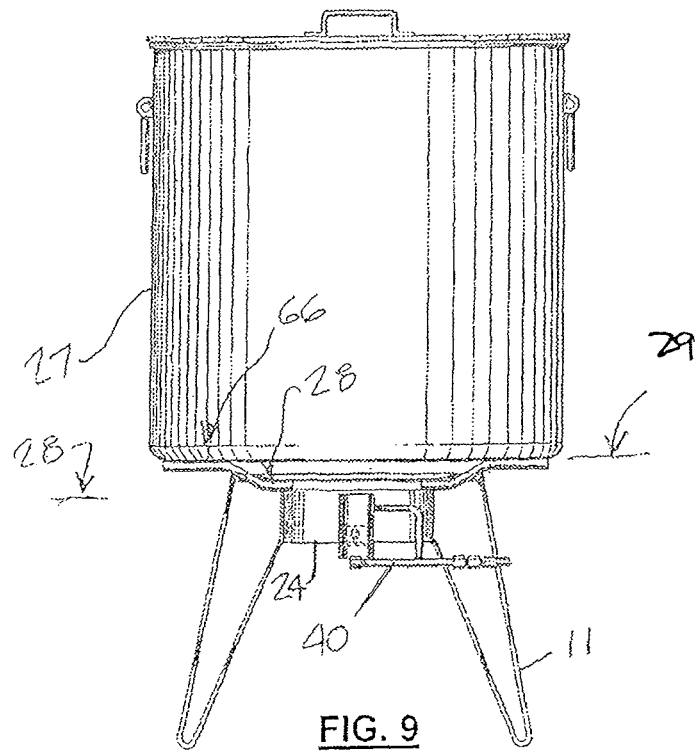
FIG. 9 is an elevation view of the preferred embodiment of the apparatus of the present invention.

FIGS. 8 and 9 illustrate that outdoor cooking apparatus 10 can support smaller diameter pots such as the pan 26 in FIG. 8 which rests at lower elevation 28 of the pot support members 50, 51, 52 or larger diameter pots, such as pot 27 in FIG. 9 which rests at upper elevation 29 of the pot support members 50, 51, 52.

Kit

FIG. 10 shows a perspective view of one embodiment of a kit 90 for a convertible/interchangeable outdoor cooker 10, the kit 90 including a frame 100 which can be used in an interchangeable outdoor cooker 10, the frame 100 including a grate 300; a plurality of legs 140,150,160, and a wind guard 200, a first type of burner 400 with quick connect/disconnect mounting bracket 405; second type of burner 500 with quick connect/disconnect mounting bracket 505 for mounting and removal from the frame 100, where second type 500 is different from first type 400 of burner. A kit 90 will also include a set of instructions 1100 for installing each of the first 400 or second 500 selected burners type along with types of cooking which can be performed with the first burner 400 type and types of cooking which can be performed with the second burner 500 type.

In one embodiment a kit 90 will be packaged for sale with indicia or advertisements 1300 on the exterior of the packaging 1200 informing consumers that the kit 90 includes a convertible outdoor cooker 10 with a plurality of interchangeable burner types.

In one embodiment a kit 90 for a convertible outdoor cooker 10 is provided comprising a frame 100 with a single cooking surface and at least two detachably connectable burner types, the burners being of different burner types.

In one embodiment a set of instructions 1100 is provided with the kit 90, and the instructions 1100 contain instructions on how to install the different types of burners on the cooker 10 and the type or category of cooking allowable once a particular type of burner is selected and installed.

In one embodiment a booklet with instructions 1100 will be provided containing instructions on converting the convertible outdoor cooker 10 between different types of burners, including attaching and detaching the different types of burners in the kit 90 on the frame 100 and the type or category of cooking allowable once a particular type of burner is selected and installed.

In one embodiment a kit 90 will be packaged for sale with indicia or advertisements 1300 on the exterior of the packaging 1200 informing consumers of the convertibility of the cooker 10 between different types of burners/cookers and/or that the kit 90 includes different types of, but interchangeable, burners.

In one embodiment a kit 90 will be packaged for sale with indicia or advertisements 1300 on the exterior of the packaging 1200 informing consumers of various outdoor cooking operations with different foods and different cooking configurations. For example, the indicia can include frying, boiling, steaming, and/or sauteeing.

In one embodiment, the convertible outdoor cooker kit 10 can be packaged for sale with no burner mounted on the frame 100, and at least two burners of different types included in the packaging 1200.

In one embodiment, the convertible outdoor cooker kit 90 is packaged for sale with one of the burner types (e.g., 400) mounted on the frame 100, and a second burner type 500 not attached to the frame 100, but included in the packaging 1200.

In one embodiment the kit 90 will include a plurality of "quick" interchangeable burner types. In one embodiment the packaging will include indicia or advertisements 1300 asserting the quickness of interchangeability. In one embodiment the convertible outdoor cooker 10 can be converted between types of cookers by interchanging different types of burners in less than about ½, 1, 1½, 2, 2½, 3, 4, or 5 minutes. In various embodiments the conversion process can be completed between a range of any two of the times specified in this paragraph.

In one embodiment, a convertible outdoor cooker kit 90 includes an attachment mechanism so that the non-selected burner type can be attached to the frame 100 in a non-cooking position at the same time as the selected burner type is mounted to the frame 100 in the cooking position.

In one embodiment, instructions 1100 would be provided that the jet burner 500 type is not to be used for frying. In one embodiment, instructions 1100 would be provided that the jet burner 500 type is not to be used for wok cooking Structure Cooking apparatus 10 employs a frame 100 having legs 140, 150, 160, which can be cross braced using braces. Frame 100 can include a wind guard 200 (e.g. cylindrically shaped) that is able to selectively carry a first burner type 400 (e.g., high pressure cast) or a second burner type 500 (e.g., jet burner). The plurality of legs 140, 150, 160 can support a cooking surface or grate 300. (See FIG. 10.)

Frame

Figure 11:
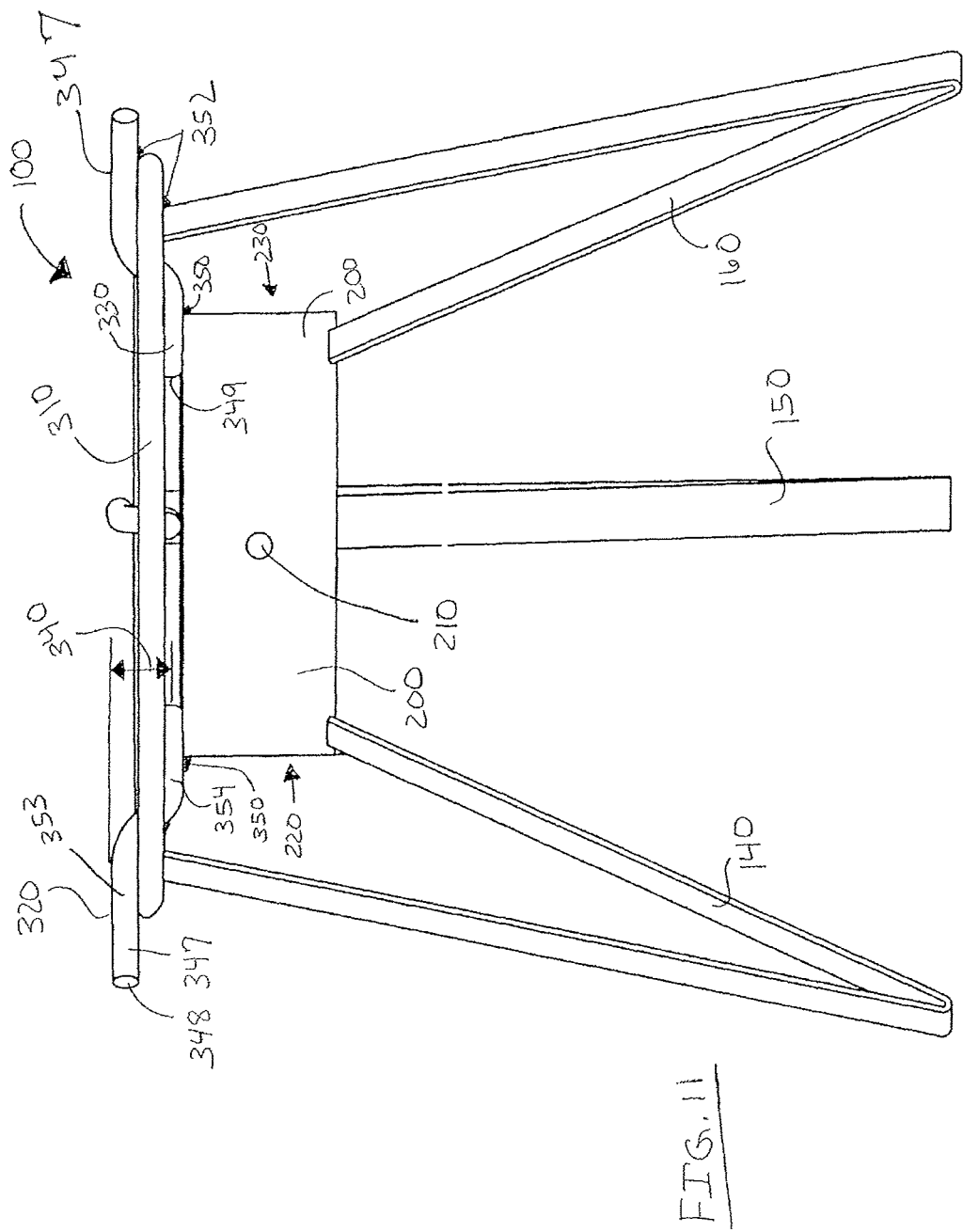
FIG. 11 shows a perspective view of one embodiment of a frame which can be used in an interchangeable outdoor cooker, the frame including a grate; a plurality of legs, and a wind guard.
Figure 12:
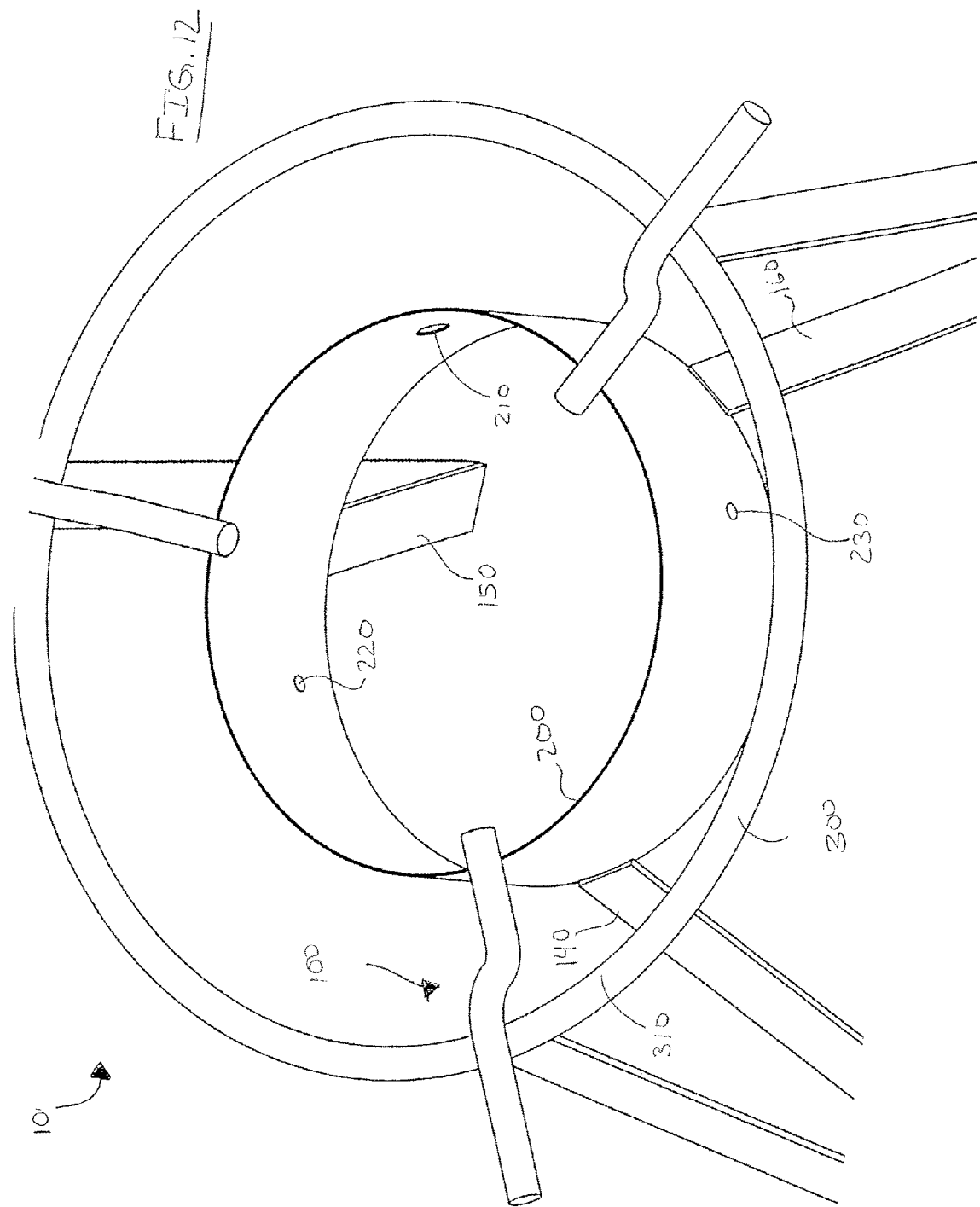
FIG. 12 is a top perspective view of the frame of FIG. 11.
Figure 13:
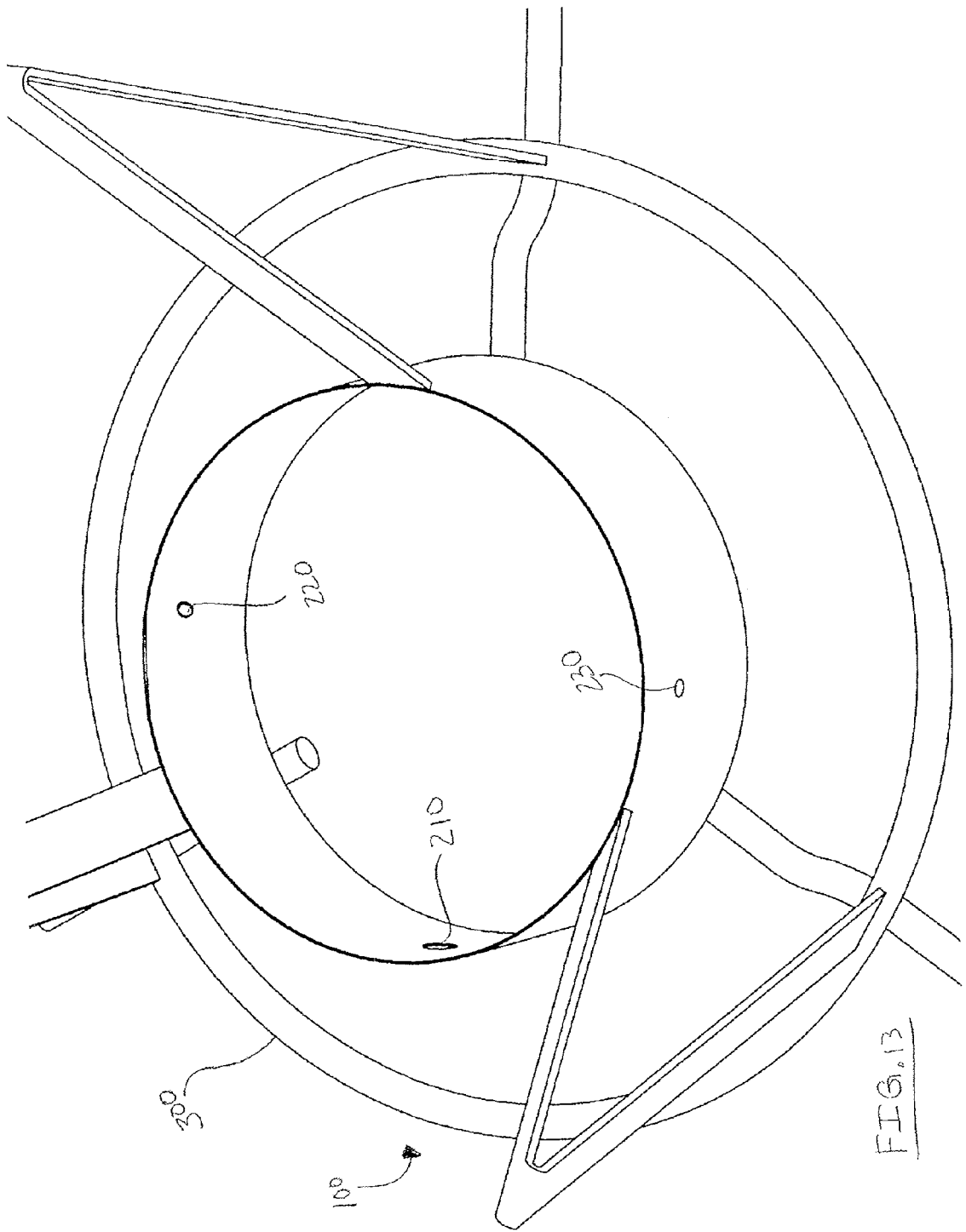
FIG. 13 is a bottom perspective view of the frame of FIG. 11.

FIG. 11 shows a perspective view of one embodiment of a frame 100 which can be used in an interchangeable outdoor cooker 100, the frame including a grate 300; a plurality of legs 140,150,160, and a wind guard 200. FIG. 12 is a top perspective view of the frame 10. FIG. 13 is a bottom perspective view of the frame 100.

In one embodiment the frame 100 includes a plurality of legs. In one embodiment the frame includes three or four legs.

In various embodiments, grate 300 and/or frame 100 can be of various shapes. For example, different shapes can be round, square, diamond, rectangular, along with other shapes. However, for any non-symmetrical shape, the risk of tipping over of a pot on the grate should be considered.

Grate 300 can include upper 320 and lower 330 cooking levels, and be comprised of a plurality of pot support members 347. The distance between upper and lower levels is shown by arrow 340 in FIG. 11. In FIG. 11 there are three pot support members 347. Each pot support member 347 can have an outer end portion 348 that is at a higher elevation and a lower inner end portion 349 (thereby providing the two cooking levels 320, 330). Welds or connections 350 can be used to attach the inner, lower end portion 349 of each pot support member 347 to the upper portion of wind guard 200 as shown. Frame 100 or grate 300 can include a reinforcement member such as a ring 310 that can be attached at welded connection or other connection 352 to both a leg 140, 150, 160 and a pot support member 347 as shown.

Each of the pot support members 347 has a pair of bends. These include outer bend 353 and inner bend 354. The outer bend 353 is at a higher elevation. The inner bend 354 is at lower elevation.

In one embodiment, a specially configured pot support (e.g., upper 320 and lower 330 of grate 300) enables either a larger diameter or small diameter pot to be supported, wherein the larger diameter pot is supported at a higher elevation and wherein the lower diameter pot is supported at a lower elevation, wherein bends in the pot supports help center the smaller diameter pot when it is placed on the pot supports at the lower elevation.

In one embodiment, the largest size of pot (diameter) that fit completely in the lower level is less than about 9 inches in diameter.

In one embodiment, a pot between 9 and 14 inches in diameter will sit on grate 300 at a level between the upper 320 and lower 330 levels.

In one embodiment, the smallest size of pot (diameter) that will be kept at the upper level 320 is greater than about 14 inches in diameter.

In one embodiment, the difference in height from the upper level 320 to the lower level is about 1.5 inches.

In one embodiment two attachment points 220, 230 are provided with the frame 100. In one embodiment the two attachment points 220, 230 are included in the wind guard 200. (See FIGS. 11-13.)

Different Burner Types

As will be described herein, a plurality of different types of burners (e.g., 400, 500, 600, 700, etc.) can be interchangeably connectable to a frame 100 to convert cooker 10 between and/or to different types of outdoor cookers. Some of the different types of interchangeable burners are described below.

Figure 14:
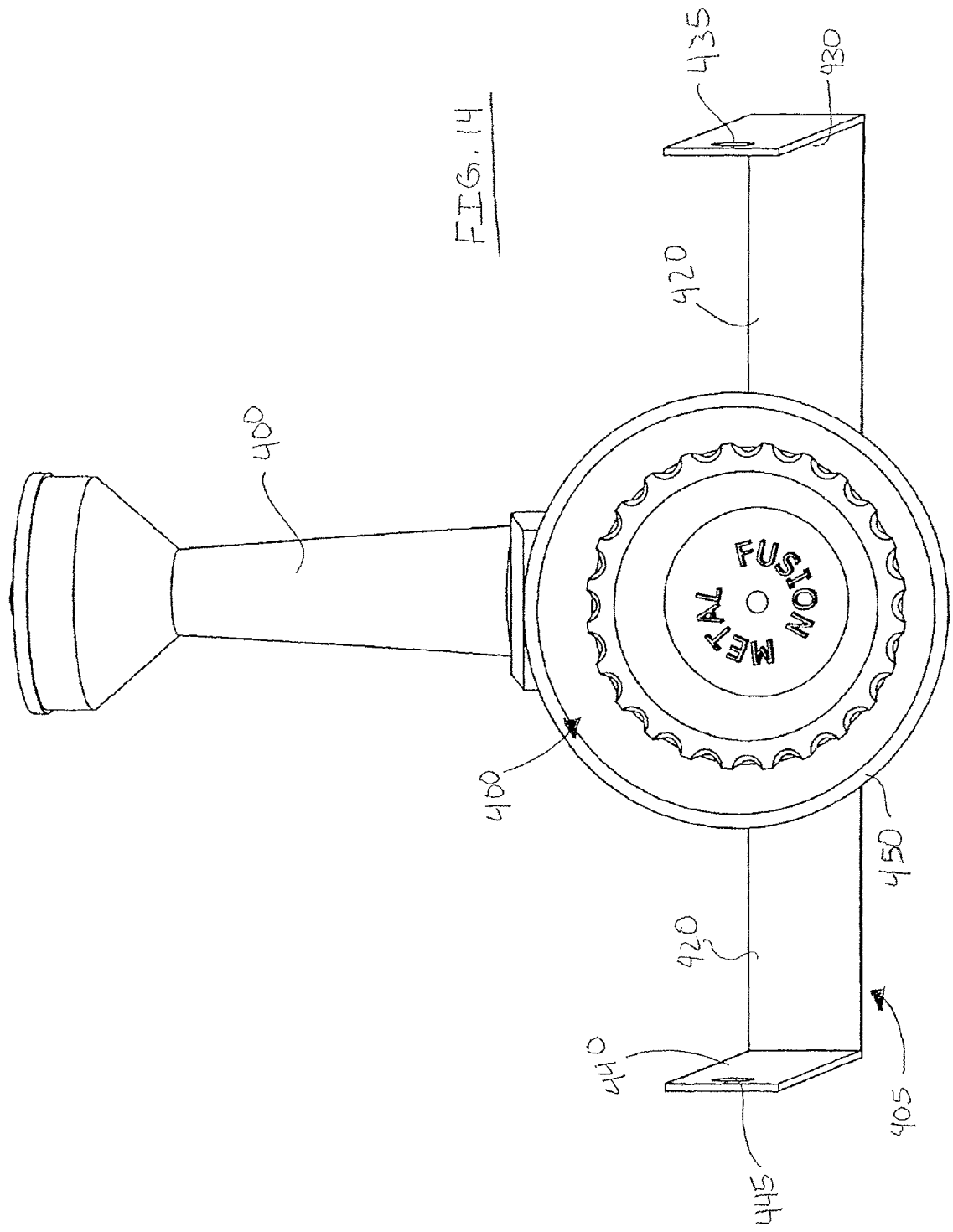
FIG. 14 shows a first type of burner with quick connect/disconnect mounting bracket where the first type is a cast burner.

FIG. 14 shows a first type of burner 400 with quick connect/disconnect mounting bracket. FIG. 14 shows a first type of burner 400 with quick connect/disconnect mounting bracket 405 where the first type is a high pressure cast burner. In FIG. 14, there can be seen a removable high pressure cast burner element 400. In FIG. 14, a removable burner support 405 includes a horizontal member 420, a pair of vertical members 430, 440, and a top 450. Each vertical member 430, 440 has an opening 435, 445 that enables the removable burner support 405 and its attached burner element 400 to be connected to wind guard 200 using removable fasteners or bolted connections 470, 480.

Figure 60:
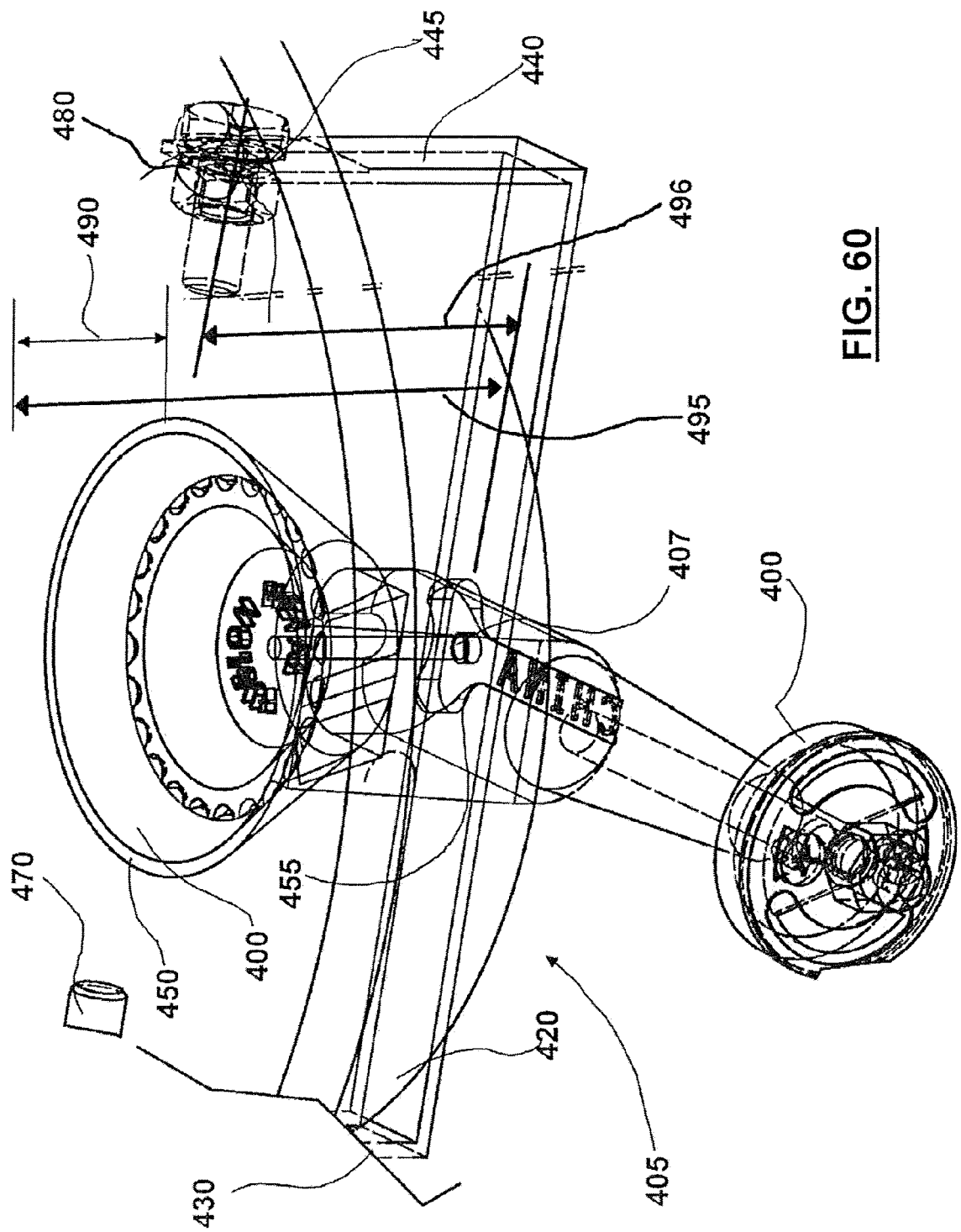
FIG. 60 is an exploded view of the high pressure cast burner of FIG. 14

Wind guard 200 has wind guard openings 220, 230. Opening 407 on horizontal member 420 enables a connection (using a fasteners or bolted connection) to be made that attaches burner element 400 to horizontal member 420 as shown in FIGS. 14, 60.

Various different types of attachment mechanisms for quick connect 405 and frame 100 can be used beyond threaded fasteners. For example, possible different types of attachment mechanisms for brackets for different types of burners can be bolts, clips, clamps, bolt one side/clip other, bolt one side/clamp other, etc.

Figure 15:
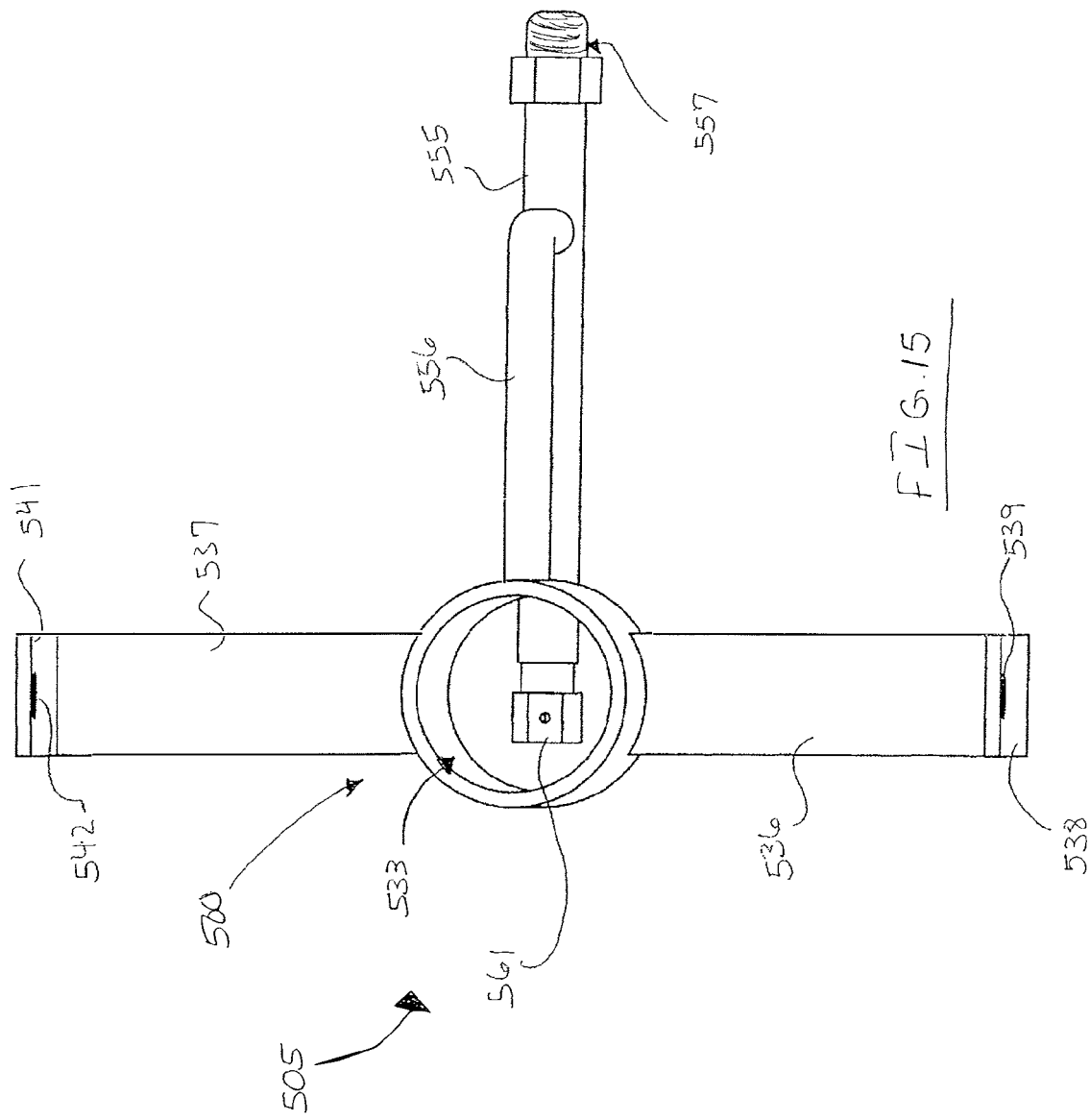
FIG. 15 shows a second type of burner with quick connect/disconnect mounting bracket for mounting and removal from the frame, where second type is different from first type of burner, and where the second type is a jet burner (high pressure jet)
Figure 16:
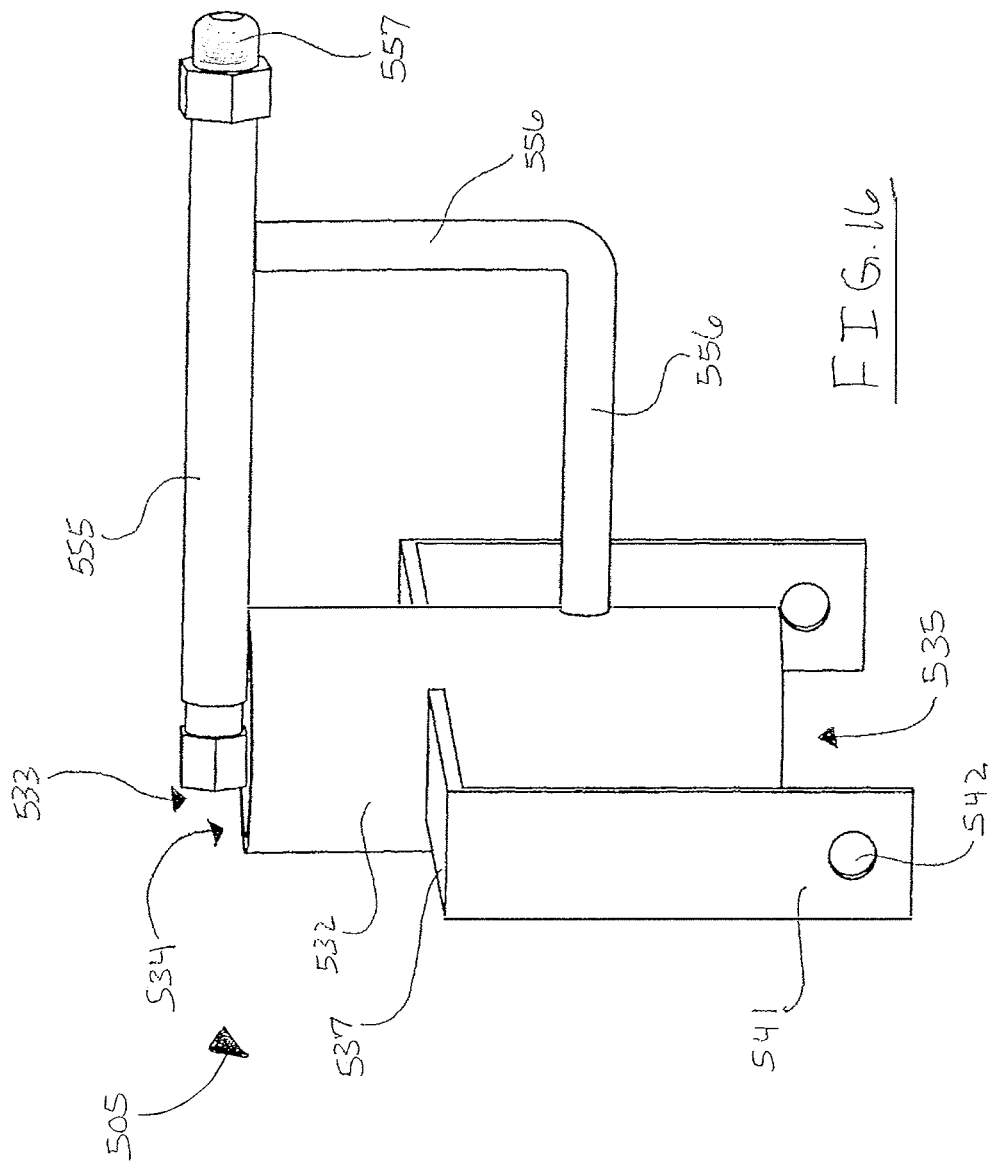
FIGS. 16-17 show the second type of burner.
Figure 17:
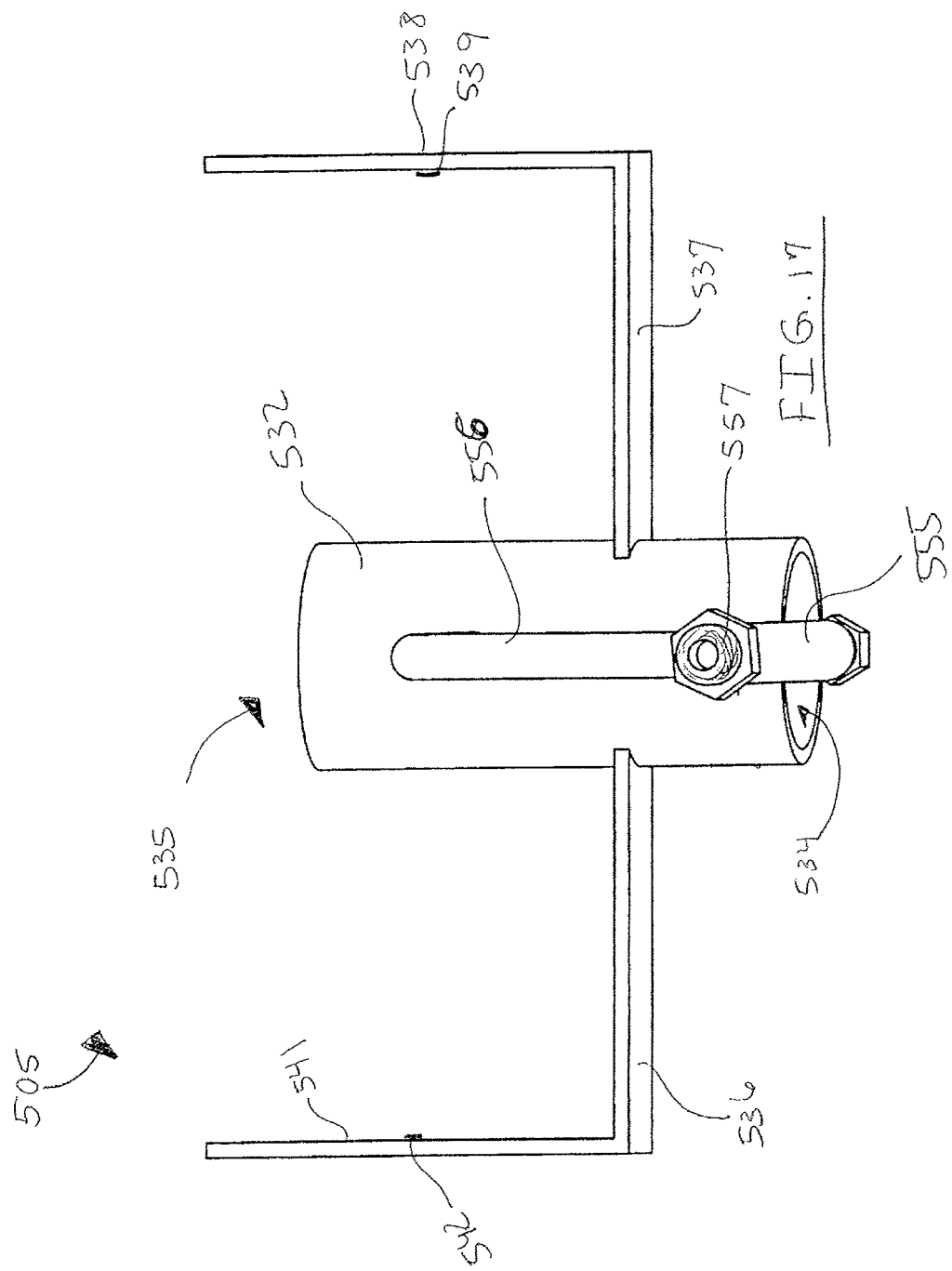

A second type of burner 500 with high pressure jet burner element which is also removable is seen in FIGS. 15-17. As shown in FIG. 10, both of these different types of burners 400, 500 can be included in kit 90 to make outdoor cooker 10 interchangeable regarding burner types. Either of the removable burners 400, 500 can be used with outdoor cooking apparatus 10.

FIGS. 15-17 show a second type of burner 500 with quick connect/disconnect mounting bracket 505 for mounting and removal from the frame 100, where second type of burner 500 is different from first type of burner 400, where the second type 500 is a jet burner (high pressure jet). In FIGS. 15-17, removable mounting bracket 505 (quick connect/disconnect removable burner support) is used to support a high pressure burner element 500. High pressure burner element 500 can include a tube or pipe section 532 that has an open ended generally vertical bore 533. Tube or pipe section 532 thus has a bottom opening 534 and a top opening 535.

A pair of horizontal members 536, 537 are attached to tube or pipe section 532 at a position in between top opening 535 and bottom opening 534. The connection of each horizontal member 536, 537 to pipe or tube 532 can be a welded connection. A vertical member 538, 541 is attached to each horizontal member 536, 537. Vertical member 538 having opening 539 is attached to horizontal member 536. Also shown is removable burner support. 540. Similarly, vertical member 541 having opening 542 is attached to horizontal member 537.

Fuel supply conduit 555 is attached at one end portion to a threaded fitting 557. Its other end portion provides a nozzle that emits fuel to be burned which is located in bore 533 of pipe 532 at a position generally in between the lower opening 534 and upper opening 535. In this fashion, a flame is generated that begins at the nozzle and that extends upwardly through opening 535. Lower opening 534 enables the intake of air for enabling combustion to take place at the nozzle. Nozzle 561 and nozzle fuel discharge opening 562 are shown in FIGS. 15, 43 and 44.

Handle or brace 556 extends between pipe 532 and fuel supply conduit 555 as shown in FIGS. 15-17. A hose 958 can be attached to threaded fitting 557. Hose 958 typically connects at one end to a regulator 959 and connector/fitting 960 for forming a connection with a provided fuel canister of propane or butane or other fuel, as shown in FIG. 10.

Various different types of attachment mechanisms can be used beyond threaded fasteners. For example, possible different types of attachment mechanisms for brackets for different types of burners can be bolts, clips, clamps, bolt one side/clip other, bolt one side/clamp other, etc.

Figure 18:
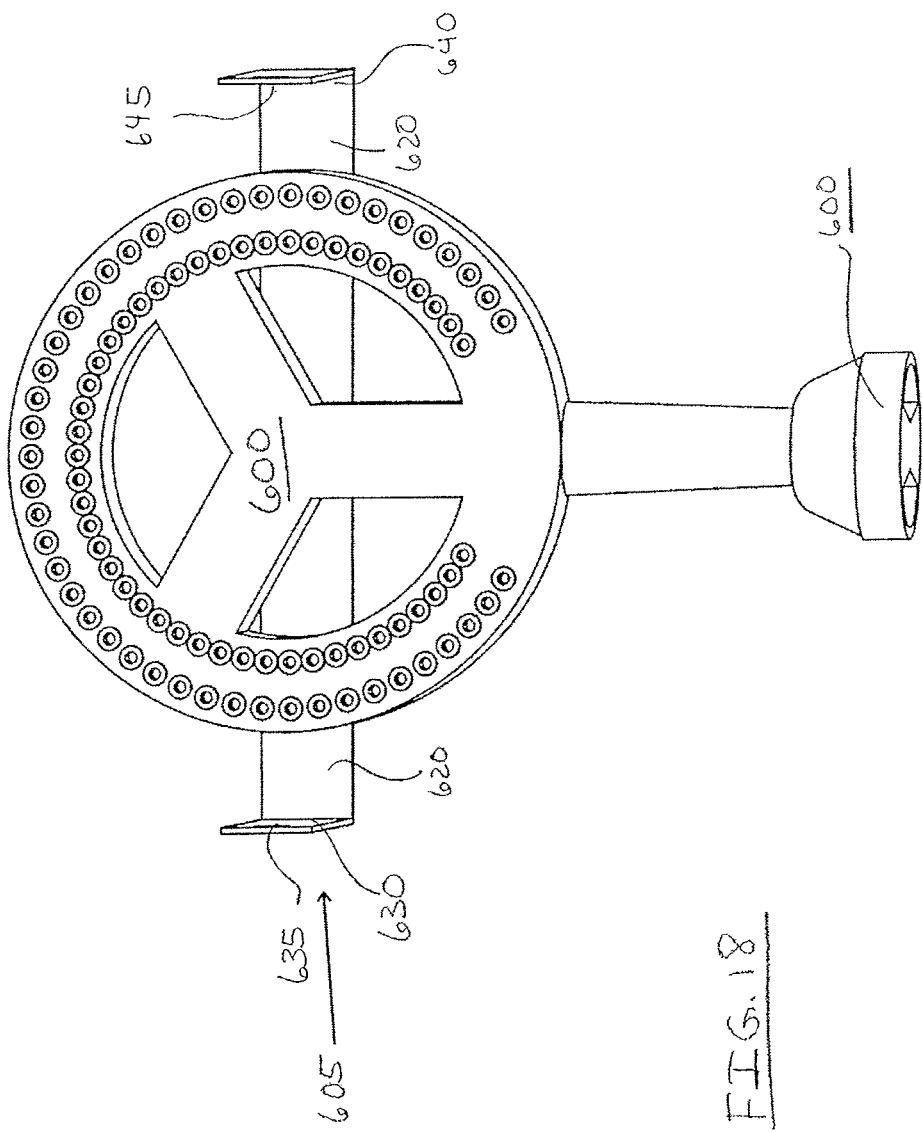
FIG. 18 shows a third type of burner with quick connect/disconnect mounting bracket for mounting and removal from the frame, where third type is different from the first and second types of burners, and where the third type is a low pressure cast burner.
Figure 19:
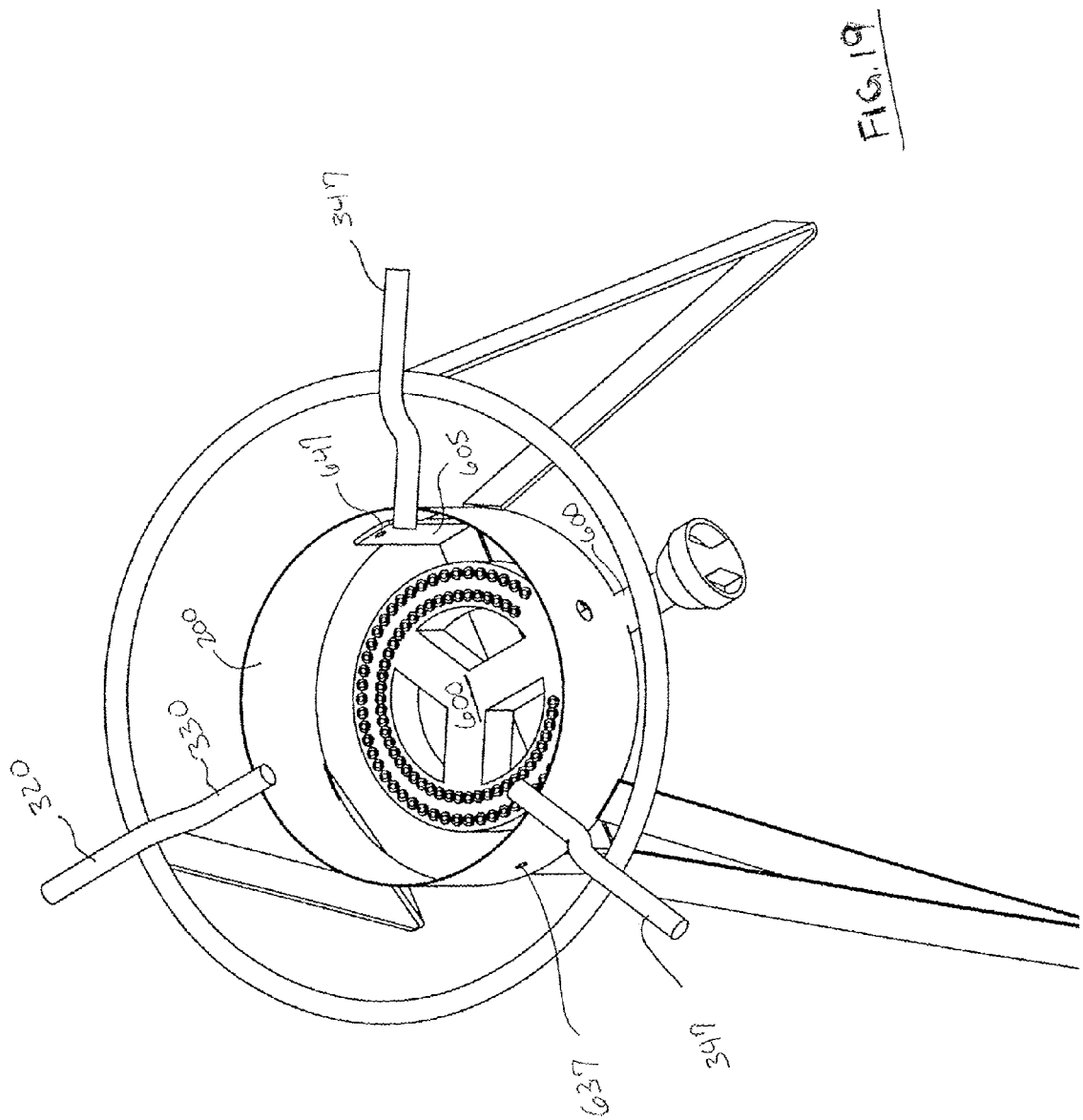
FIG. 19 is partial perspective view of the preferred embodiment of the apparatus of the present invention showing a frame and low pressure cast pressure burner.

FIG. 18 shows a third type of burner element 600 with quick connect/disconnect mounting burner support or bracket 605 for mounting and removal from the frame 100, where third type 600 is different from the first 400 and second 500 types of burners, where the third type 600 is a low pressure cast burner (e.g., cast iron burner element).

FIG. 18 shows a third type of burner 600 with quick connect/disconnect mounting bracket 605. In FIG. 18, there can be seen a removable high pressure cast burner element 600. In FIG. 18, a removable burner support 605 includes a horizontal member 620 and a pair of vertical members 630, 640. Each vertical member 630, 640 has an opening 635, 645 that enables the removable burner support 605 and its attached burner element 600 to be connected to wind guard 200 using removable fasteners or bolted connections 637, 647 670, 680. (See FIG. 19, 61.)

Figure 61:
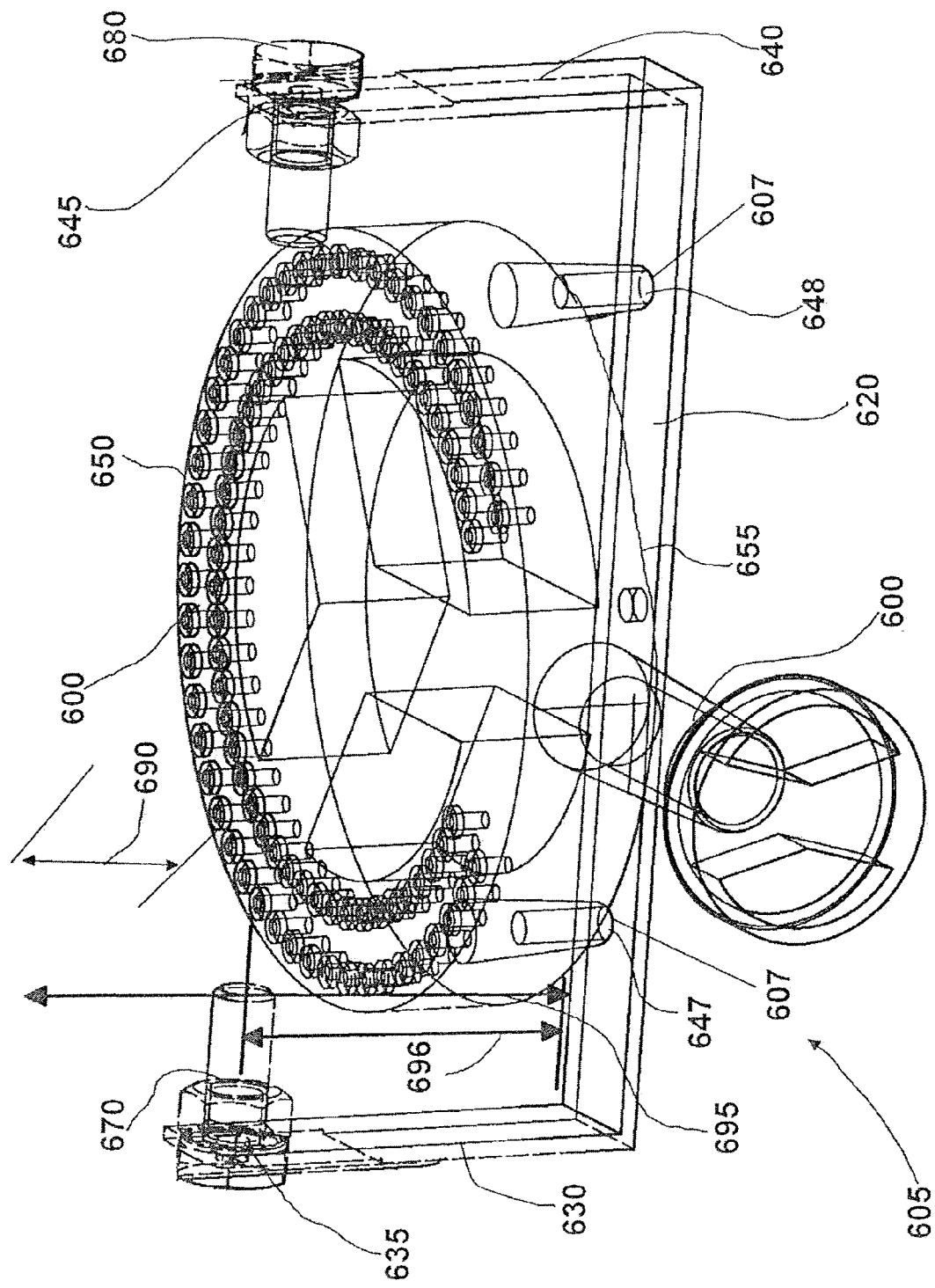
FIG. 61 is an exploded view of the low pressure cast burner of FIG. 18.

Wind guard 200 has wind guard openings 220, 230 (see FIG. 13). Openings 607 on horizontal member 620 enables a connection (using a fasteners or bolted connection) 637, 647, 648 to be made that attaches burner element 600 to horizontal member 620 as shown. (See FIGS. 19, 61.) In one embodiment, a low pressure burner can be considered a burner accepting 1 pound per square inch pressure of fuel supply gas or less. In one embodiment, a low pressure burner can be considered a burner accepting 2 pounds per square inch pressure of fuel supply gas or less.

In one embodiment, a high pressure burner can be considered a burner accepting 10 pounds per square inch pressure of fuel supply gas or more.

Quick Conversion Process

In one embodiment the kit 90 will include a plurality of "quick" interchangeable burners (e.g., 400, 500). In one embodiment the packaging 1200 will include indicia or advertisements 1300 asserting the quickness of interchangeability.

In one embodiment the convertible outdoor cooker 10 can be converted between types of cookers by interchanging different types of burners in less than about ½, 1, 1½, 2, 2½, 3, 4, or 5 minutes. In various embodiments the conversion process can be completed between a range of any two of the times specified in this paragraph.

FIGS. 60, 35-40 show example assembly steps for one of the selected burners 400—in these figures the first type of burner is shown being attached to the frame 100 where frame 100 includes a set of attachment points 220, 230.

The assembly of quick connect/disconnect burner support 405 is shown. Support 405 is sized and shaped so that the openings 435, 445 align with openings 220, 230 in wind guard 200. Similarly, the openings 539, 542 and the vertical members 538, 541 of quick connect/disconnect of jet removable burner support 505 align with openings 220, 230 and wind guard 200. (See FIGS. 41-46, 59.) In this fashion multiple removable fasteners and bolted connections can be used to selectively attach different burner types—such as the high pressure cast burner support 405 (and its burner element 400) or the jet removable burner support 505 to a selected one of the wind guards 200.

Figure 35:
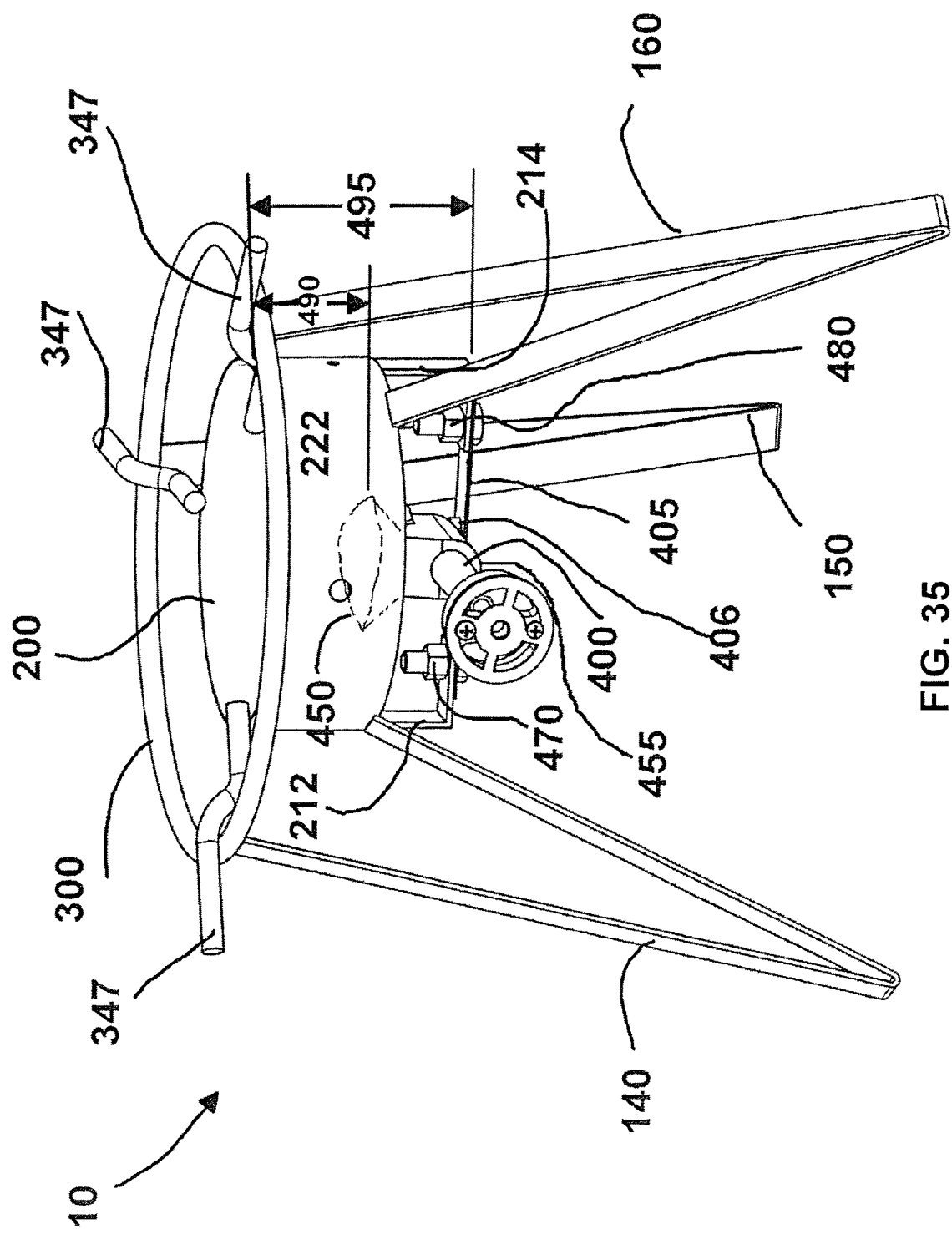
FIG. 35 shows an alternative quick connect/disconnect mount with high pressure cast burner mounted on an outdoor cooker having an alternative detachable/attachment arrangement to the wind guard.
Figure 39:
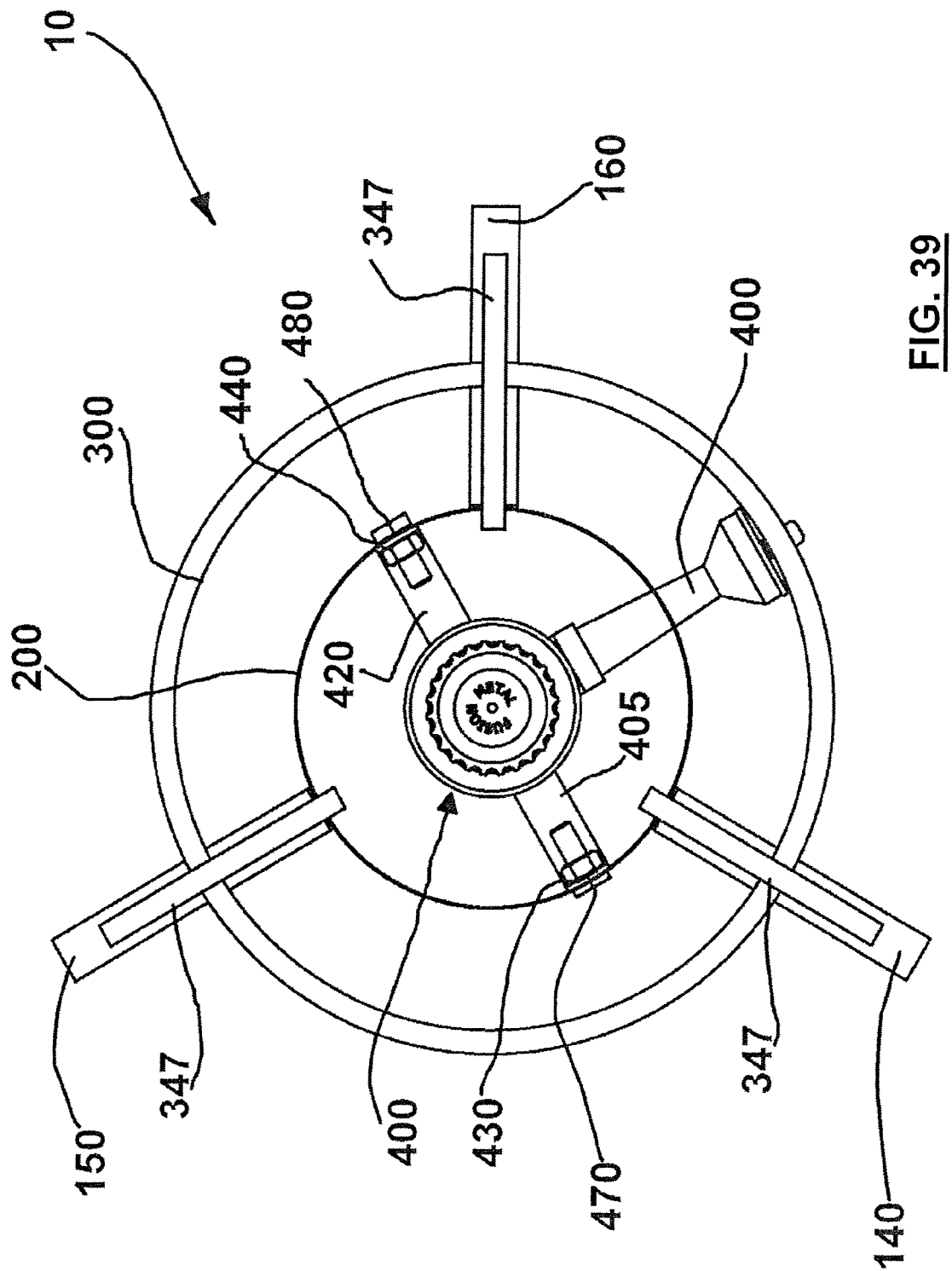
FIGS. 39 and 40 are top and bottom views of the outdoor cooker with alternative quick connect/disconnect mounting bracket mounted onto an outdoor cooker shown in FIG. 35.
Figure 40:
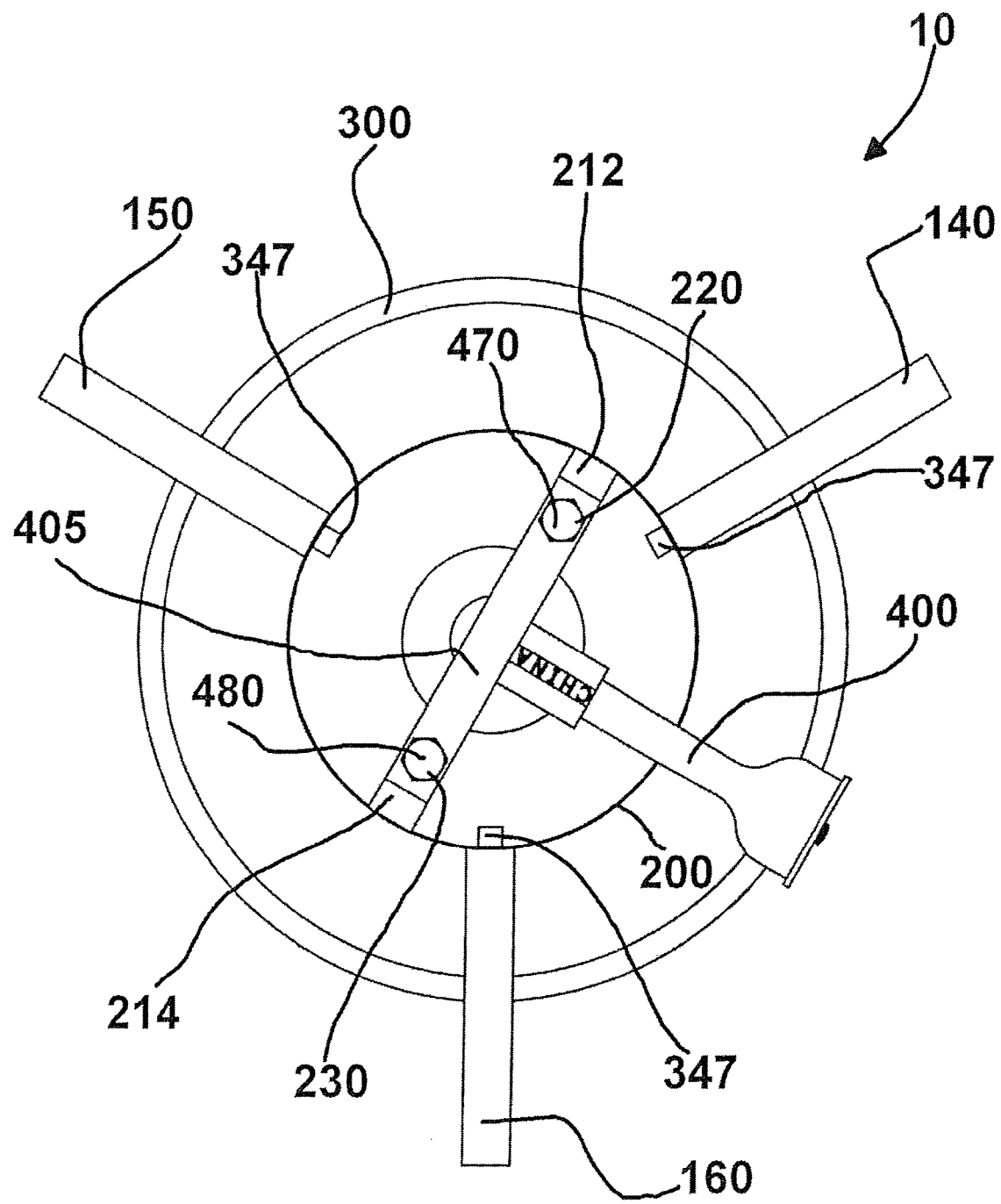
Figure 41:
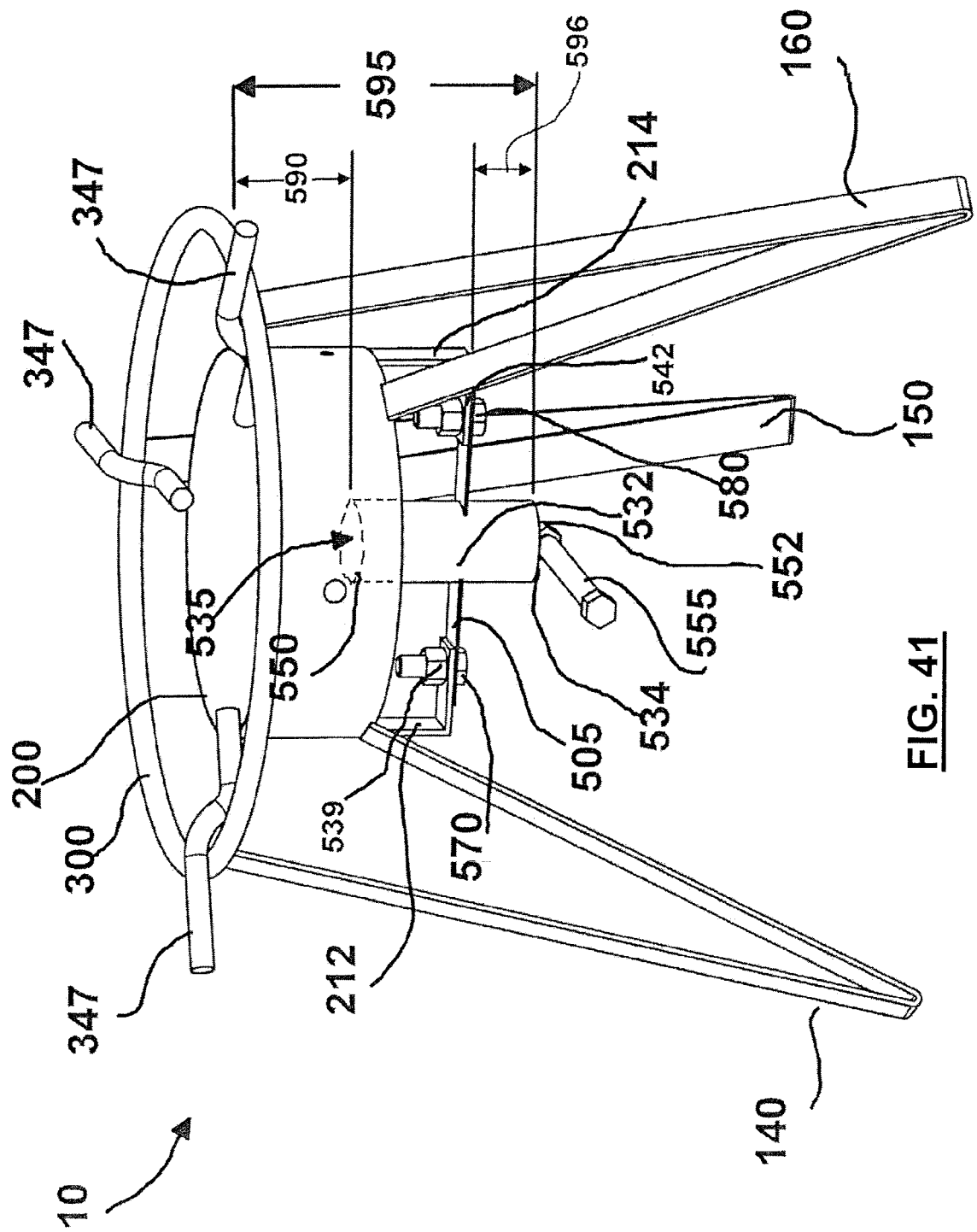
FIG. 41 shows an alternative quick connect/disconnect mount with jet burner mounted on an outdoor cooker having an alternative detachable/attachment arrangement to the wind guard.

FIGS. 35, 39-40 shows burner type 400 mounted on quick mount 405 and quick mount 405 being attached to frame 100 (on wind guard through attachment points 220, 230). In FIGS. 35, 39-40, vertical arm 440 has been attached to attachment point 230 (using fastener 480), and vertical arm 430 is attached to attachment point 220. FIG. 40 shows fastener 470 inserted through attachment point 220 (of wind guard 200) and opening 445 of vertical member 440. Height adjusting spacer 406 is also shown in FIG. 35. FIG. 35 shows burner 400 mounted on frame 100 using quick mount 405. Burner 400 now has a height 490 from its top 450 to the desired cooking level (e.g., 320) along with a height 495 from its bottom 455 to the desired cooking level (e.g., 320).

Various different types of attachment mechanisms can be used beyond threaded fasteners. For example, possible different types of attachment mechanisms for brackets for different types of burners can be bolts, clips, clamps, bolt one side/clip other, bolt one side/clamp other, etc.

In one embodiment the difference in height from the top of the selected burner type after being attached to the preferred cooking level is controlled by the attachment bracket.

In one embodiment, after mounting, the height difference between the top of the first burner 400 (as a high pressure cast burner) and the lower level 330 is about 2¾ inches.

In one embodiment, after mounting, the height difference between the top of the second burner 500 (as a jet burner) and upper level 320 is about 2 inches.

In one embodiment, after mounting, the difference in height between the top of the selected burner and the preferred cooking level is about ¼, ½, ¾, 1, 1, 1¼, 1½, 2, 2¼, 2½, 2¾, 3, 3¼, 3½, 3¾, 4, 4¼, 4½, 4¾, or 5 inches. In various embodiments the difference in height is between a range of any two of the differences specified in this paragraph.

Method Steps of Conversion

In one embodiment is provided a method of constructing a selected burner type of outdoor cooker from a kit for a convertible outdoor cooker, the method comprising the steps of:

(a) purchasing a kit for an outdoor cooker convertible between a plurality of different cooking types of outdoor cookers, the kit being packaged for sale;
  (i) the kit including a frame having a cooking surface and at least one quick connect/quick disconnect mounting point;
  (ii) a plurality of different burner types, each burner type having a burner top and bottom, along with a quick connect/quick disconnect mount which mounts on the frame via the frame's at least one mounting point;
  (iii) wherein, after mounting of a selected burner with the selected burner's quick connect/quick disconnect mount to the frame's at least one mounting point, the top of the selected burner will be at a predetermined distance from the cooking surface, the predetermined distance for selected burner being different from the predetermined distance for at least one of the other burners in the kit;
  (iv) a set of conversion instructions outlining the connection and disconnection of each of the burners in the kit;
  (v) a set of cooking instructions outlining the types of cooking which can be performed with each of the types of burners in the kit;
(b) choosing a type of outdoor cooking and, based on the chosen type of outdoor cooking, using the instructions to select a burner type from the set of different burner types included in the kit;
(c) using the instructions to attach the selected burner to the frame using the quick mount for the selected burner type; and
(d) using the cooker assembled in step "c" to perform the type of cooking chosen in step "b."

In one embodiment, the method includes the additional steps of choosing a different type of outdoor cooking than that chosen in step "b" and, based on the chosen different type of outdoor cooking, using the instructions to select another burner type from the set of different burner types included in the kit; detaching the burner attached in step "c" and using the instructions to attach another burner to the frame using the quick mount for another selected burner type. In one embodiment the detached burner is also placed back in the packaging for the kit.

In one embodiment, the distance from the bottom to the cooking surface for a selected burner, with the selected burner's quick connect/quick disconnect mount to the frame's at least one mounting point, will be different from the bottom of at least one of the other burners in the kit.

In one embodiment the method includes the step of selecting a burner type from a plurality of different burner types in the kit, each burner type having a burner top and a quick connect/quick disconnect mount which mounts on the frame via the mounting point;

In one embodiment the different type of burners are selected from the set of types of burners consisting of: (a) Jet burner; (b) High pressure cast burner; (c) Low pressure cast burner; and (d) Natural gas burner. In various embodiments two different types of burners are included in a kit for an interchangeable type of outdoor cooker which is packaged for sale. In various embodiments three different types of burners are included in a kit for an interchangeable type of outdoor cooker which is packaged for sale. In various embodiments four different types of burners are included in a kit for an interchangeable type of outdoor cooker which is packaged for sale.

Different Converted Outdoor Cookers

FIGS. 25, 35-40 show a perspective view of the first type of burner 400 from from FIGS. 14-15 attached to the frame 100 at attachment points 220, 230 (via fasteners 470, 480), with the top 450 of first burner 400 being at a first depth 490 from the grate 300.

Figure 20:
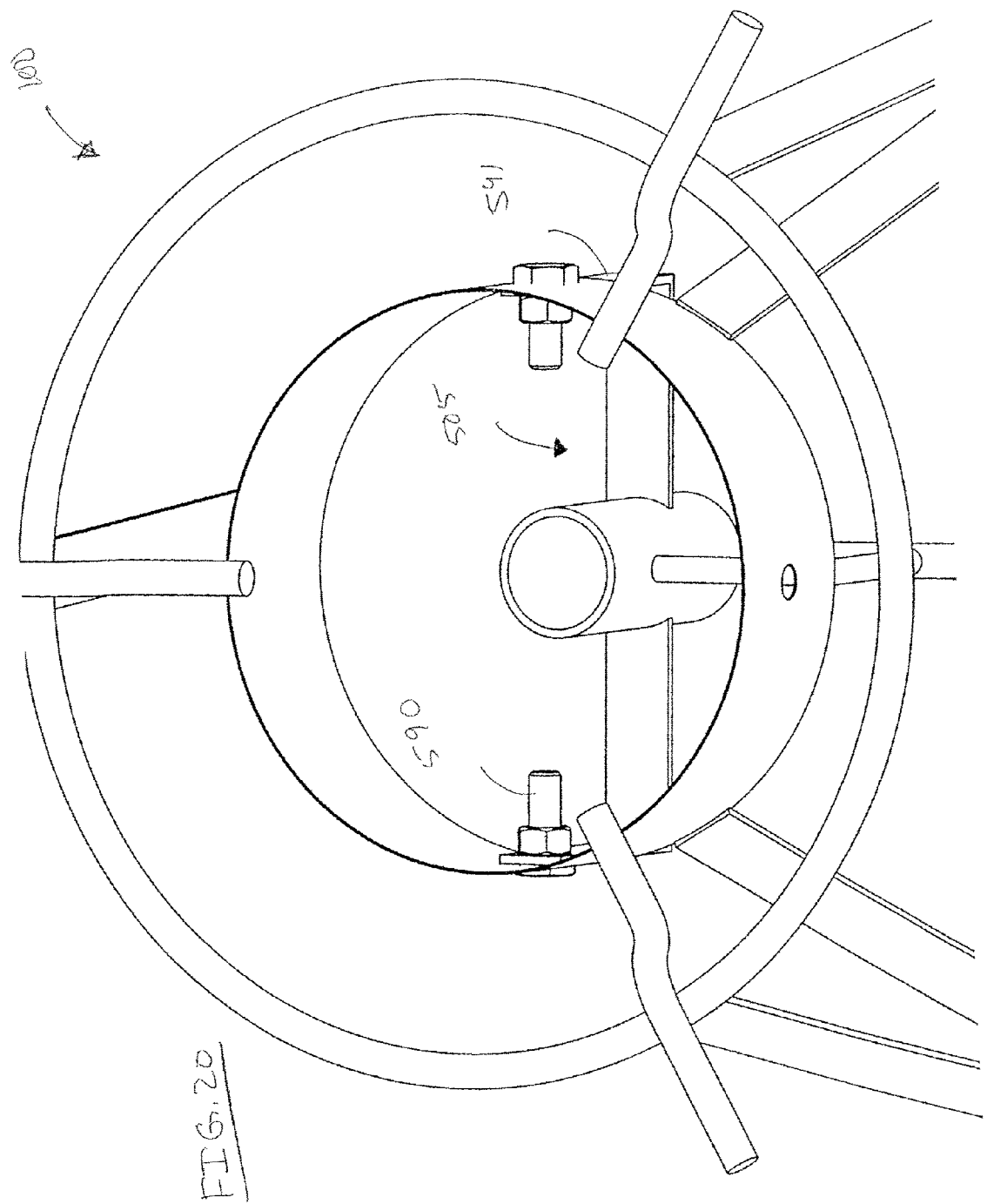
FIG. 20 is a partial perspective view of the preferred embodiment of the apparatus of the present invention showing frame and high pressure jet burner.
Figure 21:
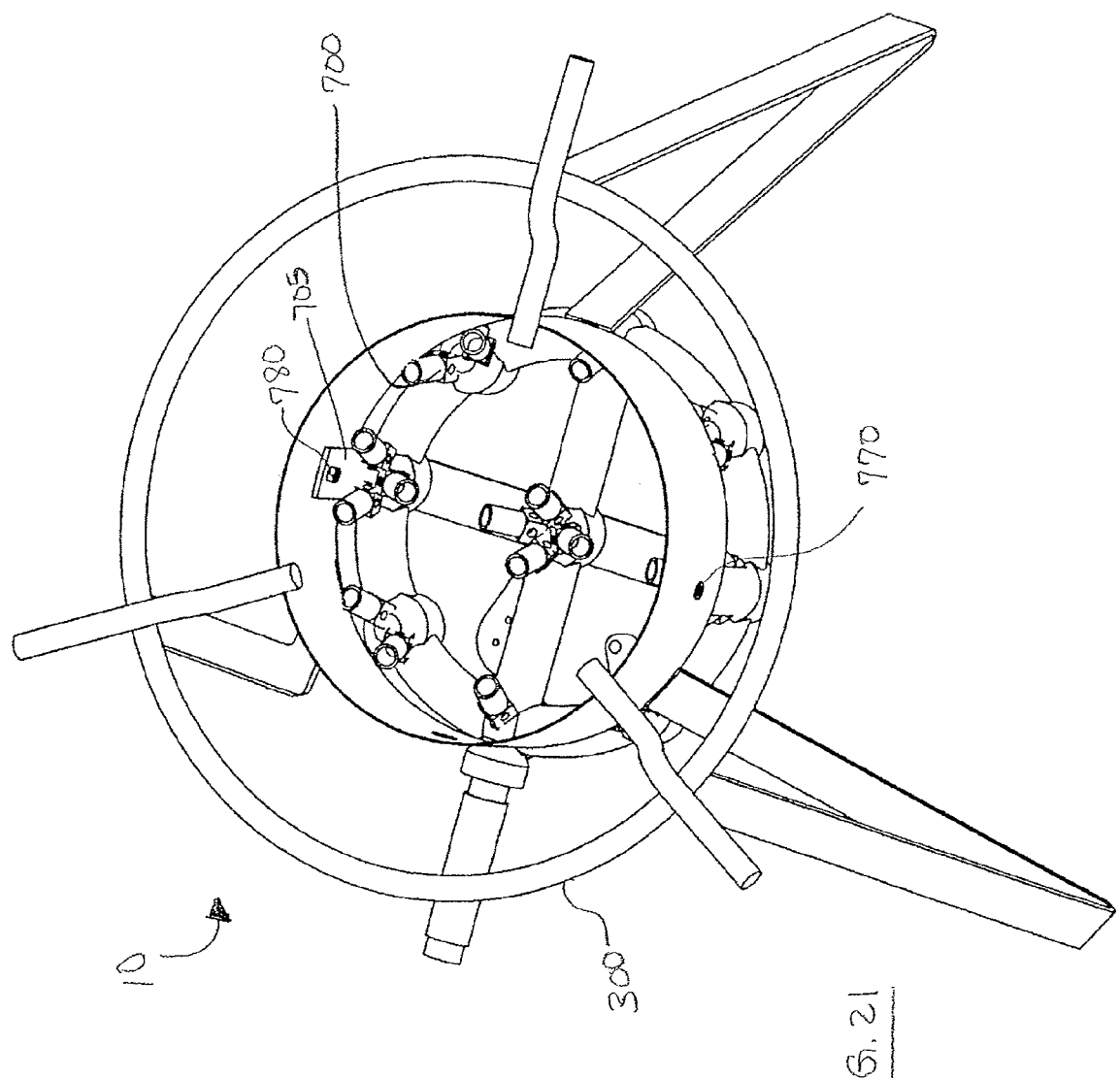
FIG. 21 shows a perspective view of a fourth type of burner, which is different from the first, second, and third types of burners, attached to the frame at attachment points, with the top of fourth burner being at a first depth from the grate.

FIGS. 28, 41-46 shows a perspective view of the second type of burner 500 attached to the frame 100 at attachment points 220, 230 (via fasteners 570, 580), with the top 550 of second burner being at a first depth 590 from the grate 300. (See FIG. 41.) FIG. 20 is a close up perspective view of the second burner 500 attached to the frame 100. FIGS. 28, 41-46 shows the second burner type 500 attached to the frame 100 at attachment points 220, 230, with top 550 of second burner type 500 being at a second depth 590 from grate 300 (or desired cooking height), the second depth 590 being different from the first depth 490 for burner type 400, but with the attachment points 220, 230 for the second burner's 500 quick mount 505 being the same as the attachment points 220, 230 for the first burner's 400 quick mount 405.

Figure 47:
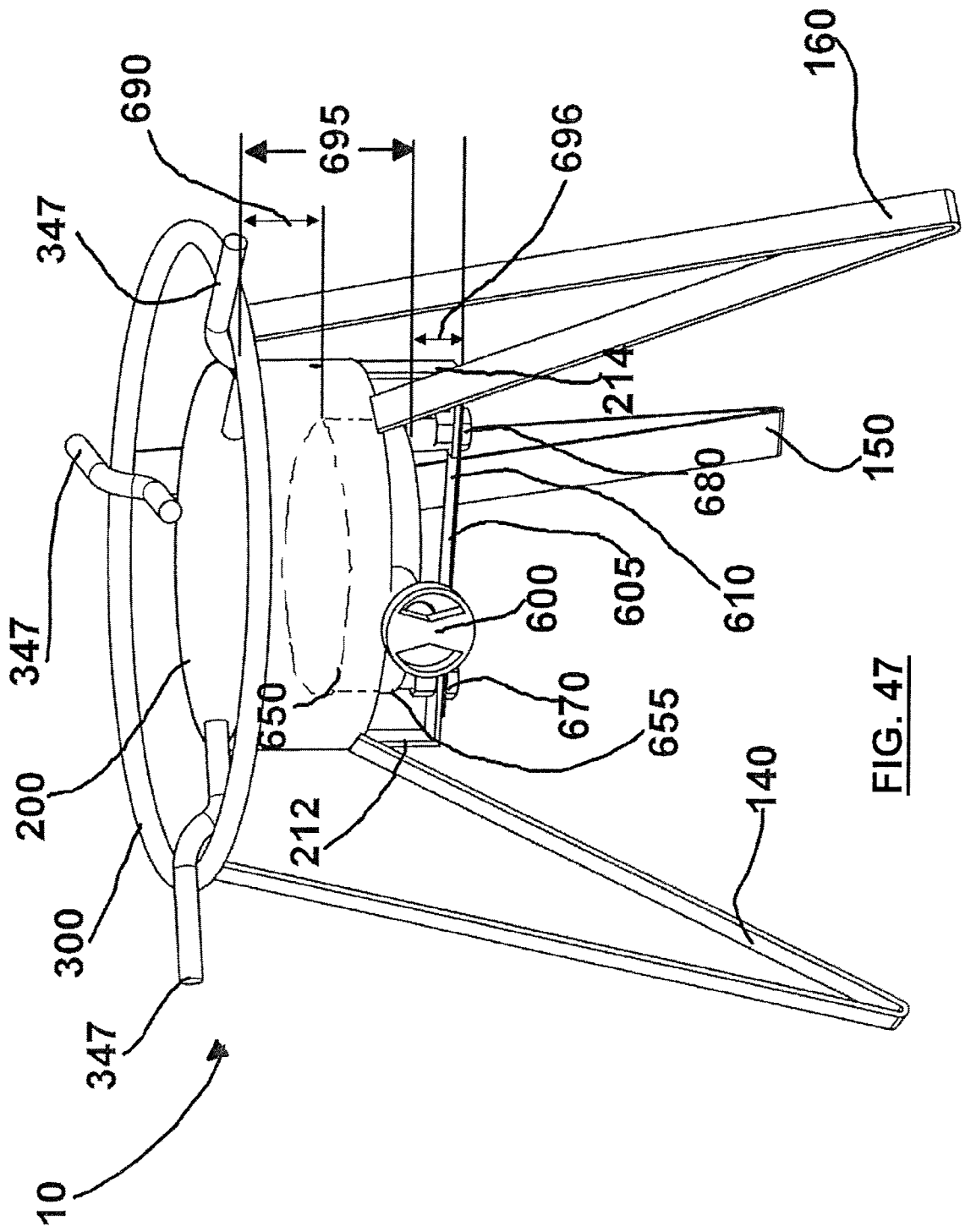
FIG. 47 shows an alternative quick connect/disconnect mount with low pressure burner mounted on an outdoor cooker having an alternative detachable/attachment arrangement to the wind guard.
Figure 51:
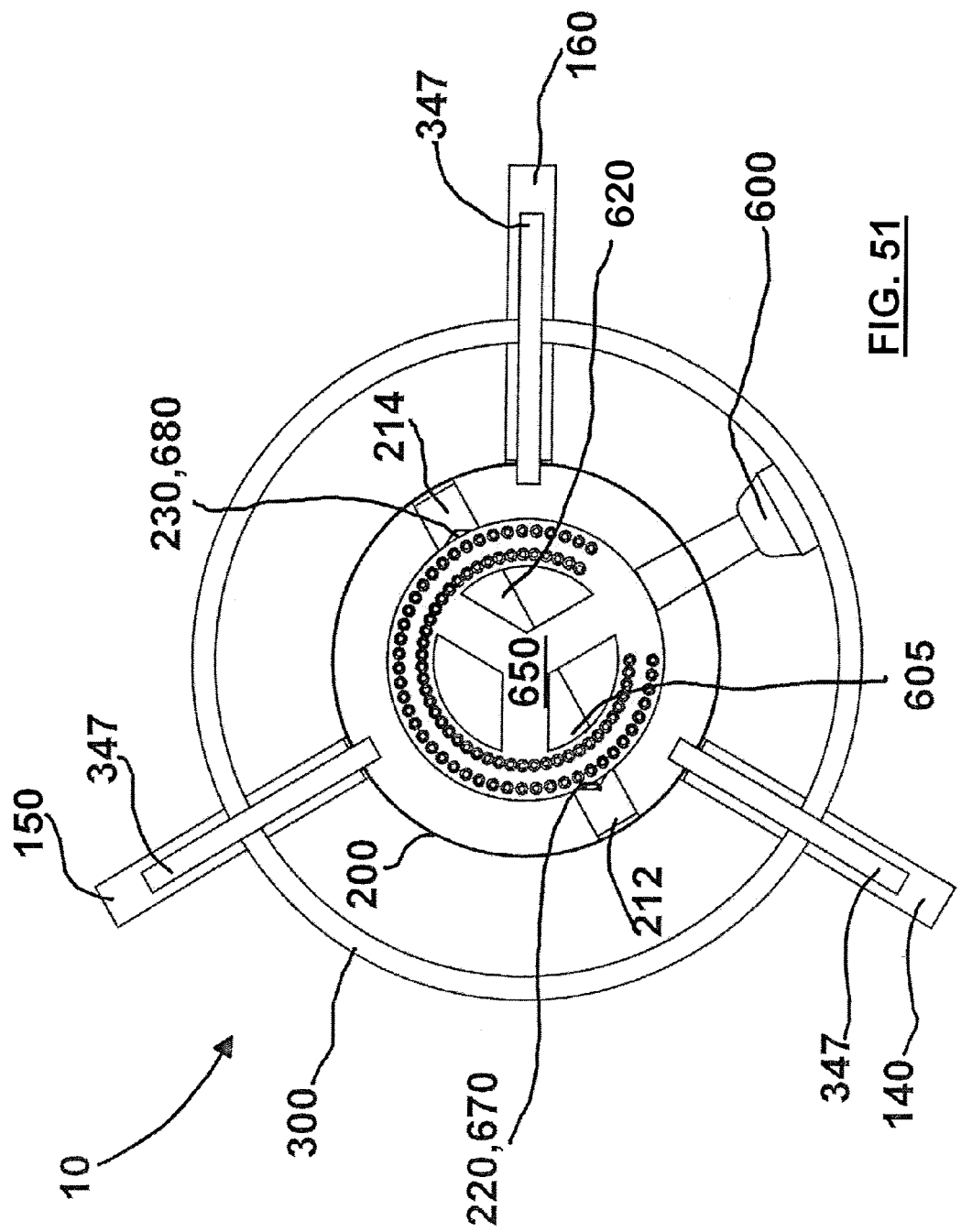
FIGS. 51 and 52 are top and bottom views of the outdoor cooker with alternative quick connect/disconnect mounting bracket mounted onto an outdoor cooker shown in FIG. 47.
Figure 52:
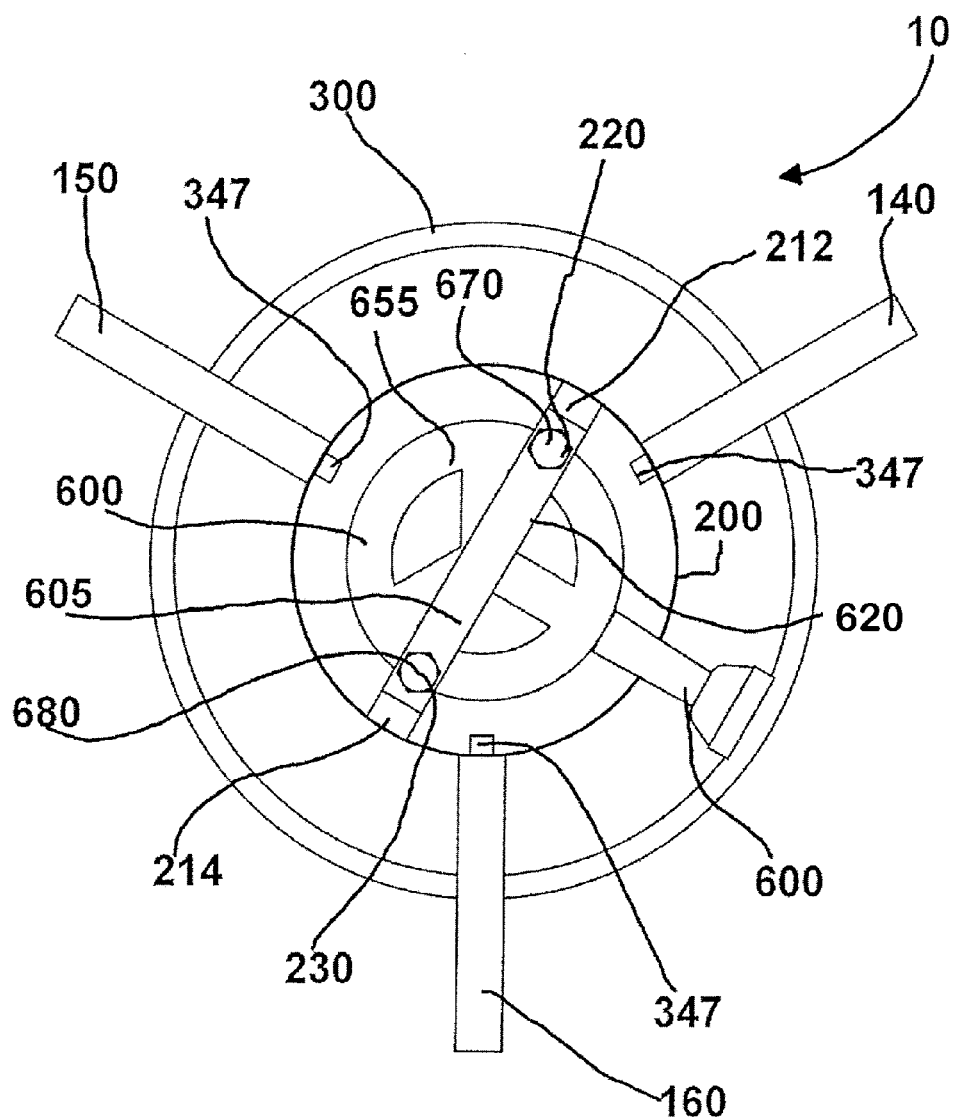
Figure 53:
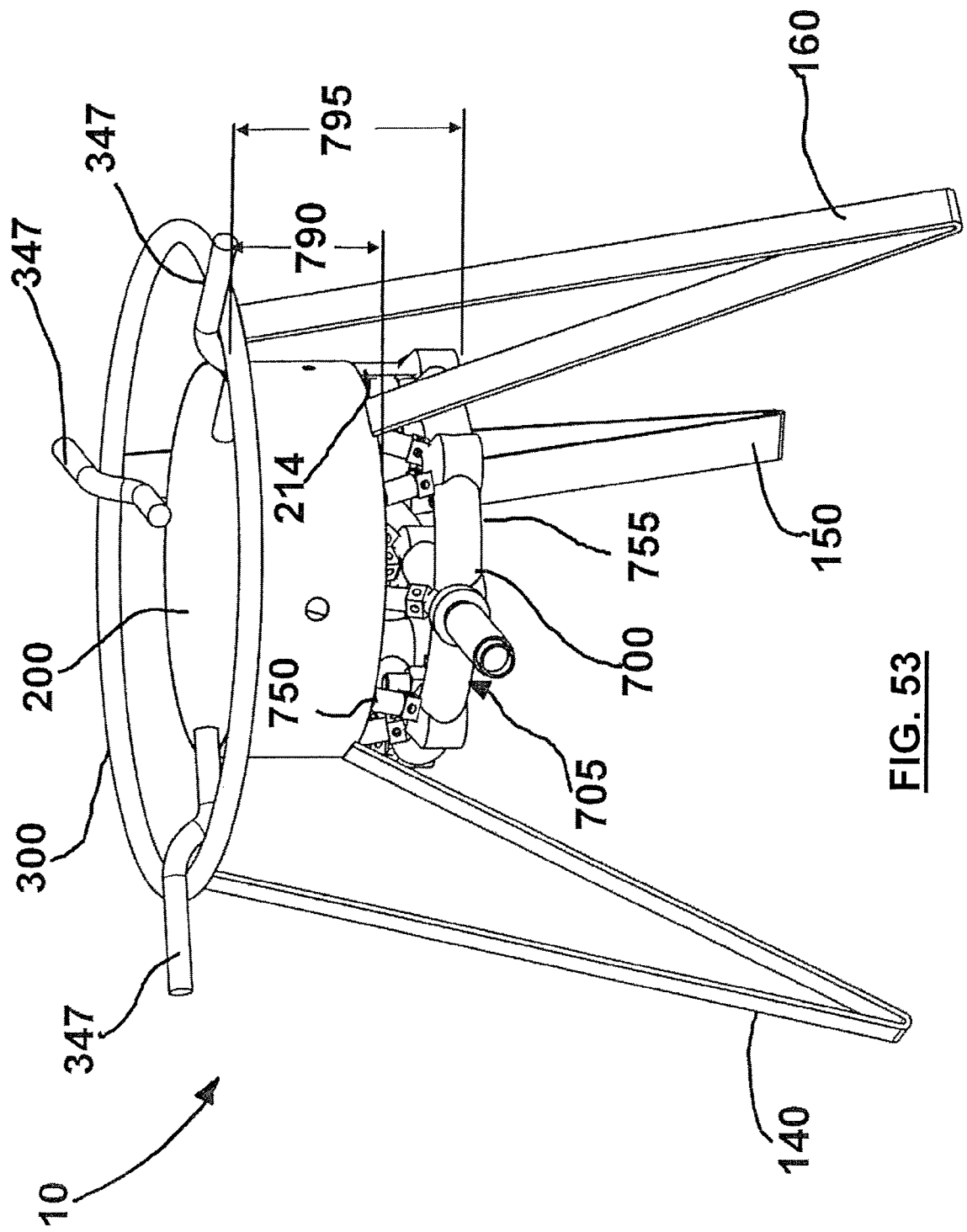
FIG. 53 shows an alternative quick connect/disconnect mount with natural gas burner mounted on an outdoor cooker having an alternative detachable/attachment arrangement to the wind guard.

FIGS. 47-52 show a perspective view of the third type of burner 600 attached to the frame 100 at attachment points 220, 230 (via fasteners 670, 680), with the top 650 of third burner 600 being at a first depth 690 from the grate 300. FIG. 51 is a top view of FIG. 47 and FIG. 52 is a bottom view of FIG. 47. FIGS. 47-52 show the third burner type 600 attached to the frame 100 at attachment points 220, 230 (see also FIG. 51), with top 650 of third burner type 600 being at a third depth 690 from grate 300 (or desired cooking height), the third depth 690 being different from both the first 490 and second 590 depths, but with the attachment points 220, 230 for the third burner's 600 quick mount 605 being the same as the attachment points 220, 230 for the first 400 and second 500 burner's quick mounts 405, 505.

Figure 22:
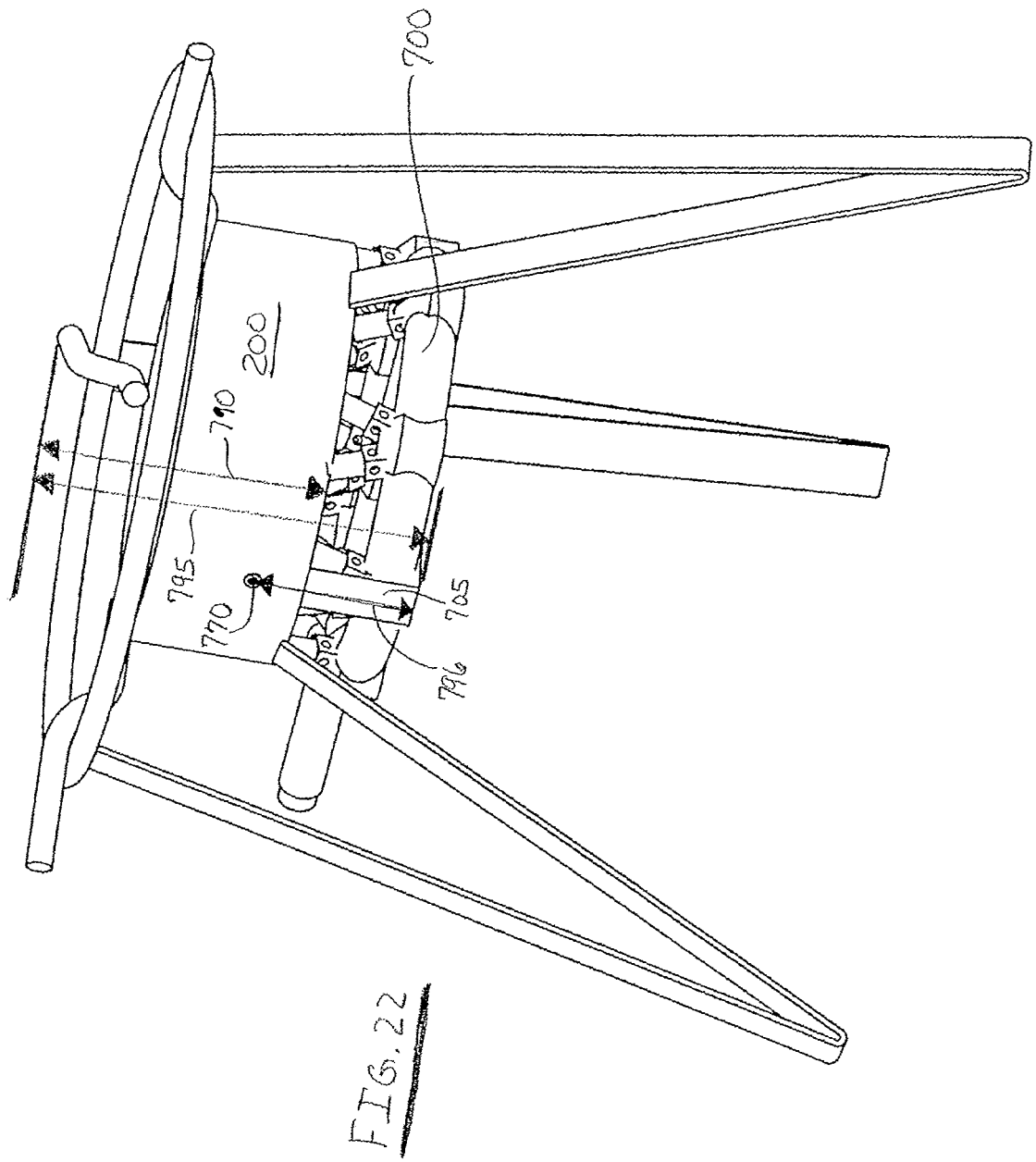
FIG. 22 is a side view of FIG. 21.

FIGS. 21-22, 53-57 show a perspective view of a fourth type of burner 700, which is different from the first 400, second 500, and third 600 types of burners, attached to the frame 100 at attachment points 220, 230 (via fasteners 770, 780), with the top of fourth burner 700 being at a first depth 790 from the grate 300. FIG. 22 is a side view of FIG. 21. FIGS. 53-57 show the fourth burner type 700 attached to the frame 100 at attachment points 220, 230, with top 750 of fourth burner type 700 being at a third depth 790 from grate 300 (or desired cooking height), the fourth depth 790 being different from both the first 490, second 590, and third 690 depths, but with the attachment points 220, 230 for the fourth burner's 700 quick mount 705 being the same as the attachment points 220, 230 for the first 400, second 500, and third 600 burner's quick mounts 405, 505, 605.

Vertical Height to Desired Cooking Surface

In one embodiment, differences in vertical heights between the top of the selected burner and the height of the desired cooking surface is controlled by the mounting bracket for the selected type of burner. For example, such difference in height can be controlled by the specified height of the vertical bracket members (e.g., attachment bracket connects to burner at different heights, attachment bracket has different vertical heights for vertical attachment tabs, etc.).

In one embodiment vertical adjustment is provided for one or more of the interchangeable burners. In one embodiment vertical adjustment occurs through vertical slots in windshield; different sets of attachment holes for burner bracket; and/or other adjustment means. With vertical adjustment comes the risk of a consumer installing one of the interchangeable burners at a vertical level such that the burner is not located in an optimum vertical position relative to the item (e.g., pot) the burner will heat. One protection which can be provided is to provide different sets of attachment holes for different burners, but with the sets of holes not being interchangeable with the different burner attachment brackets. For example, the attachment holes can be different sizes and/or different shapes.

FIG. 10 shows a kit 90 including convertible outdoor cooker 10 having frame 100 packaged for sale with at least two different types of burners (e.g., burners 400 and 500) with two quick connect/disconnect mounts (respectively, mounts 405 and 505), along with a set of instructions 1100 for selecting, connecting and disconnecting the different types of burners in the kit 90, with the exterior of packaging including the claim that the outdoor cooker is "convertible" and/or "interchangeable" between different types of cookers; and/or the statement that it includes interchangeable burner types allowing the outdoor cooker to be converted to different types of outdoor cookers.

One embodiment provides a convertible outdoor cooker kit including a plurality of different types of burners that are selected from the set of types of burners consisting of: (a) Jet burner 500; (b) High pressure cast burner 400; (c) Low pressure cast burner 600; and (d) Natural gas burner 700. In various embodiments two different types of burners are included in a kit for an interchangeable type of outdoor cooker which is packaged for sale. In various embodiments three different types of burners are included in a kit for an interchangeable type of outdoor cooker which is packaged for sale. In various embodiments four different types of burners are included in a kit for an interchangeable type of outdoor cooker which is packaged for sale.

In one embodiment, differences in vertical heights between the top of the selected burner and the height of the desired cooking surface is controlled by the mounting bracket for the selected type of burner. For example, such difference in height can be controlled by the specified height of the vertical bracket members (e.g., attachment bracket connects to burner at different heights, attachment bracket has different vertical heights for vertical attachment tabs, etc.).

In one embodiment vertical adjustment is provided for one or more of the interchangeable burners. In one embodiment vertical adjustment occurs through vertical slots in windshield; different sets of attachment holes for burner bracket; and/or other adjustment means. With vertical adjustment comes the risk of a consumer installing one of the interchangeable burners at a vertical level such that the burner is not located in an optimum vertical position relative to the item (e.g., pot) the burner will heat. One protection which can be provided is to provide different sets of attachment holes for different burners, but with the sets of holes not being interchangeable with the different burner attachment brackets. For example, the attachment holes can be different sizes and/or different shapes.

Various different types of attachment mechanisms can be used beyond threaded fasteners. For example, possible different types of attachment mechanisms for brackets for different types of burners can be bolts, clips, clamps, bolt one side/clip other, bolt one side/clamp other, etc.

In one embodiment the kit is packaged for sale in a box with dimensions that are not bigger than boxes with similar non-convertible cookers having one burner. In one embodiment the box is less than about 17 inches high with a base less than about 21 inches by less than about 21 inches.

Conversion Examples for Different Types of Cooking

Figure 23:
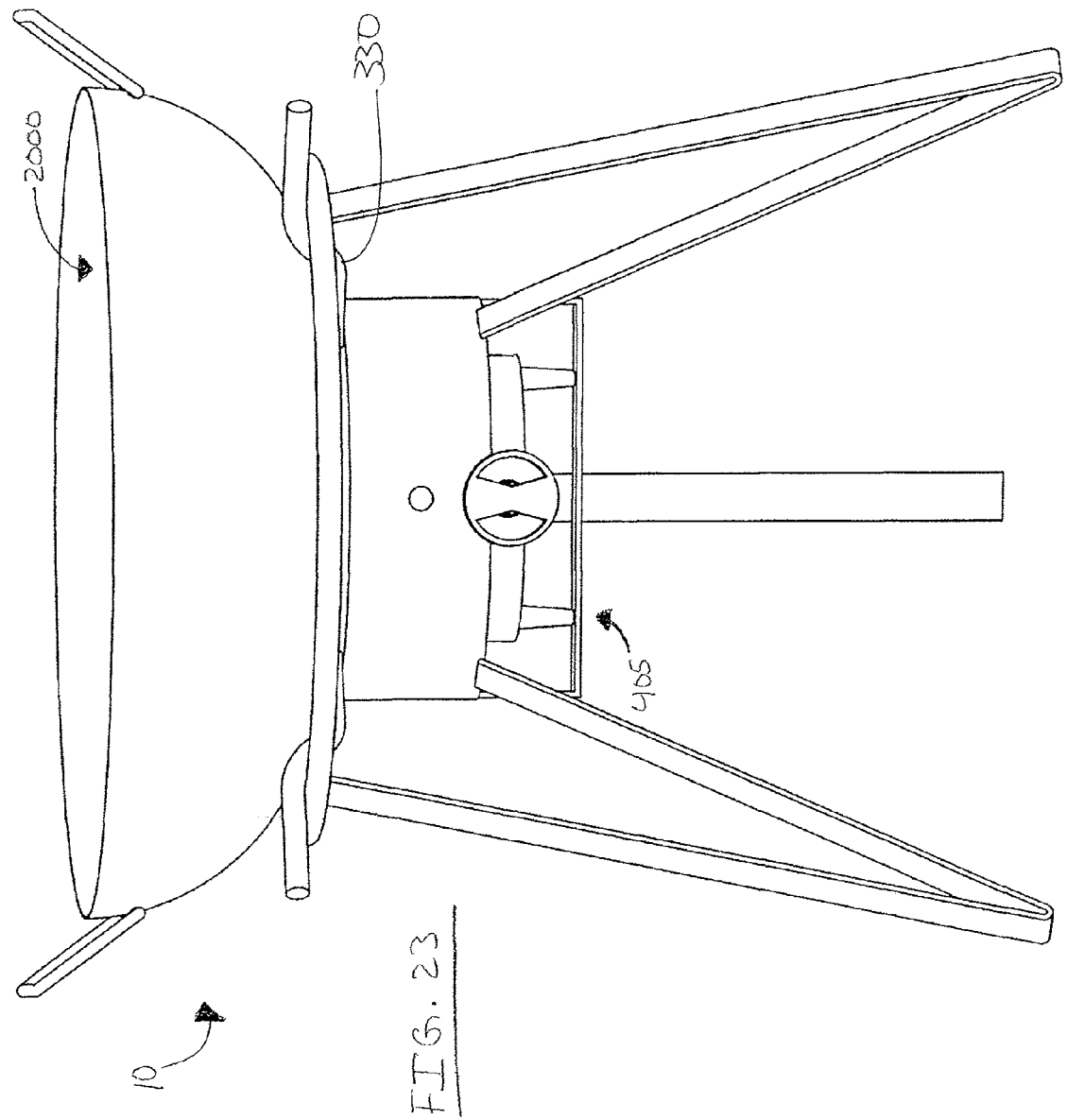
FIG. 23 shows the preferred embodiment of the apparatus of the present invention used with a wok type pot wherein the wok is seated on the lower level of the grate.

FIG. 23 shows a wok type pot 2000 on the configuration, with the wok 2000 being seated on the lower level 330 of the grate 300. (See also FIGS. 11-12.)

Figure 24:
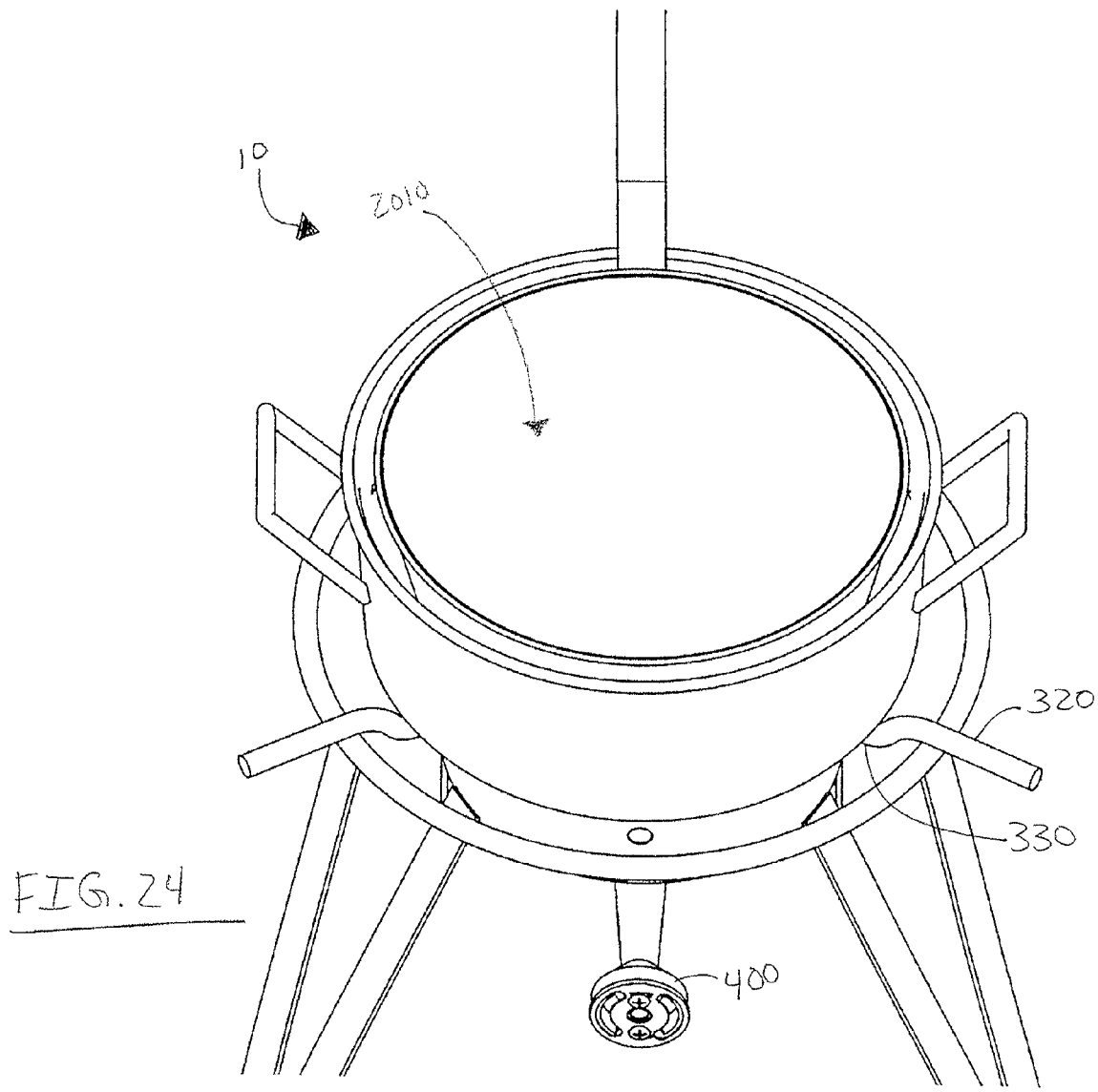
FIG. 24 shows the preferred embodiment of the apparatus of the present invention used with a frying pot and basket arrangement with the frying pot being seated between the upper and lower levels of the grate.

FIG. 24 shows a frying pot and basket arrangement 2010 with the frying pot being seated between the upper 320 and lower 330 levels of the grate 300. (See also FIGS. 11-12.)

Figure 25:
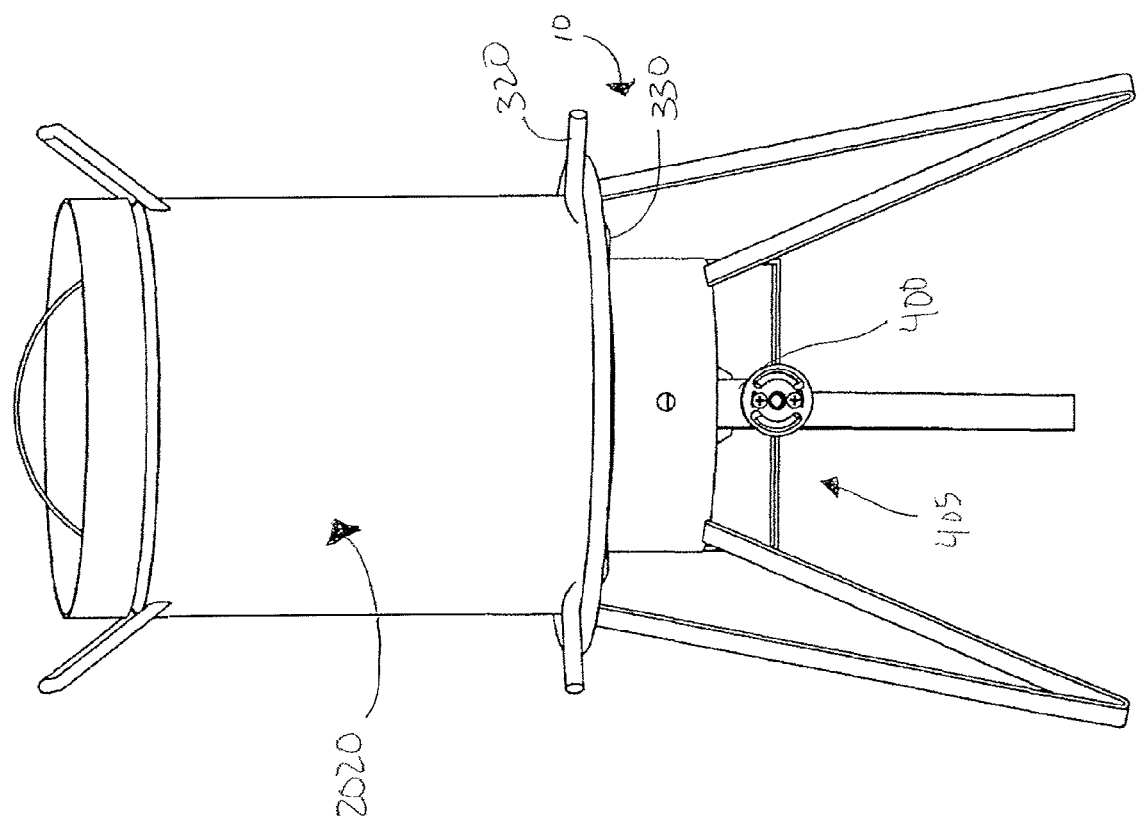
FIGS. 25 and 26 show a boiling pot and basket arrangement (and/or a turkey fryer pot) on the configuration of FIGS. 25-26, with the boiling pot being seated between the upper and lower levels of the grate, but closer to the upper level.
Figure 26:
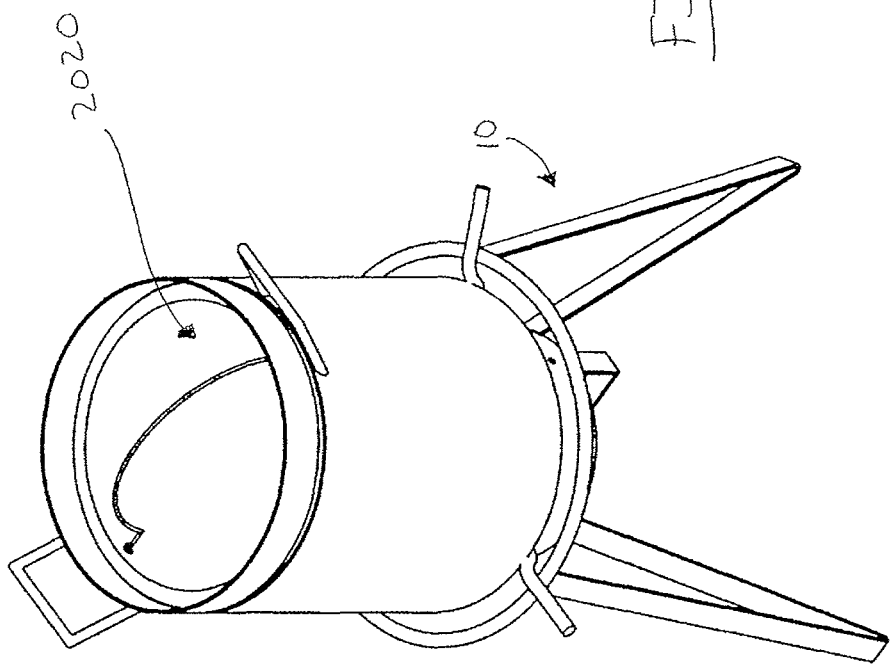

FIGS. 25 and 26 show a boiling pot and basket arrangement 2020 (and/or a turkey fryer pot), with the boiling pot being seated between the upper 320 and lower 330 levels of the grate 300, but closer to the upper level 320. (See also FIGS. 11-12.)

Figure 27:
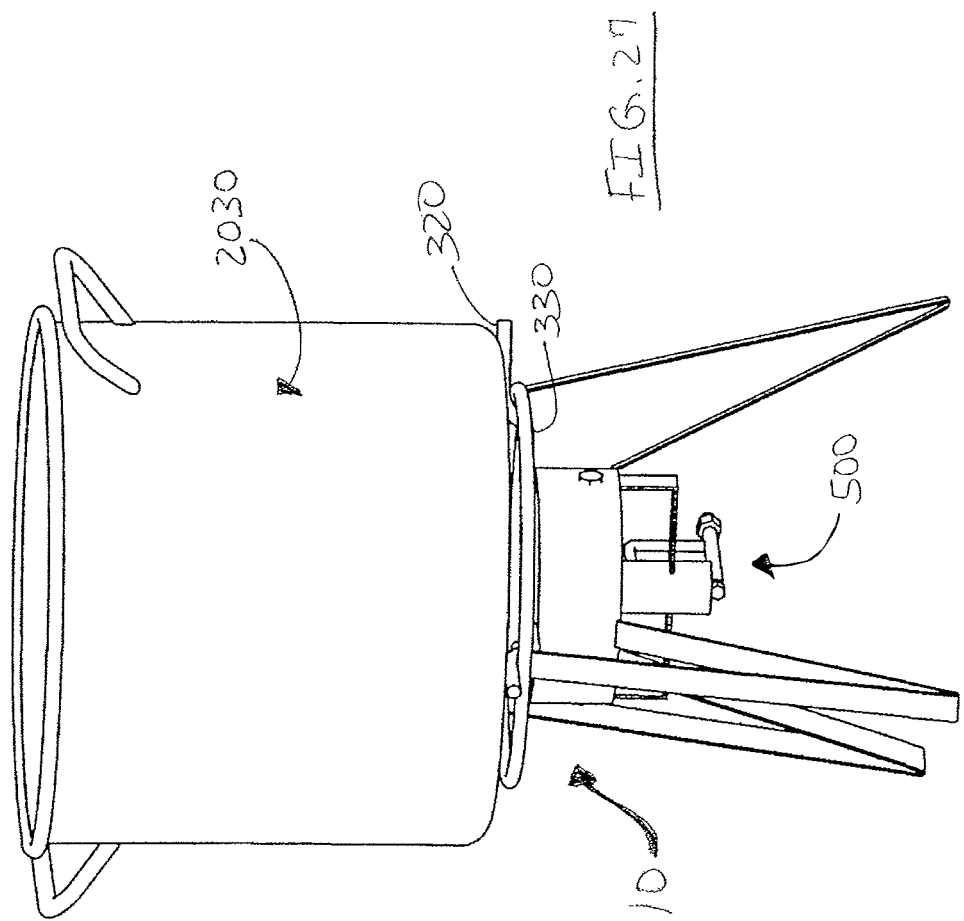
FIGS. 27 and 28 show a boiling pot and basket arrangement with the boiling pot being seated on the upper level of the grate.
Figure 28:
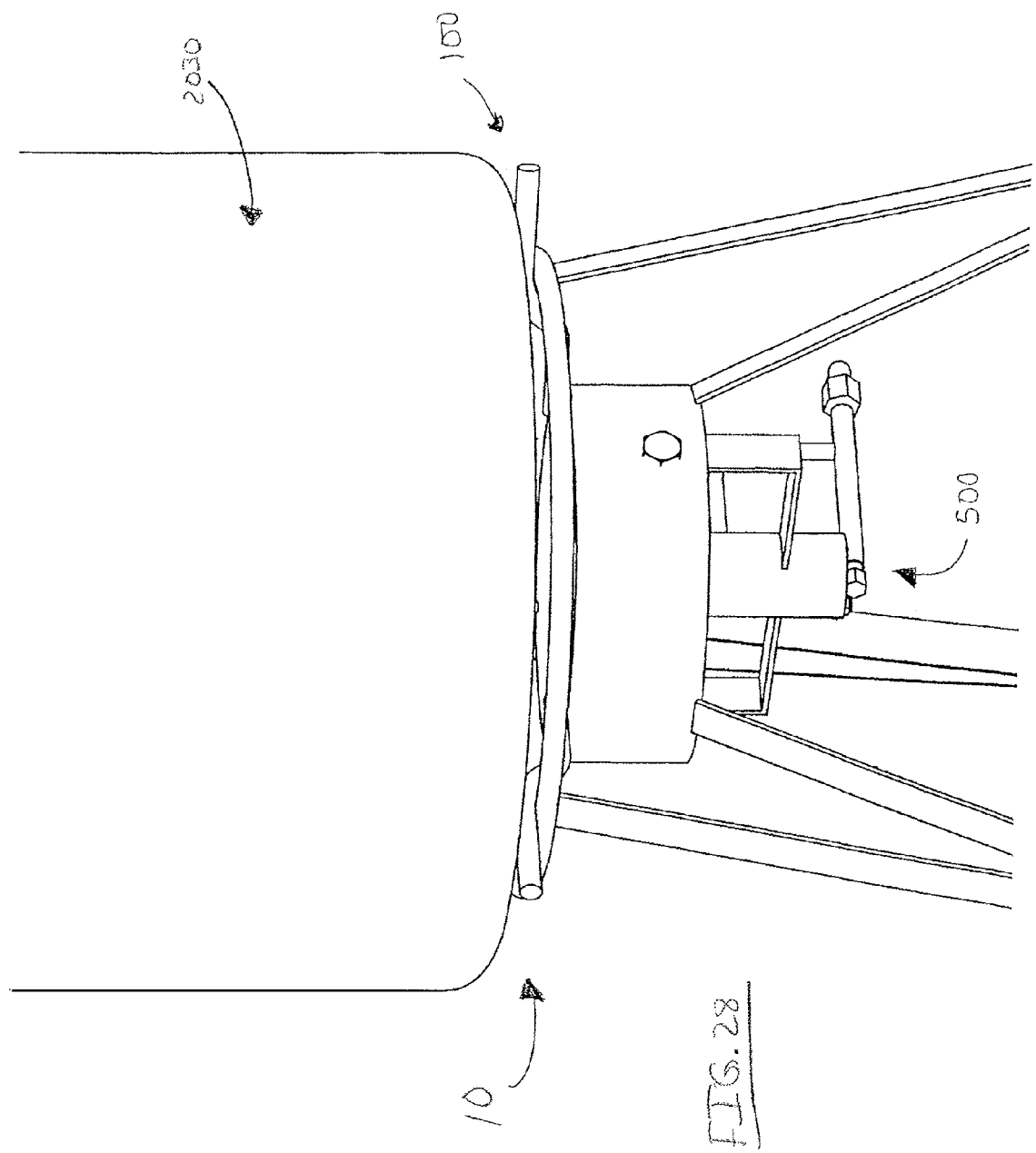

FIGS. 27 and 28 show a boiling pot and basket arrangement 2030, with the boiling pot being seated on the upper level 320 of the grate 300. (See also FIGS. 11-12.)

FIG. 29 shows a cooking pan 2040, with the pan 2040 being seated between the upper 320 and lower 330 levels of the grate 300. (See also FIGS. 11-12.)

FIGS. 33-34 show a heat shield 1900 attachment for the frame 100 with the burner configuration of FIG. 14.

FIGS. 30-32 show a heat shield 1900 attachment for the frame 100 with the burner configuration of FIGS. 15-17. In one embodiment, a heat shield 1900 can be provided which can mount to the frame 100. In one embodiment a heat shield 1900 can be mounted to the jet burner 500 quick mount 505.

Alternative Quick Connect/Quick Disconnect Systems

FIG. 35 shows a first alternative quick connect/disconnect mount with high pressure cast burner 400 mounted on an outdoor cooker having an alternative detachable/attachment arrangement 405 to the wind guard 200 at connections 212, 214. In FIGS. 35-40 a first type of burner 400 (high pressure cast) with quick connect/disconnect mount 405 which mount includes mounting section/horizontal member 420 with openings 435, 445 enabling removable burner support 405 and its attached burner element 400 to be detachably connected to wind guard 200 at connections 212, 214 using removable fasteners or bolted connections 470, 480. In this embodiment wind guard 200 has wind guard openings 212, 214. An opening 407 on bracket 405 enables a connection (using a fasteners or bolted connection) to be made that attaches burner element 400 to quick connect/quick disconnect mount 405. (See FIG. 60.) FIGS. 36, 37 and 38 are respectively top perspective, top, and bottom views of the quick connect/disconnect mount 405 with the high pressure cast burner 400. FIGS. 39 and 40 are top and bottom views of the outdoor cooker 10 with alternative quick connect/disconnect mounting bracket 405 mounted. 490 is the predetermined distance from the top 450 of burner 400 to the cooking surface when burner 400 is detachably connected to frame 100 using quick connect/quick disconnect mount 405. 495 is the predetermined distance from the bottom 455 of burner 400 to the cooking surface. 496 is the predetermined distance from bottom of burner to connection point of quick mount on frame (See FIG. 35.)

Figure 45:
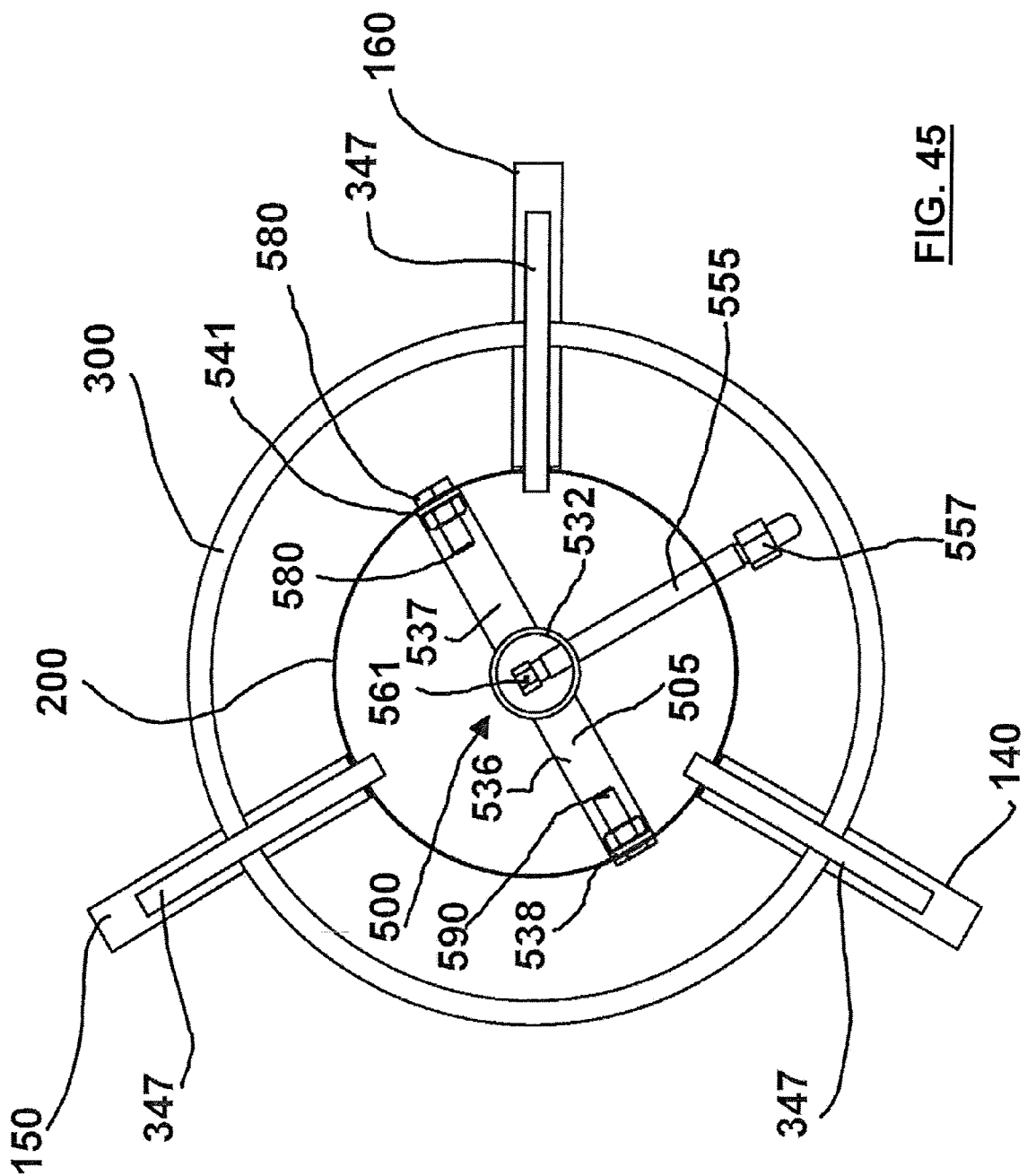
FIGS. 45 and 46 are top and bottom views of the outdoor cooker with alternative quick connect/disconnect mounting bracket mounted onto an outdoor cooker shown in FIG. 41.
Figure 46:
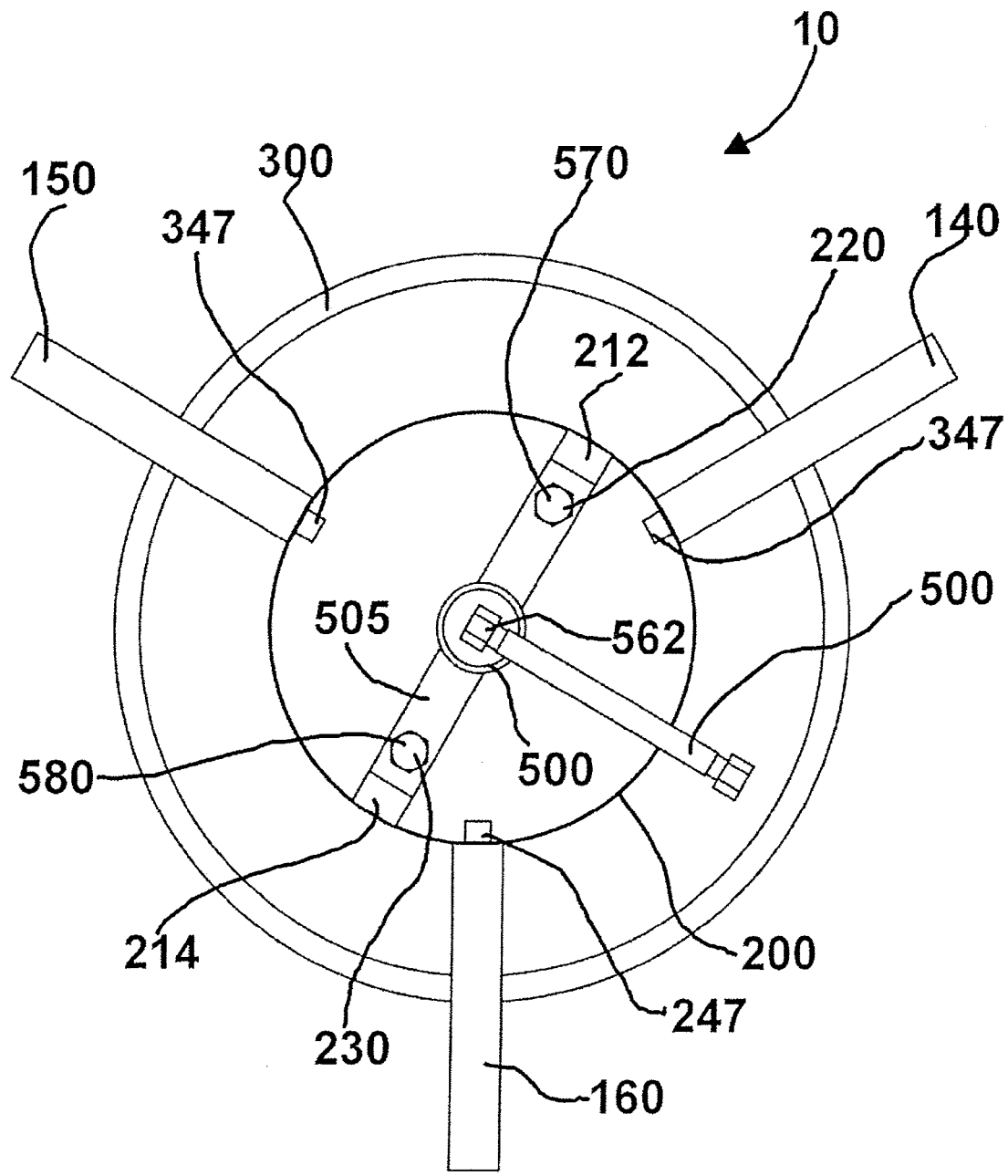

FIGS. 41-46 show an alternative quick connect/disconnect mount 505 with jet burner 500 mounted on an outdoor cooker 10 having an alternative detachable/attachment arrangement to the wind guard. FIGS. 42, 43 and 44 are respectively top perspective, top, and bottom views of the quick connect/disconnect mount 505 with the jet burner 500. FIGS. 45 and 46 are top and bottom views of the outdoor cooker 10 with alternative quick connect/disconnect mount 505 mounted onto an outdoor cooker 10. The second type of burner 500 includes a high pressure jet burner element which is also removable as seen in FIGS. 42, 43, 44 and 59. Second type of burner 500 with quick connect/disconnect mounting bracket 505 for mounting and removal from the frame 100, where second type 500 is different from first type 400 of burner, where the second type 500 is a jet burner (high pressure jet). High pressure burner element 500 can include a tube or pipe section 532 that has an open ended generally vertical bore 533. Tube or pipe section 532 thus has a bottom opening 534 and a top opening 535. Removable mounting bracket 505 includes openings 539 and 542 enabling removable burner support 505 and its attached burner element 500 to be connected to wind guard 200 at connections 212, 214 using removable fasteners or bolted connections 570, 580. FIGS. 51 and 52 are top and bottom views of the outdoor cooker 10 with alternative quick connect/disconnect mounting bracket 505 mounted. 590 is the predetermined distance from the top 550 of burner 500 to the cooking surface when burner 500 is detachably connected to frame 10 using quick connect/quick disconnect mount 505. 595 is the predetermined distance from the bottom 552 of burner 500 to the cooking surface. 596 is the predetermined distance from bottom of burner to connection point of quick mount on frame (See FIGS. 41, 42.)

FIGS. 47-52 shows an alternative quick connect/disconnect mount 605 with low pressure gas burner 600 mounted on an outdoor cooker 10 having an alternative detachable/attachment arrangement to the wind guard 200. FIGS. 48, 49 and 50 are respectively top perspective, top, and bottom views of the quick connect/disconnect mount 605 with the low pressure burner 600. FIGS. 51 and 52 are top and bottom views of the outdoor cooker 10 with alternative quick connect/disconnect mount 605 mounted onto an outdoor cooker 10. The third type of burner 600 with quick connect/disconnect mounting bracket 605, which is also removable, as seen in FIGS. 48, 49 and 50. Third type of burner 600 with quick connect/disconnect mounting bracket 605, for removable mounting on frame 100, where third type 600 is different from first 400 and second 500 types. Removable low pressure cast burner element 600 can be attached to removable burner support 605 which includes a horizontal member 620 and a pair of openings 635, 645 that enables the removable burner support 605 and its attached burner element 600 to be connected to wind guard 200 at connections 212, 214 using removable fasteners or bolted connections 670, 680. FIGS. 51 and 52 are top and bottom views of the outdoor cooker 10 with alternative quick connect/disconnect mounting bracket 605 mounted. 690 is the predetermined distance from the top 650 of burner 600 to the cooking surface when burner 600 is detachably connected to frame 10 using quick connect/quick disconnect mount 605. 695 is the predetermined distance from the bottom 655 of burner 600 to the cooking surface. 696 is the spacing between bottom 655 of burner 600 to horizontal member 620. (See FIGS. 47, 61.)

Figure 57:
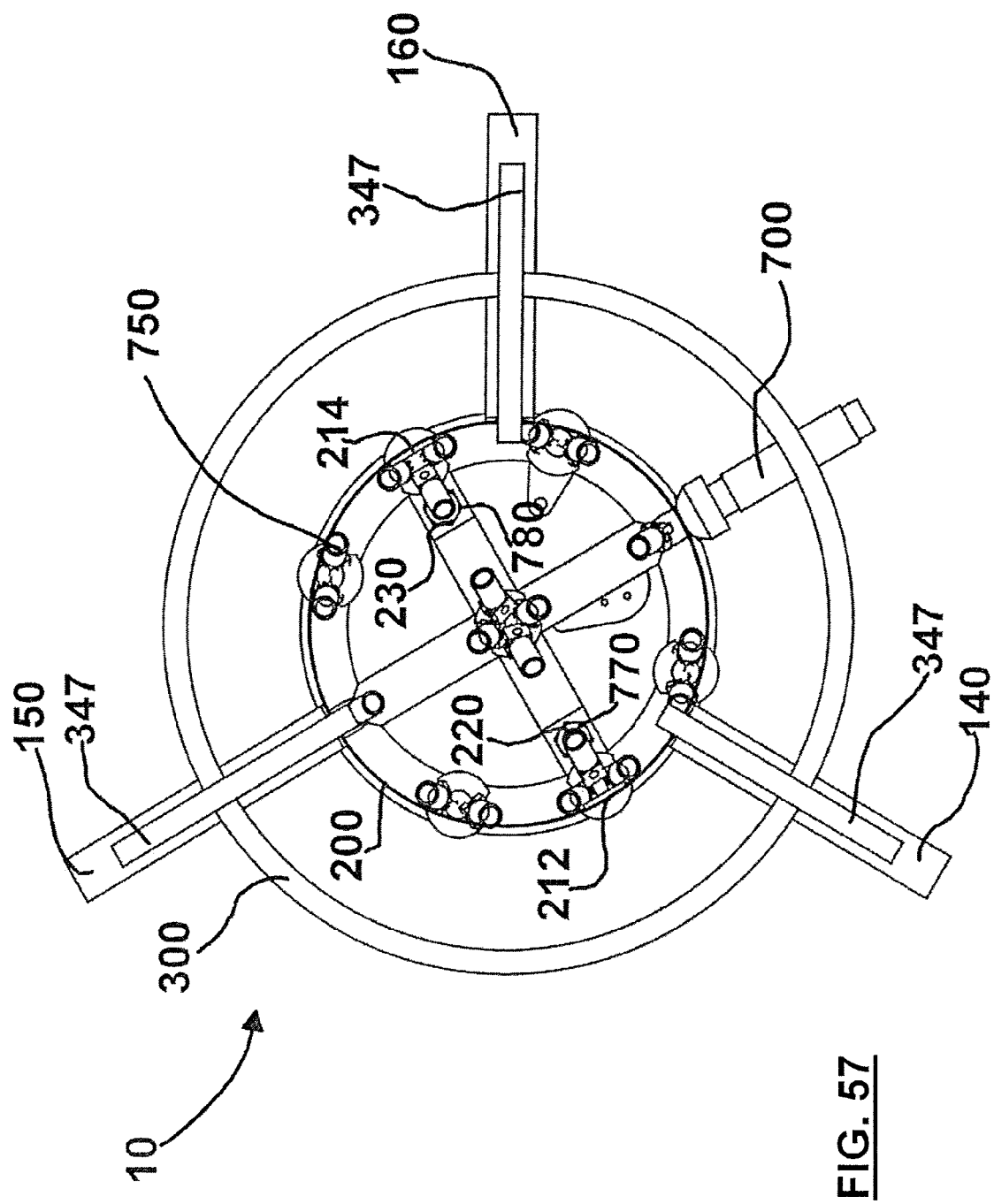
FIGS. 57 and 58 are top and bottom views of the outdoor cooker with alternative quick connect/disconnect mounting bracket mounted onto an outdoor cooker shown in FIG. 53.
Figure 58:
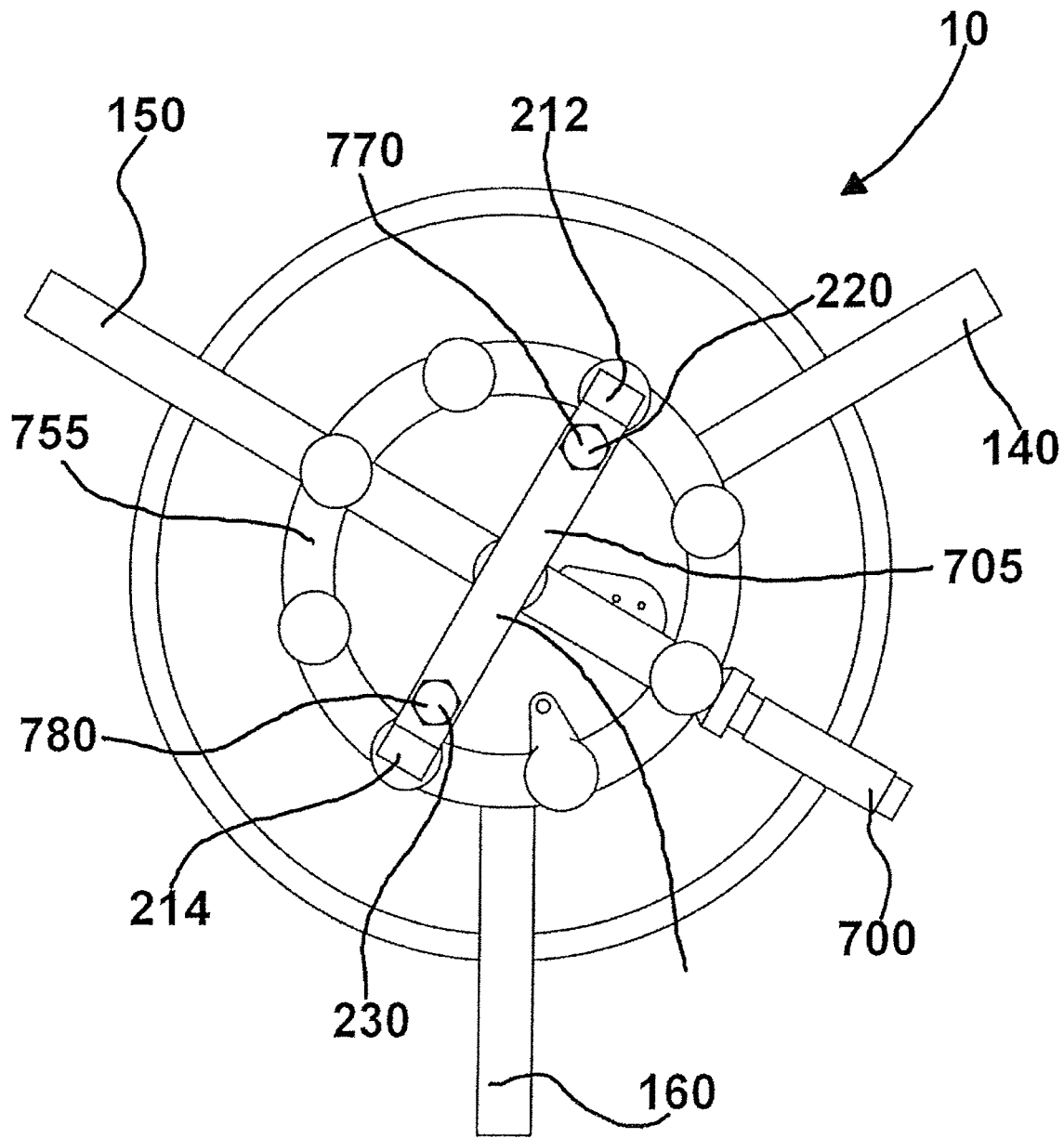
Figure 59:
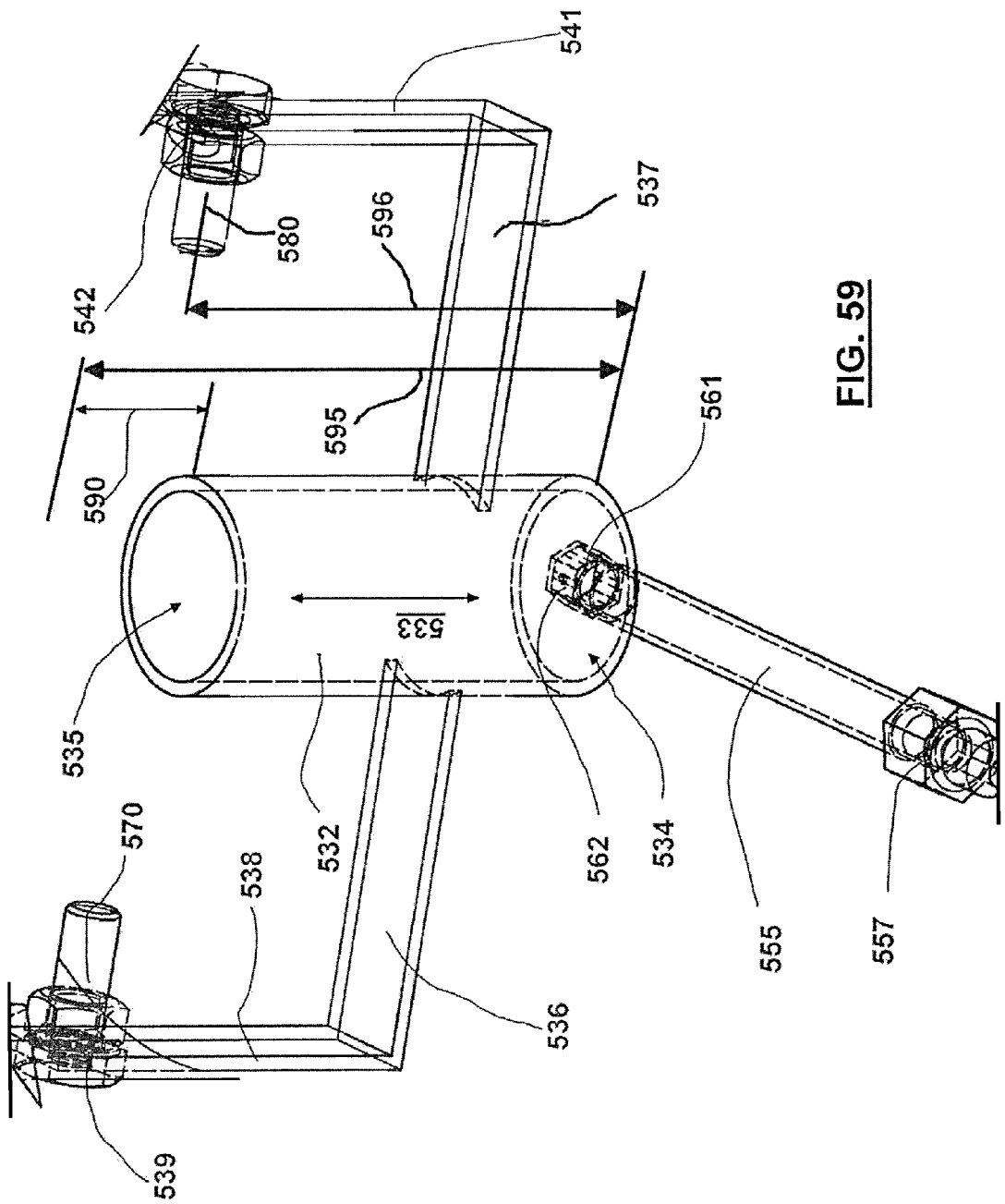
FIG. 59 is an exploded view of the second high pressure jet burner of FIG. 15.

FIGS. 53-58 shows an alternative quick connect/disconnect mount 705 with natural gas burner 700 mounted on an outdoor cooker 10 having an alternative detachable/attachment arrangement to the wind guard 200. FIGS. 54, 55 and 56 are respectively top perspective, top, and bottom views of the quick connect/disconnect mount 705 with the natural gas burner 700. FIGS. 57 and 58 are top and bottom views of the outdoor cooker with alternative quick connect/disconnect mount 705 mounted onto an outdoor cooker 10. The fourth type of burner 700 with quick connect/disconnect mounting bracket 705, which is also removable, is seen in FIGS. 54-56. Fourth type of burner 700 with quick connect/disconnect mounting bracket 705, for removable mounting on frame 100, where fourth type 700 is different from first 400, second 500, and third 600 types. Removable natural gas burner element 700 can be attached to removable burner support 705 and includes a horizontal member 720 and a pair of openings 735, 745 that enables the removable burner support 705 and its attached burner element 700 to be connected to wind guard 200 at connections 212, 214 using removable fasteners or bolted connections 770, 780. FIGS. 57 and 58 are top and bottom views of the outdoor cooker 10 with alternative quick connect/disconnect mounting bracket 705 mounted. 790 is the predetermined distance from the top 750 of burner 700 to the cooking surface when burner 700 is detachably connected to frame 10 using quick connect/quick disconnect mount 705. 795 is the predetermined distance from the bottom 755 of burner 700 to the cooking surface. 796 is the predetermined distance from bottom of burner to connection point of quick mount on frame (See FIG. 53.)

As with the other versions of quick connect/quick disconnect mounts, the alternative versions disclosed in this section can use substantially the same methods/steps (and/or kits) described with other embodiments. For example, a plurality of different burners with mounts (e.g., 400/405; 500/505; 600/605; and/or 700/705 can be included in a kit packaged for sale as a convertible type of outdoor cooker with the purchaser being able to switch the type of outdoor cooker by connecting to the frame (e.g., at the wind guard 200) the selected burner with its quick connect/quick disconnect mount thereby making the outdoor cooker 10 a type of outdoor cooker associated with the type of burner connected. The purchaser is also able to switch the type of outdoor cooker by disconnecting from the frame (e.g., at the wind guard 200) the originally selected burner with its quick connect/quick disconnect mount, and selecting a different type of burner from the kit and connecting this different type of burner to the frame (e.g., at the wind guard 200) with the second selected burner's quick connect/quick disconnect mount thereby making the outdoor cooker 10 a type of outdoor cooker associated with the second selected type of burner connected.

The following table is a parts list with reference numerals and corresponding part descriptions.

LIST FOR REFERENCE NUMERALS

| Reference Number | Description |
| --- | --- |
| 10 | Outdoor cooking apparatus |
| 11 | frame |
| 12 | leg |
| 13 | leg |
| 14 | leg |
| 15 | low pressure burner element |
| 16 | removable burner support |
| 17 | horizontal member |
| 18 | vertical member |
| 19 | vertical member opening |
| 20 | opening |
| 21 | faster/bolt/bolted connection |
| 22 | wind guard opening |
| 23 | tube/pipe section |
| 24 | wind guard |
| 25 | cylindrical wall |
| 26 | pan |
| 27 | pot |
| 28 | lower elevation |
| 29 | higher elevation |
| 40 | high pressure burner |
| 41 | bore |
| 42 | bottom opening |
| 43 | top opening |
| 44 | horizontal member |
| 45 | horizontal member |
| 46 | vertical member |
| 47 | vertical member |
| 48 | opening |
| 49 | opening |
| 50 | pot support member |
| 51 | pot support member |
| 52 | pot support member |
| 53 | outer end |
| 54 | inner end |
| 55 | weld/connection |
| 56 | ring |
| 57 | weld/connection |
| 58 | weld/connection |
| 59 | outer bend |
| 60 | inner bend |
| 61 | conduit |
| 62 | fitting |
| 63 | nozzle |
| 64 | brace/handle |
| 65 | hose |
| 66 | nozzle opening |
| 90 | kit |
| 100 | frame |
| 140 | leg |
| 150 | leg |
| 160 | leg |
| 200 | wind guard |
| 212 | tab opening/attachment point/connection |
| 214 | tab opening/attachment point/connection |
| 220 | opening/attachment point |
| 230 | opening/attachment point |
| 300 | grate |
| 310 | circular support/ring |
| 320 | upper level |
| 330 | lower level |
| 340 | distance between upper and lower levels |
| 347 | pot support member |
| 348 | outer end |
| 349 | inner end |
| 350 | weld/connection |
| 352 | weld/connection |
| 353 | outer bend |
| 354 | inner bend |
| 400 | high pressure cast burner element |
| 405 | quick connect/quick disconnect removable burner support |
| 406 | height adjusting spacer |
| 407 | fastener/opening |
| 420 | horizontal member |
| 430 | vertical member |
| 435 | opening |
| 440 | vertical member |
| 445 | opening |
| 450 | top |
| 455 | bottom |
| 470 | detachable fastener/connector |
| 480 | detachable fastener/connector |
| 490 | predetermined distance from top of burner to bottom of cooking instrument |
| 495 | predetermined distance from bottom of burner to bottom of cooking instrument |

LIST FOR REFERENCE NUMERALS

| Reference Number | Description |
|---|---|
| 496 | predetermined distance from bottom of burner to connection point of quick mount on frame |
| 500 | high pressure jet burner element |
| 505 | quick connect/quick disconnect |
| 532 | tube/pipe section |
| 533 | vertical bore |
| 534 | bottom opening |
| 535 | top opening |
| 536 | horizontal member |
| 537 | horizontal member |
| 538 | vertical member |
| 539 | opening |
| 540 | removable burner support |
| 541 | vertical member |
| 542 | opening |
| 550 | top |
| 552 | bottom |
| 555 | fuel supply conduit |
| 556 | handle/brace |
| 557 | threaded fuel inlet fitting |
| 561 | nozzle |
| 562 | nozzle fuel discharge opening |
| 570 | detachable fastener/connector |
| 580 | detachable fastener/connector |
| 590 | predetermined distance from top of burner to bottom of cooking instrument |
| 595 | predetermined distance from bottom of burner to bottom of cooking instrument |
| 596 | predetermined distance from bottom of burner to connection point of quick mount on frame |
| 600 | low pressure cast burner element |
| 605 | quick connect/quick disconnect removable burner support |
| 607 | opening |
| 620 | horizontal member |
| 630 | vertical member |
| 635 | opening |
| 637 | fastener/bolt/bolted connection |
| 640 | vertical member |
| 645 | opening |
| 647 | fastener/bolt/bolted connection |
| 648 | fastener/bolt/bolted connection |
| 650 | top |
| 655 | bottom |
| 670 | detachable fastener/connector |
| 680 | detachable fastener/connector |
| 690 | predetermined distance from top of burner to bottom of cooking instrument |
| 695 | predetermined distance from bottom of burner to bottom of cooking instrument |
| 696 | predetermined distance from bottom of burner to connection point of quick mount on frame |
| 700 | low pressure non cast burner element (e.g., natural gas) |
| 705 | quick connect/quick disconnect removable burner support |
| 735 | opening |
| 745 | opening |
| 750 | top |
| 755 | bottom |
| 770 | detachable fastener/connector |
| 780 | detachable fastener/connector |
| 790 | predetermined distance from top of burner to bottom of cooking instrument |
| 795 | predetermined distance from bottom of burner to bottom of cooking instrument |
| 796 | predetermined distance from bottom of burner to connection point of quick mount on frame |
| 958 | hose |
| 959 | regulator |
| 960 | connector/fitting |
| 1100 | instructions |
| 1200 | packaging |
| 1300 | indicia/advertisements |
| 1900 | heat shield |
| 2000 | wok |
| 2010 | fryer pan and basket |
| 2020 | turkey fryer |
| 2030 | boiling pot (100 quart) |
| 2040 | pan |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method for converting an outdoor cooker to a selected type of burner,
   the method comprising the steps of:
   (a) purchasing a kit for an outdoor cooker convertible between a plurality of different cooking types of outdoor cookers, the kit being packaged for sale;
      (i) the kit including a frame having a cooking surface, a wind guard positioned below the cooking surface and having a wall surrounding a hollow interior, the wind guard having an open top and an open bottom, the frame having at least one quick connect/quick disconnect mounting point;
      (ii) a plurality of different burner types, each burner type having a burner top and bottom, along with a quick connect/quick disconnect mount which mounts on the frame via the frame's at least one mounting point;
      (iii) wherein, after mounting of a selected burner with the selected burner's quick connect/quick disconnect mount to the frame's at least one mounting point, the top of the selected burner will be at a predetermined distance from the cooking surface and occupying said wind guard hollow interior, the predetermined distance for selected burner being different from the predetermined distance for at least one of the other burners in the kit;
      (iv) a set of conversion instructions outlining the connection and disconnection of each of the burners in the kit;
      (v) a set of cooking instructions outlining the types of cooking which can be performed with each of the types burners in the kit; and
      (vi) the kit being packaged for sale in packaging;

(b) choosing a type of outdoor cooking and, based on the chosen type of outdoor cooking, using the instructions to select a burner type from the set of different burner types included in the kit;
(c) using the instructions to attach the selected burner to the frame using the quick mount for the selected burner type; and
(d) using the cooker assembled in step "c" to perform the type of cooking chosen in step "b."

2. The method of claim 1, including the additional steps of, after step "d", choosing a different type of outdoor cooking than that chosen in step "b" and, based on the chosen different type of outdoor cooking, using the instructions to select another burner type from the set of different burner types included in the kit; detaching the burner attached in step "c"; and using the instructions to attach the another burner to the frame using the quick mount for the another selected burner type.

3. The method of claim 1, including the step of selecting a burner type from plurality of different burner types in the kit, each burner type having a burner top and a quick connect/quick disconnect mount which mounts on the frame via the mounting point.

4. The method of claim 3, wherein different type of burners are selected from the set of types of burners consisting of (a) jet burner; (b) high pressure cast burner; (c) low pressure cast burner; and (d) natural gas burner.

5. The method of claim 3, wherein different type of burners are selected from the set of types of burners consisting of: (a) jet burner and (b) high pressure cast burner.

6. The method of claim 3, wherein different type of burners are selected from the set of types of burners consisting of: (a) jet burner and (b) low pressure cast burner.

7. The method of claim 3, wherein different type of burners are selected from the set of types of burners consisting of: (a) jet and (b) natural gas burner.

8. The method of claim 3, wherein different type of burners are selected from the set of types of burners consisting of (a) jet burner; (b) high pressure cast burner; and (c) low pressure cast burner.

9. The method of claim 3, wherein different type of burners are selected from the set of types of burners consisting of: (a) high pressure cast burner and (b) low pressure cast burner.

* * * * *